(12) United States Patent
Ohba et al.

(10) Patent No.: US 6,677,950 B1
(45) Date of Patent: *Jan. 13, 2004

(54) GRAPHICS COMPUTER

(75) Inventors: Mamoru Ohba, Hitachi (JP); Mitsuru Watabe, Urizura-machi (JP); Rika Minami, Brookline, MA (US); Koyo Katsura, Hitachioota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/996,151

(22) Filed: Dec. 22, 1997

Related U.S. Application Data

(63) Continuation of application No. 08/355,517, filed on Dec. 14, 1994, now Pat. No. 5,771,047.

(30) Foreign Application Priority Data

| Dec. 17, 1993 | (JP) | 5-318651 |
| Jun. 29, 1994 | (JP) | 6-147856 |
| Aug. 4, 1994 | (JP) | 6-182679 |
| Sep. 5, 1994 | (JP) | 6-210922 |

(51) Int. Cl.[7] .............................................. G06T 15/00
(52) U.S. Cl. ...................................................... 345/503
(58) Field of Search ................................. 345/503, 505, 345/520, 545, 567, 568, 807; 711/202

(56) References Cited

U.S. PATENT DOCUMENTS

| 5,146,592 A | * | 9/1992 | Pfeiffer et al. ............... 345/807 |
| 5,404,445 A | * | 4/1995 | Matsumoto ................... 345/520 |
| 5,771,047 A | * | 6/1998 | Ohba et al. ................... 345/443 |

* cited by examiner

*Primary Examiner*—Almis R. Jankus
(74) *Attorney, Agent, or Firm*—Antonelli, Terry, Stout & Kraus, LLP

(57) ABSTRACT

To reduce the hardware of the graphics computer in size and reduce the cost of the hardware, the frame buffer and the main memory are united into one unit to process graphics data in the CPU. The frame buffer is arranged in the main memory, and the graphics computer includes a DMAC used to read pixel data from the frame buffer for display, a display used to receive the pixel data and display it on a display device, such as an LCD, etc., and memories used to store the procedure used by the CPU to draw the pixel data in the said frame buffer. Especially, the said memories are formed so that a single function procedure and 2 multifunction procedure can be selected to suit the drawing object. In addition, the single function procedure includes 2 line drawing procedure that uses data tables and 2 multivalue expansion procedure that uses a pattern table and a mask table. Since the frame buffer and the main memory are united into one unit, the CPU can be used to process graphics data. Thus, the graphics computer hardware is reduced in size and the cost of the hardware is reduced.

26 Claims, 43 Drawing Sheets

FIG. 2

```
                    COLUMN NUMBER
            1 2 3 4 5 6 7 8 9 10 11 12 13 14 15 16

16 0 0 0 1 1 1 1 1 1 1 1 1 1 0 0 0
         15 0 0 0 0 0 0 0 0 1 0 0 0 0 0 0 0
         14 0 0 0 0 0 0 0 0 1 0 0 0 0 0 0 0
         13 0 0 0 0 0 0 0 0 1 0 0 0 0 0 0 0
         12 0 0 0 0 0 0 0 1 0 0 0 0 0 0 0 0
         11 0 0 0 0 0 0 0 1 0 0 0 0 0 0 0 0
         10 0 0 0 0 0 0 0 1 0 0 0 0 0 0 0 0
  ROW
 NUMBER   9 0 0 1 1 1 1 1 1 1 1 1 1 1 0 0 0
          8 0 0 0 0 0 0 1 0 0 0 0 0 1 0 0 0
          7 0 0 0 0 0 0 1 0 0 0 0 1 0 0 0 0
          6 0 0 0 0 0 1 0 0 0 0 0 1 0 0 0 0
          5 0 0 0 0 0 1 0 0 0 0 0 1 0 0 0 0
          4 0 0 0 0 1 0 0 0 0 0 1 0 0 0 0 0
          3 0 0 0 0 1 0 0 0 0 0 1 0 0 0 0 0
          2 0 0 0 1 0 0 0 0 0 0 1 0 0 0 0 0
          1 1 1 1 1 1 1 1 1 1 1 1 1 1 1 1 1
```

FIG. 5

EXAMPLE OF MAPPING BY CONVENTIONAL FRAME BUFFER
1024 PIXELS IN X DIRECTION, 512 PIXELS IN Y DIRECTION, 1 BYTE/PIXEL

INSIDE A THICK BORDER LINE CORRESPONDS TO THE SAME ROW ADDRESS

→ X DIRECTION

↓ Y DIRECTION

| 0 | 1 | 2 | ... | 61 | 62 | 63 | ... | ... | 1023 |
|---|---|---|---|---|---|---|---|---|---|
| 1024 | | | | | | 1087 | | | 2047 |
| 2048 | | | | | | 2111 | | | 3071 |
| ⋮ | | | | | | ⋮ | | | ⋮ |
| 29696 | | | | | | 62527 | | | 30719 |
| 30720 | | | | | | 63551 | | | 31743 |
| 31744 | 31745 | 31746 | ... | 31805 | 31806 | 31807 | ... | ... | 32767 |
| ⋮ | | | | | | ⋮ | | | ⋮ |
| ⋮ | | | | | | ⋮ | | | ⋮ |
| 523264 | 523265 | 523266 | ... | 523325 | 523326 | 523327 | ... | ... | 524287 |

FIG. 6

EXAMPLE OF PHYSICAL MAPPING IN FRAME BUFFER 172
1024 PIXELS IN X DIRECTION, 512 PIXELS IN Y DIRECTION, 1 BYTE/PIXEL
(YS=5, XS=6)

INSIDE A THICK BORDER LINE CORRESPONDS TO THE SAME ROW ADDRESS

→ X DIRECTION

↓ Y DIRECTION

| 0 | 1 | 2 | ... | 61 | 62 | 63 | ... | ... | 30783 |
|---|---|---|---|---|---|---|---|---|---|
| 64 | | | | | | 127 | | | 30847 |
| 128 | | | | | | 191 | | | 30911 |
| ⋮ | | | | | | ⋮ | | | ⋮ |
| 1856 | | | | | | 1919 | | | 32639 |
| 1920 | | | | | | 1983 | | | 32703 |
| 1984 | 1985 | 1986 | ... | 2045 | 2046 | 2047 | ... | ... | 32767 |
| ⋮ | | | | | | ⋮ | | | ⋮ |
| ⋮ | | | | | | ⋮ | | | ⋮ |
| 493504 | 493505 | 493506 | ... | 493565 | 493566 | 493567 | ... | ... | 524287 |

FIG. 13

DATA STORAGE 1332

| ADDRESS ($\|\Delta X\|, \|\Delta Y\|$) | IDENTICAL SIGN PORTION | | | ADDRESS ($\|\Delta X\|, \|\Delta Y\|$) | OPPOSITE SIGN PORTION | | |
|---|---|---|---|---|---|---|---|
|  | 0 | 0 | 0 |  | 0 | 0 | 0 |
|  | 0 | 0 | 0 |  | 0 | 0 | 0 |
| (0,0) | 1 | 0 | 0 | (0,0) | 1 | 0 | 0 |
|  | 0 | 0 | 0 |  | 0 | 0 | 0 |
|  | 1 | 0 | 0 |  | 1 | 0 | 0 |
| (0,1) | 1 | 0 | 0 | (0,1) | 1 | 0 | 0 |
|  | 1 | 0 | 0 |  | 1 | 0 | 0 |
|  | 1 | 0 | 0 |  | 1 | 0 | 0 |
| (0,2) | 1 | 0 | 0 | (0,2) | 1 | 0 | 0 |
|  | 0 | 0 | 0 |  | 0 | 0 | 0 |
|  | 0 | 0 | 0 |  | 0 | 0 | 0 |
| (1,0) | 1 | 1 | 0 | (1,0) | 1 | 1 | 0 |
|  | 0 | 0 | 0 |  | 0 | 0 | 0 |
|  | 0 | 1 | 0 |  | 1 | 0 | 0 |
| (1,1) | 1 | 0 | 0 | (1,1) | 0 | 1 | 0 |
|  | 0 | 1 | 0 |  | 0 | 1 | 0 |
|  | 0 | 1 | 0 |  | 0 | 1 | 0 |
| (1,2) | 1 | 0 | 0 | (1,2) | 0 | 0 | 1 |
|  | 0 | 0 | 0 |  | 0 | 0 | 0 |
|  | 0 | 0 | 0 |  | 0 | 0 | 0 |
| (2,0) | 1 | 1 | 1 | (2,0) | 1 | 1 | 1 |
|  | 0 | 0 | 0 |  | 0 | 0 | 0 |
|  | 0 | 1 | 1 |  | 1 | 1 | 0 |
| (2,1) | 1 | 0 | 0 | (2,1) | 0 | 0 | 1 |
|  | 0 | 0 | 1 |  | 1 | 0 | 0 |
|  | 0 | 1 | 0 |  | 0 | 1 | 0 |
| (2,2) | 1 | 0 | 0 | (2,2) | 0 | 0 | 1 |

FIG. 24

MAIN MEMORY OR 4TH MEMORY

IDENTICAL SIGN PORTION

| ADDRESS ($|\Delta X|, |\Delta Y|$) | | | |
|---|---|---|---|
| | ⋮ | | |
| | 0 | 0 | 0 |
| | 0 | 0 | 0 |
| (0,0) | 1 | 0 | 0 |
| | 0 | 0 | 0 |
| | 1 | 0 | 0 |
| (0,1) | 1 | 0 | 0 |
| | 1 | 0 | 0 |
| | 1 | 0 | 0 |
| (0,2) | 1 | 0 | 0 |
| | 0 | 0 | 0 |
| | 0 | 0 | 0 |
| (1,0) | 1 | 1 | 0 |
| | 0 | 0 | 0 |
| | 0 | 1 | 0 |
| (1,1) | 1 | 0 | 0 |
| | 0 | 1 | 0 |
| | 0 | 1 | 0 |
| (1,2) | 1 | 0 | 0 |
| | 0 | 0 | 0 |
| | 0 | 0 | 0 |
| (2,0) | 1 | 1 | 1 |
| | 0 | 0 | 0 |
| | 0 | 1 | 1 |
| (2,1) | 1 | 0 | 0 |
| | 0 | 0 | 1 |
| | 0 | 1 | 0 |
| (2,2) | 1 | 0 | 0 |
| | ⋮ | | |

OPPOSITE SIGN PORTION

| ADDRESS ($|\Delta X|, |\Delta Y|$) | | | |
|---|---|---|---|
| | ⋮ | | |
| | 0 | 0 | 0 |
| | 0 | 0 | 0 |
| (0,0) | 1 | 0 | 0 |
| | 0 | 0 | 0 |
| | 1 | 0 | 0 |
| (0,1) | 1 | 0 | 0 |
| | 1 | 0 | 0 |
| | 1 | 0 | 0 |
| (0,2) | 1 | 0 | 0 |
| | 0 | 0 | 0 |
| | 0 | 0 | 0 |
| (1,0) | 1 | 1 | 0 |
| | 0 | 0 | 0 |
| | 1 | 0 | 0 |
| (1,1) | 0 | 1 | 0 |
| | 0 | 1 | 0 |
| | 0 | 1 | 0 |
| (1,2) | 0 | 0 | 1 |
| | 0 | 0 | 0 |
| | 0 | 0 | 0 |
| (2,0) | 1 | 1 | 1 |
| | 0 | 0 | 0 |
| | 1 | 1 | 0 |
| (2,1) | 0 | 0 | 1 |
| | 1 | 0 | 0 |
| | 0 | 1 | 0 |
| (2,2) | 0 | 0 | 1 |
| | ⋮ | | |

KANJI "五" AS DRAWN WITHOUT TRANSPARENT PROCESSING

KANJI "五" AS DRAWN WITH TRANSPARENT PROCESSING

FIG. 35
TRANSFER COUNT=16, bound 0
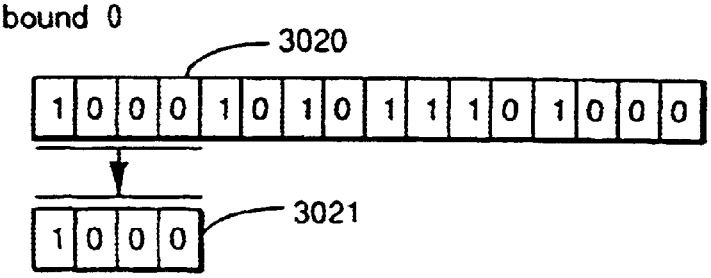
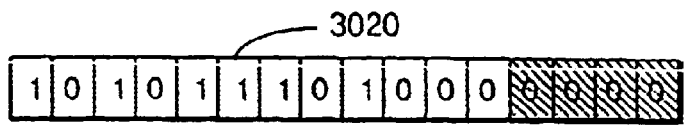
FIG. 36
TRANSFER COUNT=16, bound 2
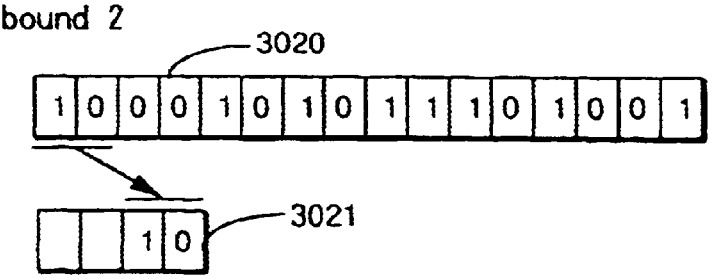
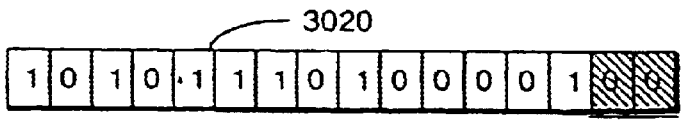

16<TRANSFER COUNT<3, bound 0

TRANSFER COUNT<3, bound 2

FIG. 40

| | | | | |
|---|---|---|---|---|
| CLT0 | CL0 | CL0 | CL0 | CL0 |
| CLT1 | CL0 | CL0 | CL0 | CL1 |
| CLT2 | CL0 | CL0 | CL1 | CL0 |
| CLT3 | CL0 | CL0 | CL1 | CL1 |
| CLT4 | CL0 | CL1 | CL0 | CL0 |
| CLT5 | CL0 | CL1 | CL0 | CL1 |
| CLT6 | CL0 | CL1 | CL1 | CL0 |
| CLT7 | CL0 | CL1 | CL1 | CL1 |
| CLT8 | CL1 | CL0 | CL0 | CL0 |
| CLT9 | CL1 | CL0 | CL0 | CL1 |
| CLT10 | CL1 | CL0 | CL1 | CL0 |
| CLT11 | CL1 | CL0 | CL1 | CL1 |
| CLT12 | CL1 | CL1 | CL0 | CL0 |
| CLT13 | CL1 | CL1 | CL0 | CL1 |
| CLT14 | CL1 | CL1 | CL1 | CL0 |
| CLT15 | CL1 | CL1 | CL1 | CL1 |

CL0: DATA OF MULTIVALUE DATA 0
CL1: DATA OF MULTIVALUE DATA 1

FIG. 41

| | | | | |
|---|---|---|---|---|
| MST0  | $00 | $00 | $00 | $00 |
| MST1  | $00 | $00 | $00 | $FF |
| MST2  | $00 | $00 | $FF | $00 |
| MST3  | $00 | $00 | $FF | $FF |
| MST4  | $00 | $FF | $00 | $00 |
| MST5  | $00 | $FF | $00 | $FF |
| MST6  | $00 | $FF | $FF | $00 |
| MST7  | $00 | $FF | $FF | $FF |
| MST8  | $FF | $00 | $00 | $00 |
| MST9  | $FF | $00 | $00 | $FF |
| MST10 | $FF | $00 | $FF | $00 |
| MST11 | $FF | $00 | $FF | $FF |
| MST12 | $FF | $FF | $00 | $00 |
| MST13 | $FF | $FF | $00 | $FF |
| MST14 | $FF | $FF | $FF | $00 |
| MST15 | $FF | $FF | $FF | $FF |

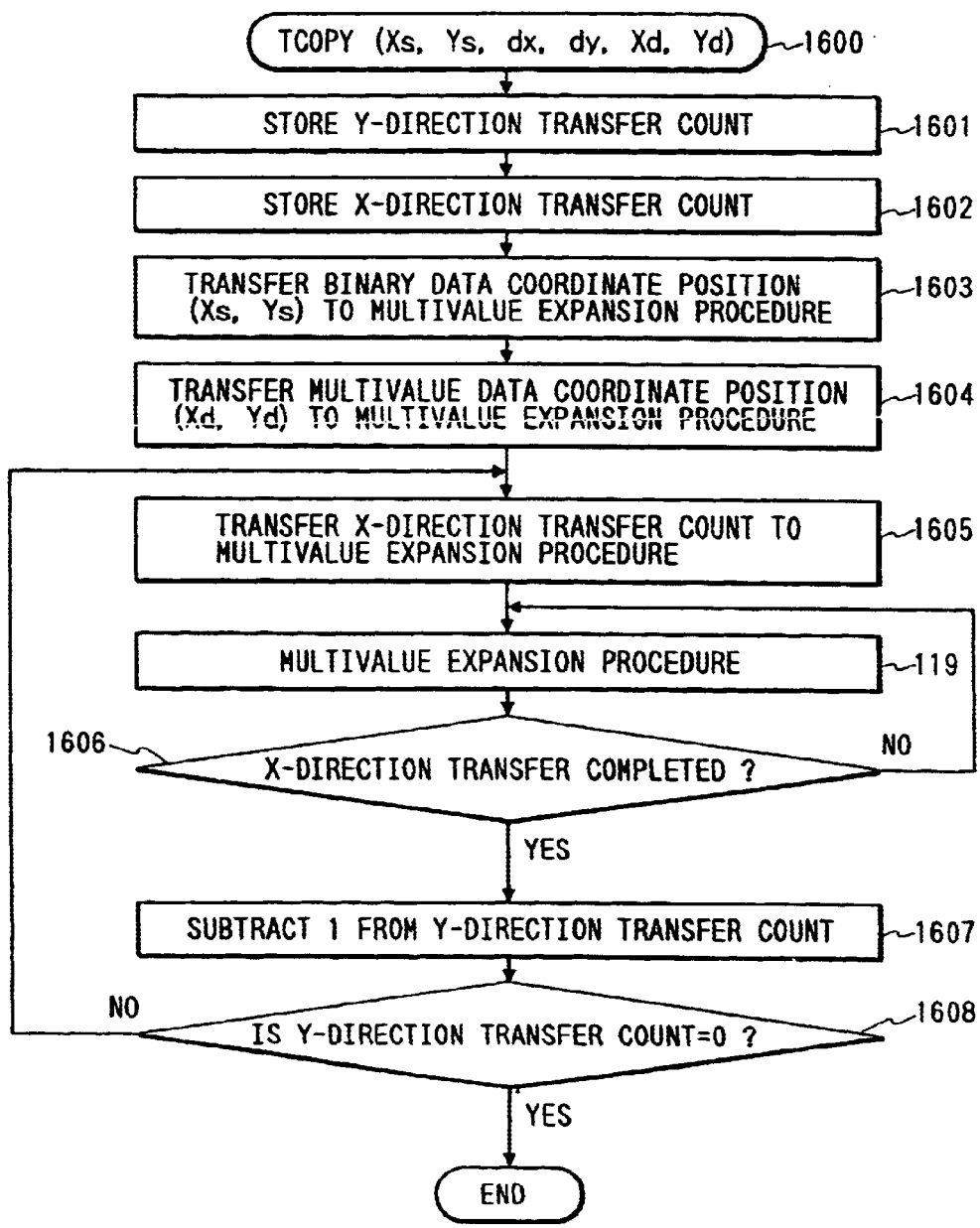

GRAPHICS COMPUTER

This a continuation of application Ser. No. 08/355,517, filed on Dec. 14, 1994, now U.S. Pat. No. 5,771,047.

BACKGROUND OF THE INVENTION

This invention is related to graphics computers that process images to draw graphics data such as characters and graphic elements, and image data processing systems or graphics computers that use such an image processor. Especially, this invention is related to an image data processing system that expands and processes binary data, including characters, symbols, etc. in a low-price and compact graphics computer, as well as to a memory configuration and control method to shorten the drawing time.

The graphics computer that stores character codes and graphic elements and draws, displays, or prints out graphics data on the basis of such character codes and graphic elements uses frame buffers to store the graphic data corresponding to pixels to be displayed on a screen (hereafter, to be referred to as pixel data).

When drawing graphics data, drawing processings and display processings are needed. The drawing processing includes computing pixel positions and pixel data itself from character codes and graphic elements and writing the pixel data in a frame buffer according to the pixel positions. The display processing includes repetitive and sequential reading of pixel data from the frame buffer corresponding to the pixels displayed on the screen synchronously with the raster scanning in the display device to display stable images on the screen.

In this section, the conventional technology related to display data will be explained first. In order to reduce the price of a graphics computer, a well-known method involves adopting a configuration in which a frame buffer is arranged in a large capacity main memory. Such a technique is disclosed as part of the graphics processing system described in Japanese Patent Laid-Open No. 84192/1992, and by the display architecture designed by Robert P. Colwell and described in "IEEE 1st International Conference on Computer Workstation", (pp.30–37) (November, 1985), which is a scientific journal published in the United States. In those devices, a high access mode for a DRAM, etc. is used as a memory for the display, reducing the display processing load. In other words, the horizontal direction of the frame buffer is aligned with the direction of the column addresses in the DRAM, etc.

When drawing pixel data, however, accesses to addresses of different rows are often obtained in the frame buffer even for continuous pixels in the 2-dimensional coordinate system. For example, when drawing a line which is almost vertical, the access addresses are separated from each other by as much as the width of the frame buffer horizontal memory even when they are adjacent in the 2-dimensional coordinate system. At present, the main current of the display format for personal computers is 640 pixels in the horizontal direction by 480 pixels in the vertical direction, and one byte is assigned per pixel, but the number of bytes per pixel is changed now to 4 bytes. In other words, the horizontal memory width is 640 bytes or 2560 bytes. The column address width for a DRAM, etc. is 1 KB to 4 KB. Since both are almost the same in size, addresses of different rows are often accessed for the vertical two consecutive pixels. The high speed access mode is effective only for accessing addresses of the same row. The conventional technology may not be enough therefore to speed up the access satisfactorily for drawing. (1st conventional technology)

As for the line drawing method among drawing processings, a method to find an equation to represent a line between two points from two coordinate points and find a coordinate point between the two points using an equation is described on pages 443 to 446 in "Computer Graphics" (published in 1984) written by James D. Foly and Andries Van Dam, and translated by Atsumi Imamiya. (2nd conventional technology)

An embodiment of a high speed line drawing system is also described in Japanese Patent Laid-Open No. 200087/1982. (3rd conventional technology) According to this system, coordinates for drawing are found by reading the vector data represented by the increment of the Y coordinate when the X coordinate is increased by one. The vector data is expanded to dots beforehand and the result is stored in a vector data storage, and storing addresses are computed from the coordinates of start and end points. Another method is also described in Japanese Patent Laid-Open No. 200087/1982. According to this method, vector data is expanded to dots beforehand and then stored in the vector data storage, and storing addresses are computed from the coordinates of start and end points. The coordinates for drawing are then found by reading the vector data represented by the increment of the Y coordinate when the X coordinate is increased by one.

An embodiment of a character drawing system is described in "HD64410 ARTOP Users Manual" (pages 194 to 199) (4th conventional technology). The system draws pixel data in the frame buffer by expanding binary data, such as characters, to multivalue data.

In the above-referenced publication, expansion of binary data represented by "0" and "1" in the format of 16×16 bits, as shown in FIG. 2 therein, to multivalue data is described. This binary data, for example, means character and symbol data (hereafter, to be referred to as character data). A set of such character data is stored in a character generator ROM (CGROM). A character code is assigned to each character and character data is accessed with those character codes.

Therefore, the addresses of the character data, corresponding to the character codes and stored in a memory, can be found by computing numerals according to the characteristics of the arrangement of characters. The correspondence of the character data to such memory addresses may be considered to be represented by a coordinate system comprising 16 pixels in the X direction and 16 pixels in the Y direction, and assuming the point that has row number 1 and column number 1 as the origin, as shown in FIG. 2.

Expansion of binary data to multivalue data is performed by converting character data, represented by k binary data and the addresses of the character data in the CGROM, to multivalue (colored and multigraded) data and its addresses in the frame buffer.

The 5th conventional technology is a method for high speed drawing, which includes binary data mask processings. The method is described in Japanese Patent Laid-Open No. 135162/1993 "Image Processing System".

This conventional technology is related to expansion of binary data to multivalue data and to using multi-colors for display. The method is a little different in handling color elements from the drawing technology mentioned here.

In other words, since RGB color elements are taken into account for display, one pixel comprises 3 elements and more data is handled. As a result, processings become more complex than those of the basic technology for multivalue expansion.

In this invention, however, the same concept as the multivalue expansion to be performed for drawing can be assumed by considering the technology as applied to one color element.

This invention is featured by using a RAM to store multivalue data corresponding to "1" in binary data. In this RAM is stored expanded data for plural pixels. With this, plural pixels can be processed concurrently to speed up the expansion processing.

The multivalue expansion processing is carried out by masking the multivalue data for the number of pixels stored in the RAM corresponding to "0" in binary data.

SUMMARY OF THE INVENTION

According to the 1st conventional technology, the access to the frame buffer is often for addresses of different rows in memory. And, the high speed memory access mode is allowed only within the addresses of the same row. Therefore, the access time may not be speeded up enough for drawing pixel data in the same conventional technology.

According to the 2nd conventional technology, no sufficient consideration is given to line length for drawing, and equations to compute coordinate points must be found regardless of the line length. The processing to find the equation so compute these coordinate points must be programmed using combinations of many instructions.

Therefore, when drawing a short line, the processing time to compute those equation becomes longer than the drawing time. Furthermore, according to the 3rd conventional technology, the technology is effective to draw a line at high speeds, but the vector data capacity is not considered sufficiently. Thus, a problem arises from the vector data storage capacity, of which more is needed.

According to the 4th conventional technology, every pixel data for a character code is expanded to multivalue data individually. This is why it is impossible to process pixel data at high speeds.

In the speeding-up method of the 5th conventional technology, the data corresponding to "0" in binary data is always masked and it is not converted to a specific color. The method cannot cope with draw processings without mask processing, and it cannot draw the background of a character, as shown in FIG. 5.

If, when this speeding-up method is applied to a system that uses a CPU, memory access is restricted for writing the result of concurrently expanded plural pixels in the frame buffer, then the following problem will arise.

One problem is that memory access restriction may be needed, since the CPU must speed up its internal processings.

This memory access restriction, as described on pages 94 to 97 of "Computer Architecture A Quantitative Approach", means that when a memory is accessed in words or long words, the addresses must be even numbers or multiples of 4. The standard unit to access a memory is bytes.

For example, when data is written in the frame buffer in long words, the address of the destination must be a multiple of 4. In other cases, writing is allowed only with a smaller size.

The first purpose of this invention is to reduce the size and price of the subject graphics computer, as well as to shorten the drawing time. Especially, it is to speed up the access to the frame buffer arranged in the main memory when drawing pixel data by making good use of the high speed access mode of the main memory comprising a DRAM, etc., although such a memory configuration has not been considered so far. (This corresponds to the 1st conventional technology.)

In the means to achieve the first purpose of this invention, the addresses of the same row in the general-purpose area in the main memory can be handled as continuous addresses from a CPU or DMAC, since registers and an address converter are provided. On the other hand, the addresses of the same row in the frame buffer are arranged two-dimensionally when viewing them from the CPU or DMAC. Thus, the pixels continued in the vertical direction can be accessed within the addresses of the same row. CPU programs and arithmetic operation data that are often continued one-dimensionally therefore can be stored in the general-purpose area, while graphics pixel data that is often continued two-dimensionally can be stored in the frame buffer so that accesses for both drawing and other purposes can be speeded up significantly.

In the means to achieve a 2nd purpose of this invention, either the method with which the drawing method control unit draws pixel data using the data stored in the data storage according to the coordinate values of the start and end points of the subject line, or the method to draw pixel data by computing the equation to compute the coordinate values of the subject line, can be selected to reduce the storage capacity and speed up the drawing of the line.

In the means to achieve a 3rd and other purposes of this invention, plural pixels can be expanded to multivalue data and processed for drawing concurrently by selecting the multivalue and mask patterns held beforehand in the multivalue pattern storage and the mask pattern storage according to the condition to expand binary data for extracted plural pixels to multivalue data and the target pixel data position. Accordingly, increasing of the number of steps in programs can be suppressed, speeding up the processings significantly.

BRIEF DESCRIPTION OF DRAWINGS

The invention will be more particularly described with reference to the accompanying drawings, in which:

FIG. 2 is an example of binary data;

FIG. 5 is a diagram representing an example of conventional frame buffer mapping;

FIG. 6 is a diagram representing an example of frame buffer physical mapping;

FIG. 13 is a diagram showing an example of vector data in a data storage;

FIG. 24 is a diagram showing vector data address space allocation in an embodiment;

FIG. 35 is a diagram showing an example of plural pixel extract;

FIG. 36 is a diagram showing another example of plural pixel extract;

FIG. 40 is a diagram showing an example of multivalue pattern storage;

FIG. 41 is a diagram showing an example of a mask pattern storage;

FIG. 46 is a flow diagram showing a processing for multivalue expansion drawing by a CPU.

PREFERRED EMBODIMENT

Figure 1:
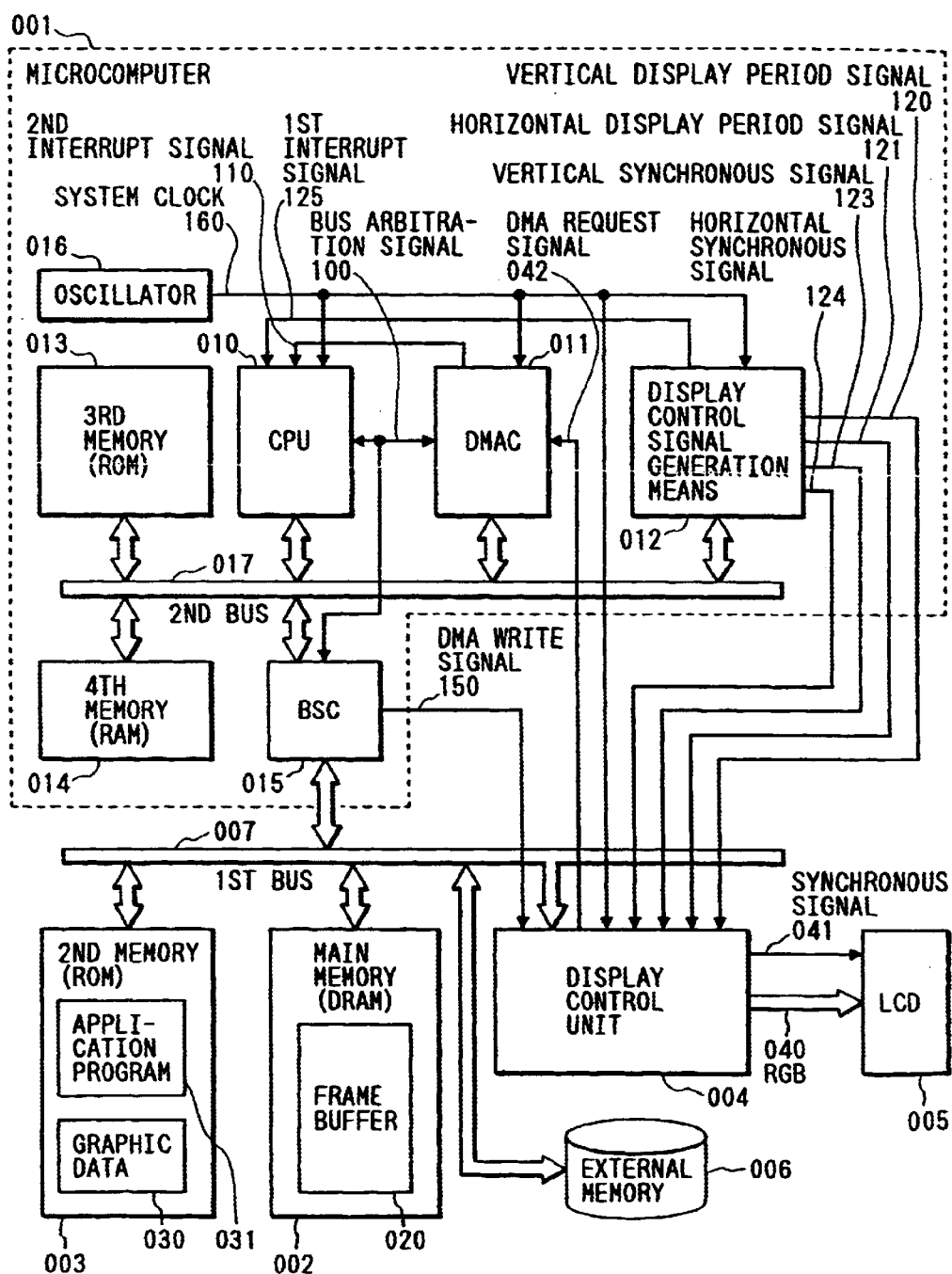
FIG. 1 is a schematic block diagram of a graphics computer forming an example of the invention.

FIG. 1 shows an embodiment of this invention which results in a graphic computer of reduced size and reduced drawing time.

The graphic computer described in this embodiment comprises a 20 MHz microcomputer 001; a 16-bit data width main memory 002 (DRAM) that integrates frame buffers 020; and 16-bit data width 2nd memory 003 (ROM) used to store application program 031 and graphic data 030; a display control unit 004 used to control display so that draw data can be displayed on an LCD 005; and external memory 006 comprising a CD-ROM unit or hard disk unit used to store mass graphic data and application programs; and the LCD display 005 (320×240 pixels) whose synchronization timing conforms to the TV NTSC system.

In FIG. 1, the liquid crystal display 005 is abbreviated as an LCD, which will be referred to in this way hereafter.

Although an LCD 005 is used as a display unit of the said graphic computer, it may be replaced with a raster scanning type display, such as a cathode-ray tube, without changing its real nature.

The microcomputer 001 comprise a CPU 010, which serves as an operation means; a 16-bit data width 3rd memory 013 (ROM) used to store display control procedures; a 16-bit data width 4th memory 014 (RAM); a direct memory access controller 011 used to read pixel data from the frame buffer 020 and to transfer the data to the display control unit 004; a display control signal generating means 012 used to generate display signals to synchronize with the LCD 005; a bus controller 015 that connects the 2nd bus 017, which is an internal bus of the computer 001, and the 1st bus 007, which is an external bus; and an oscillator 016 that generates the system clock 160. In FIG. 1, the direct memory access controller 011 and the bus state controller 015 are abbreviated as DMAC and BSC, respectively. Hereafter, they will be referred to by these acronyms.

Hereafter, how a drawing will be done in this embodiment will be explained.

The CPU 010 serves as an operation means that executes an application program and generates graphic data, such as characters and graphic elements, according to the requests from the application program. The CPU 010 executes arithmetic operations for the pixel positions and pixel data stored in the frame buffer 020 according to the plotting procedure stored in the 3rd memory 013 and the graphic data comprising characters and graphic elements provided from the subject application program, and then writes the pixel data in the pixel positions through the BSC 015 and the 1st bus 007.

The BSC 015, which is connected to the 2nd bus 017 and the 1st bus 007, multiplexes row addresses and column addresses and generates bus control signals, such as a column address strobe and a row address strobe, to connect the main memory 002 that comprises the said DRAM to the microcomputer 001 directly through the 1st bus 007. Furthermore, the CPU 010 compares the row address in the previous accessing of the main memory 002 with the row address in the current accessing to detect an access that can use the high speed page mode automatically and generates an access in the high speed page mode automatically. This BSC 015 has enabled for automatic access to the main memory 002 or the frame buffer 020 in the high speed page mode without adding any logical means. This embodiment, which has also made it possible to change the method of accessing the frame buffer according to a draw coordinate system to be explained later, is mainly concerned with the BSC 015 function.

The 3rd memory 013 stores the draw procedures 131.

These procedures, called from the subject application program, are fetched and executed in the CPU 010 sequentially through the 2nd bus 017. The CPU 010 draws graphic and character elements in the frame buffer and generates display control signals by executing these procedures.

Figure 3:
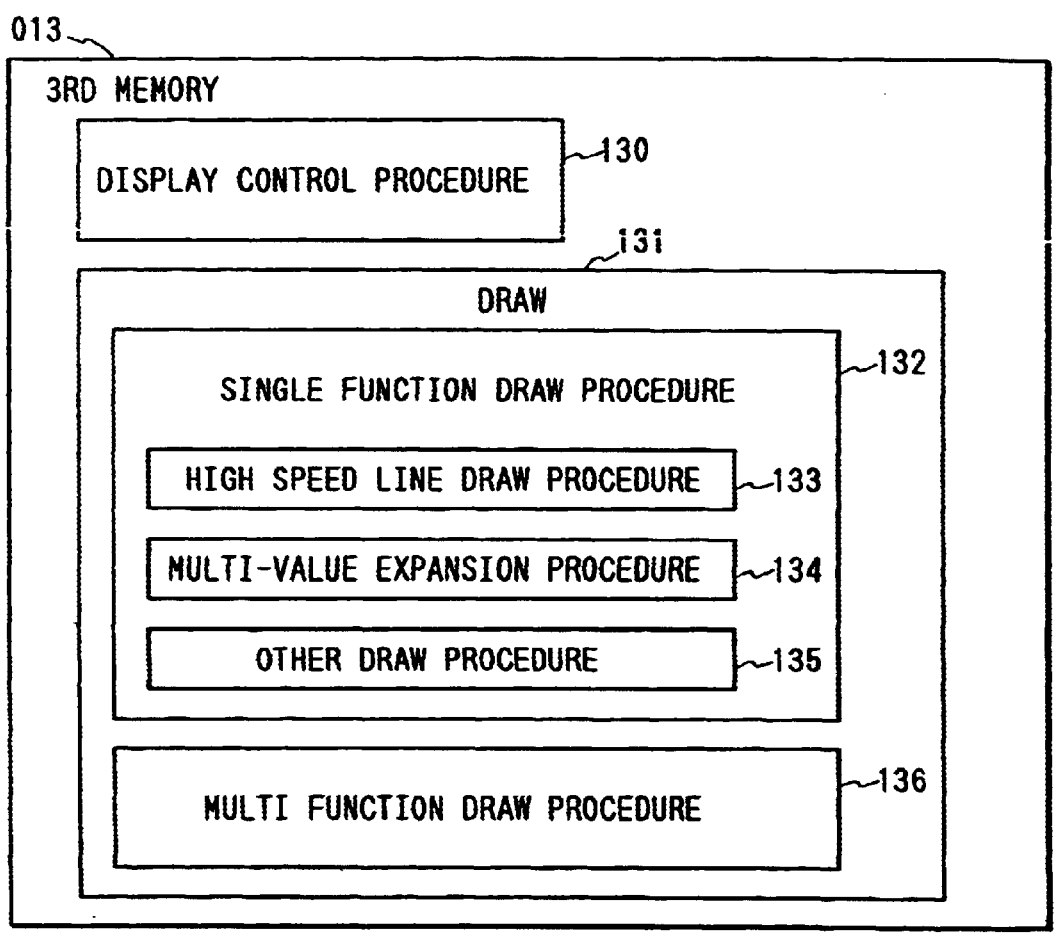
FIG. 3 is a diagram of the external configuration of a 3rd memory.

FIG. 3 shows how data is stored in the 3rd memory 013.

The display control procedure 130 calculates the number of notices to end the transfer operation of the DMAC 011 and judges according to this notice count whether or not the raster with which the DMAC has ended the transfer operation is the last one in the vertical direction on the LCD 005 screen.

If it is not the last one, the DMAC 011 is initialized. This initialization means that the next start address, the number of words to be transferred corresponding to the pixel data for one raster, and the DMAC 011 are set in the status waiting for the DMA request signal 042. If the frame buffer 020 matches with the LCD 005 in size, the source address of the DMAC 011 is counted up for each access. In this case, there is no need to set the start address of the next raster as a source address. It is already generated.

On the other hand, if the notice count indicates the last raster, the notice count is cleared, and the start address of the first raster, the number of words to be transferred corresponding to the pixel data for one raster, and the DMAC 011 are set in the status waiting for the DMA request signal 042. When the CPU 010 executes the above procedures sequentially, it becomes possible to scan the frame buffer 020 in the vertical direction. With the vertical scanning of the frame buffer 020 by software, the price of the graphic computer can be reduced significantly. When the frame buffer 020 is widened more than the screen of the LCD 005 and the display control procedure 130 is used, scroll processing can be performed smoothly. In general, it is known that scroll processing can be performed by moving the display area in the frame buffer step by step repetitively. Since the display control procedure 130 is used to specify the start addresses of rasters, those addresses are changed gradually to smooth the scroll processing in this invention.

The pixel data for a raster is transferred to the display control unit 004 at the timing synchronized with the horizontal scanning of the LCD 005. The pixel data is then converted to analog RGB signals 040 in the display control unit 004 and output to the LCD 005.

The drawing procedure 131 comprises two or more procedures, each of which is independent and corresponds to a pattern element. They are classified into single function procedures 132 and multiple function procedures 136.

The multiple function procedures 136 are used to draw graphic elements according to the attribute specified by the subject application program corresponding to each graphic element. For this purpose, attributes must be judged and processings must be branched and executed according to the result of each judgment. The single function procedures 132 are used to draw graphic elements according to the specific attribute corresponding to each graphic element, not according to the specified attributes.

Attributes which appear very frequently in each graphic element are used as these specific attributes. The details will be explained later. For example, the specific attributes are those that are used very frequently for points, lines, and filled-in rectangular areas, and only a single color is used for them and they are overwritten on graphic elements already drawn. For such attributes, it is not necessary to change toe color and compute between the background pixel data and the pixel data to write. In other words, when the single function procedure 132 is used, the drawing can be performed simply by writing computed pixel data to the computed pixel position. Since the processings of attributes can be eliminated in this way, the single function procedure 132 becomes faster than the multiple function procedures 136.

In addition, this embodiment includes the high speed line draw procedures 133 that is specifically used to draw lines and the multiple values processing procedures 134 that processes multiple values at high speeds. The procedures can therefore be classified into three types including the draw procedure 135 from which the attribute processing is excluded.

In spite of the description above, a few attributes must be specified for drawing some graphic elements, for example, when drawing a broken line. Such a case will be explained below. When drawing a broken line, the line is specified for the attribute that controls solid lines and broken lines. Then, the data that specifies the broken line pitch is specified and the multiple function procedure 136 is executed. This attribute is called a line style and the data that specifies the broken line pitch is called a line style pattern. In this case, since a judgment is made to determine whether to write pixel data for each pixel corresponding to the selected line style pattern, the processing time becomes longer than that of the single function procedure 132. As mentioned above, both the single function procedures 132 that process simple attributes used very frequently at high speeds and the multiple function procedure 136 that processes complex attributes are provided in this embodiment to shorten the drawing time, while retaining the general purpose properties of the graphics computer.

The multi-function procedure 136 and single function procedure 132 are built up as a graphics library that can be called form the subject application program described with a high class language. The high class language conforms to the C language standardized by ANSI. When drawing is possible only with the single function procedure 132, there is no need to connect the general purpose multi-function procedure 136 to the application program. In such a case, the capacity of the 3rd memory 013 can be saved. When the single function procedure 132 is not needed, there is no need to connect it to the application program. In such a case, the capacity of the 3rd memory 013 can also be saved.

In the example of vehicle navigation that uses this invention, which will be explained later, only a few procedures among the draw procedures for various graphic elements that belong to the single function procedure 132 are used. Therefore, only a few procedures are connected to the application program, and the application program is also stored in the 3rd memory 013. Draw procedures are provided for each graphic element in this way, and both the multi-function procedure 136 and the single function procedure 132 are provided for attributes of graphic elements, so that only necessary draw procedures can be connected to the application program, so as to reduce the capacity of the memory used for the graphics computer and reduce the price of the graphics computer.

In this section, another embodiment of the draw procedures will be explained, leaving the embodiment shown in FIG. 1 for a while.

Another embodiment of the draw procedures has a configuration in which a procedure is provided for each graphic element. In this configuration, the single function procedure 132 is included in the multi-function procedure 136. In this case, the attribute specified for the subject graphic element is judged and when it matches the said specific attribute, the single function procedure 132 is started. Also, in this execution form, the drawing time can be shortened corresponding to the graphic element attribute. Furthermore, since one procedure is provided for each graphic element, the number of draw procedures can be reduced so that the application programmer can understand the graphic library easily. In addition, since drawing is performed according to specified attributes, the application program can be debugged more easily. And, attributes of graphic elements are often already defined when the application program is created. Thus, judging specific attributes in the draw procedures as in this embodiment becomes a redundant processing when viewing it from the programmer's viewpoint. In other words, the drawing time cannot be shortened enough when compared with that of the embodiment shown in FIG. 1.

Now we return to FIG. 1.

The DMAC 011 reads the pixel data for a raster continuously from the frame buffer 020 through the 2nd bus 017, the BSC 015, and the 1st bus 007, according to the DMA request signal 042 synchronized with the horizontal scanning of the LCR 005, and transfers the data to the display control unit 004. At this time, the DMAC 011 issues the bus arbitration signal 100 to the BSC 015 to request an access to the 2nd bus. In response to this request, the BSC 015 stops the CPU 010, and gives the DMAC 011 the bus access right.

Given the bus access right, the DMAC 011 issues read access signals continuously to read the specified number of pixels beginning at the start address of the raster set by the CPU 010 beforehand. Since two or more pixels can be obtained by an access, the number of read accesses becomes a value obtained by dividing the number of pixels of a raster by the number of pixels included in a word. In this embodiment, for example, since the 1st bus data is 16 bits in width and the pixel data comprises 8 bits (256 colors displayed at a time), one word contains 2 pixels. And since a raster (a row in the horizontal direction) of both the frame buffer 020 and the LCD 005 comprises 320 pixels, it is accessed 160 times.

The BSC 015 can access the DRAM instead of accessing a specific address space according to the setting. In this embodiment, a dram is used as the main memory 002 that includes the frame buffer 020 to reduce the price of the memory. Therefore, the main memory 002 is arranged in the specific address space and the BSC 015 is set so that it may access the DRAM instead of accessing this address space. The CPU 010 executes this setting under the control of the application program.

The BSC 015 multiplexes the addresses issued by the DMAC 011 to row and column addresses and executes the DRAM random read cycle for the 2st bus 007. If the column address matches that of the preceding DRAM access, a high speed page cycle is executed. In addition, since the access is performed by the DMAC 011, the BSC 015 generates the DMA write signal 150 and writes the pixel data read from the frame buffer 020 in the display control unit 004 during the read access cycle.

The time used to access the DRAM (262144 words×16 bits) used in this embodiment is 80 nsec and the cycle time is 150 nsec. The number of words in addresses of the same row is 512. The system clock 160 is 20 MHz. S, the BSC 015 is set so that 4 clocks may be assumed for a random access in which the DRAM access cycle is used from a row address and 2 clocks for a high speed page access. The CPU 010 executes this setting under the control of the application program.

In the first access to a raster, the DRAM row addresses often differ from those in the previous access, so that it becomes a random access. A row address may also be changed during a continuous access to a raster. Since 512 words exist in the addresses of a row and 160 words are accessed for a raster, this row address change is done once at the most. And, at the most, a refresh cycle is also included in the transfer or a raster. The number of cycles required to access a raster entirely thus becomes 322 to 326 cycles. The accessing time becomes 16.1 msec to 16.3 msec. The average access time is 16.2 msec. The time to occupy the 1st bus per second becomes a value obtained by multiplying the access time per raster by the number of rasters on a screen (number of pixels in the vertical direction) and further multplying the result by the vertical synchronous frequency. The number of rasters on a screen is 240. since the LCD 005 conforms to the TV NTSC system, the vertical synchronous frequency is 59.9 Hz. From these properties, the time needed to occupy the 1st bus per second becomes 233 msec. When it is converted to the rate of bus occupation, it will become 23.3%.

We will return to FIG. 1 again, explaining the vertical scanning of the frame buffer 020.

Transferring pixel data of a raster from the frame buffer 020 to the display control unit 004, the DMAC 011 notifies the CPU 010 of the end of the transfer through the 2nd interrupt signal 110. The CPU 010 executes the display control procedure 130 stored in the 3rd memory 013 as an interrupt processing.

Next, how each unit is synchronized with other will be explained below.

The display control signal generation means 012 fetches the system clock 160 to generate the horizontal synchronous signal 124, the horizontal display period signal 121, the vertical synchronous signal 123, and the vertical display period signal 120 used to control the horizontal or vertical scanning of the LCD 005. The CPU 010 sets the cycles, phases, and pulse widths of those four PWM signals under the control of the application program. The horizontal synchronous signal 124 is used to indicate the end and the start of a horizontal scanning of the LCD 005. The horizontal display period signal 121 is used to indicate the positions to start and end the display in each horizontal scanning of the LCD 005. The vertical synchronous signal 123 is used to indicate the end of a vertical scanning of the LCD 005 and the start of the next vertical scanning. The vertical display period signal 120 is used to indicate the positions to start and end the display in each vertical scanning of the LCD 005. The display area of the LCD 005 is determined when the horizontal direction display period indicated by the horizontal display period signal 121 matches the vertical direction display period indicated by the vertical display period signal 120.

The display control signal generation means 012, synchronized with the vertical display period signal 120, requests the CPU 010 for an interrupt processing. The request is issued at both the start and end of a vertical display period. In this embodiment, an interrupt processing is requested with the 1st interrupt signal 125. Receiving this interrupt request, the CPU 010 starts up the drawing procedure 131 or display control procedure 130 stored in the 3rd memory 013. With this, any distortion which might occur on the LCD 005 screen during drawing or displaying graphic elements can be reduced. Concretely, the display area is changed by the display control procedure 130 according to the interrupt processing request issued at the end of a vertical display period. This can suppress distortion, such as borderlines, from occurring on the screen of the LCD 005 during smooth scrolling. And, according to the interrupt request issued at the start of a vertical display period, a draw processing whose vertical scanning speed is slower than that of the LCD 005 vertical scanning is started up.

With this, unsightly imperfect patterns can be eliminated during drawing on the screen of the LCD 005.

The filling-in processing for polygons and the copy processing for rectangular areas that belong to the single function procedure 132 are included in such drawing processings. In this embodiment, starting up those drawing processings is synchronized with vertical scanning, and the procedures also are set so that the scanning in those drawing processings may be performed in the same direction as the vertical scanning of the LCD 005. As a result, the scanning in drawing processings never passes the vertical scanning of the LCD 005, and the vertical scanning in drawing processings is not passed by the vertical scanning of the LCD 005.

The basic configuration of this invention is as mentioned above. Hereafter, the configuration to realize the 1st purpose of this invention will be explained more in detail.

Figure 4:
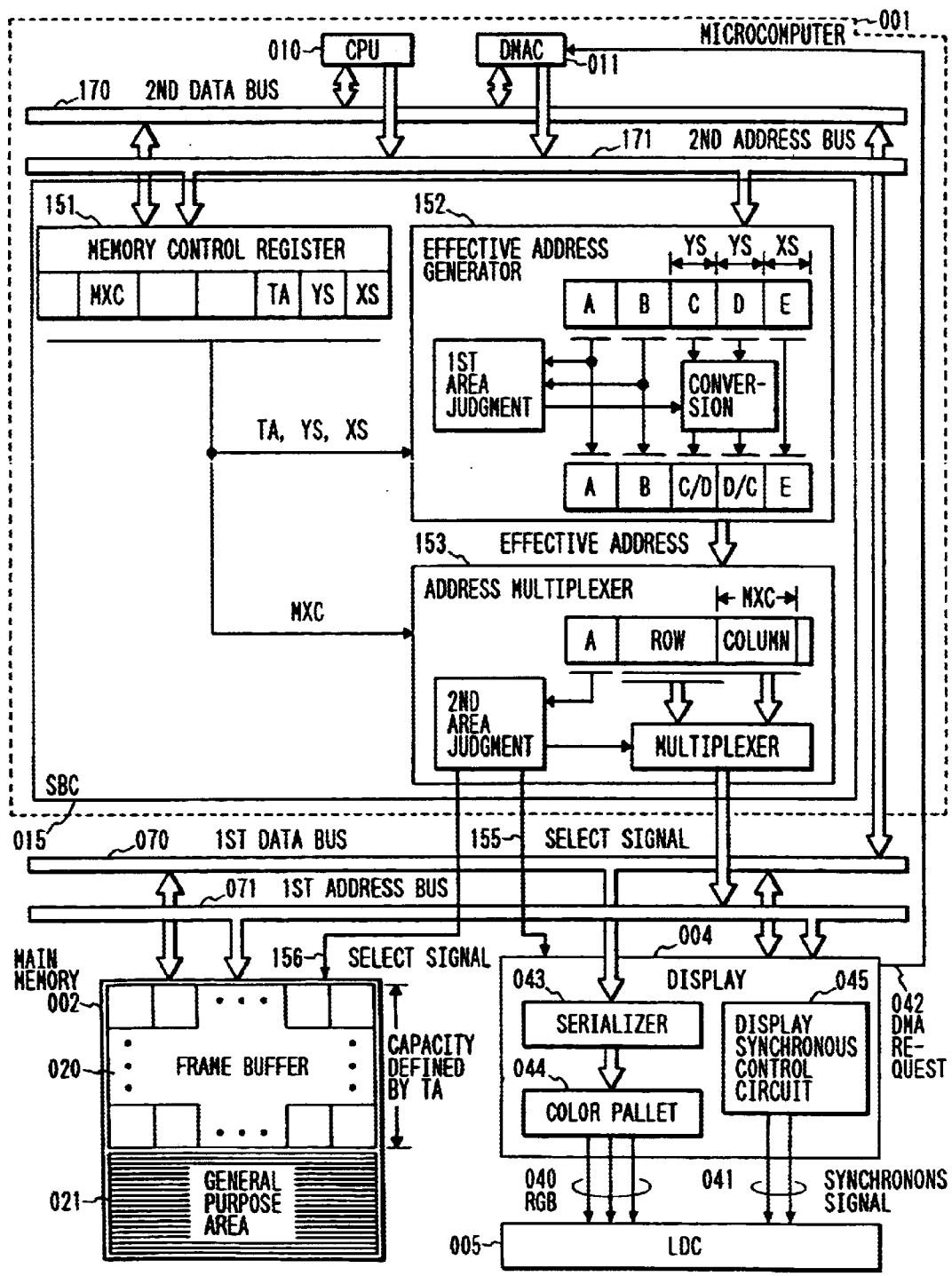
FIG. 4 is a schematic diagram of a graphics computer.

FIG. 4 shows an embodiment of the microcomputer used in this invention that has reduced the graphics computer in size and shortened the drawing time. In FIG. 4, only the configuration items necessary to realize the 1st purpose of this invention are selected from the basic configuration shown in FIG. 1 for more detailed explanation.

The graphics computer used to achieve the 1st purpose of this invention comprises a microcomputer 001; a 16-bit data width main memory 002 that integrates frame buffers 020; and a display control unit 004.

The display control unit 004 stores two or more pixel data items transferred from the main memory in the serializer 043 temporarily and converts them pixel by pixel to color data in the color pallet 044 to output them to the LCD 005 as RGB signals 040. The display control unit 004 generates vertical synchronous signals and horizontal synchronous signals from the display synchronization control circuit and outputs them to the LCD 005, and then synchronizes with horizontal synchronous signals generated from itself to output the DMA request signal 042 to request the microcomputer 001 to transfer data for a raster in the horizontal direction.

The microcomputer 001 comprises a CPU 010, which serves as a computing means; a DMAC 011 that reads pixel data from the frame buffer 020 and transfers the data to the serializer 043 during a display processing; and the 2nd data bus 170 and the 2nd address bus 171, which are internal buses of the microcomputer 001.

The 2nd data bus 170 and the 2nd address bus 171 are 32 bits in width, respectively. They are elements of the 2nd bus 017 shown in FIG. 1.

The 2nd address bus 171 is connected to the 1st address bus 071, which is an external bus, through the effective address generator 152 and the address multiplexer 153 to exchange data with the main memory 002 and the display control unit 004. The 1st address bus 071 is equivalent to the lower 25 bits of the 2nd address bus 171. The 1st data bus 070 and the 1st address bus 071 are elements of the configuration of the 1st bus 007 shown in FIG. 1.

Decoded selection signals 155 and 156 are output to the upper 7 bits of each address. The 2nd data bus 170 is connected to the 1st data bus 070 through a bus buffer or transceiver. The 1st data bus 070 is 32 bits in width. The bus buffer or transceiver are omitted in FIG. 4, since they are not concerned with the essential qualities of this invention.

Data is exchanged among the main memory 002, the display control unit 004, and the microcomputer 001 through the 1st data bus 070 and the 1st address bus 071. Speeding up of the access to the frame buffer 020 and the general-purpose area 021 is achieved by the memory control register 151 and the effective address generator 152 incorporated in the microcomputer.

The memory control register 151 stores the 1st information TA that specifies the frame buffer 020. This 1st information TA is set by the CPU 010 and transferred to the effective address generator 152 to be compared with the field B of the 2nd address bus 171 for the size in the 1st area judgment.

When the address field A indicates the specified space connected to the main memory 002 and the address field B is smaller than the 1st information TA, the address is judged to be the address of the frame buffer 020. At this time, the field C and the field D in the address are exchanged. The number of bits in the address field A is 7, so the maximum capacity of the main memory 002 becomes 33554432 bytes ($2^{25}$). The number of bits in the field B is 9, so the main memory 002 can be set for the frame buffer 020 in units of 65536 bytes ($2^{16}$). The sizes of the fields C and D, as well as the size of the field E are determined by the 2nd information YS and the 3rd information XS of the memory control register 151. Concretely, both the 2nd information YS and the 3rd information XS are used to assign the number of bits necessary for each field. The number of bits in the fields C, D, and E is variable. Thus, the fields B and C may be overlapped with each other in some cases. If the number of overlapped bits is assumed to be n bits (n=YS+YS+X−16), the minimum unit of the frame buffer becomes $2^{16}+n$ practically. When the fields C and D used for the 1st area judgement are exchanged the row addresses of the memory unit are arranged like a 2-dimensional block in the frame buffer while they are kept like a 1-dimensional block in the general purpose area 021. The address multiplexer 153 multiplexes and outputs row and column addresses to the DRAM (main memory 002) according to the 4th information MXC stored in the memory control register 151. At this time, the address multiplexer 153 judges whether or not the address field A is a space in the specified memory 002 and multiplexes the addresses only in the space in which the main memory 002 is put. With this, only the frame buffers in the main memory 002 can be arranged like a 2-dimensional block, allowing the access to pixels during drawing to be speeded up.

Next, an embodiment in which the frame buffer 020 is provided to the conventional main memory will be explained using FIG. 5. In this embodiment, one byte is assigned per pixel in the frame buffer 020. The number of pixels in the X direction is 1024, while the number of pixels in the Y direction is 512. When viewing it from the CPU 010, logical addresses are increased in the X direction. As the logical addresses are increased in the Y direction, they are increased in units of 1024 bytes, which is the memory width. In this embodiment, the main memory 002 uses two DRAMs (256 words×16 bits each) to secure a space of 1 MB. In this case, since 2 KB exist in the addresses of a row, a consecutive access to 2 pixels in the Y direction can be made faster. However, a line in graphics data is about 20 pixels in size on average, addresses of two or more rows are accessed for drawing a line. The addressing would be slow when no measures are taken to speed it up.

To speed it up, therefore, addresses of rows are mapped physically as shown in FIG. 6. As a result, a line comprising up to 32 pixels in the Y direction can be stored within a row, improving the processing speed. In the X direction, 64 pixels are provided continuously. The performance of this invention can also be secured for filling in a rectangle to be scanned horizontally. In this embodiment, the 1st information TA stored in the memory control register 151 is 8, and the 2nd information YS is 5, and the 3rd information XS is 6. This setting is suitable for drawing a line whose direction is free, but for an application program that generates many polygons that are to be filled in, the 3rd information XS should be set greater to improve the speed of access to pixels for filling in. In other words, it is better to change the physical address mapping according to the subject application program. In this invention, the 2nd information YS and the 3rd information XS can be changed so that the configuration of frame buffers can be changed most appropriately to the subject application program even when the same microcomputer is used.

Figure 7:
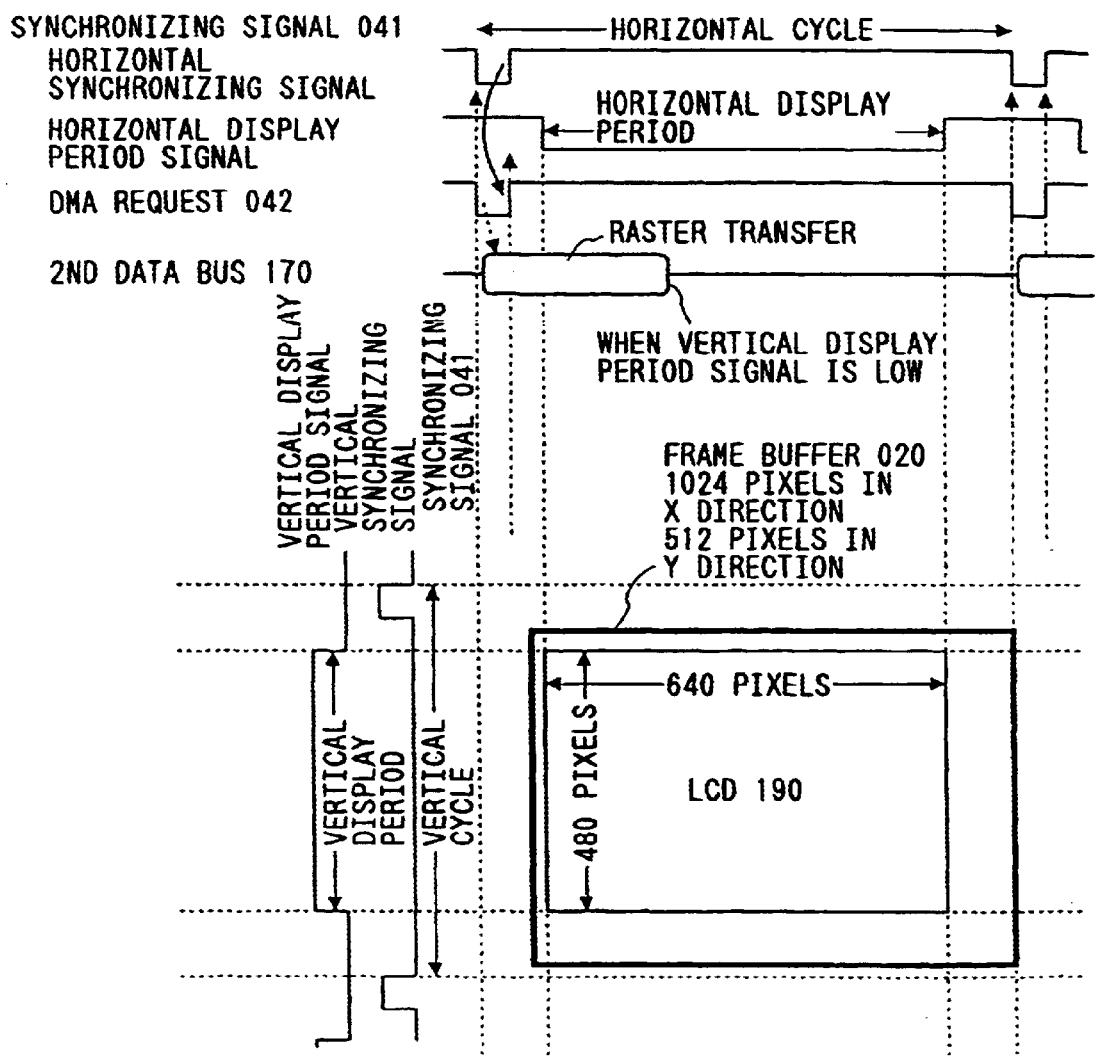
FIG. 7 is a timing diagram of a display.

Next, the relationship among the DMAC 011, the effective address generator 152, and the address multiplexer 153 will be explained using FIG. 7.

Since the 2nd data bus 170 is occupied to transfer rasters from the frame buffer 020 to the display control unit 004, the data bus should be as short as possible. For this purpose, as shown in the operation of the 1st data bus 070 in FIG. 4, the transfer of rasters is concentrated. Furthermore, the single address mode DMA transfer that reads from memory and writes data in an I/O operation executed in the same memory cycle is used. If the DMAC 011 that executes this DMA transfer exists outside the microcomputer 001, the DMAC 011 must generate 2-dimensional addresses. For this purpose, both the effective address generator 152 and the address multiplexer 153 must be incorporated in the DMAC 011. This makes the hardware increase. And, to avoid this, the DMAC 011 has been incorporated in the microcomputer 001 and the effective address generator 152 and the address multiplexer 153 are designed so that they can be shared.

Figure 8:
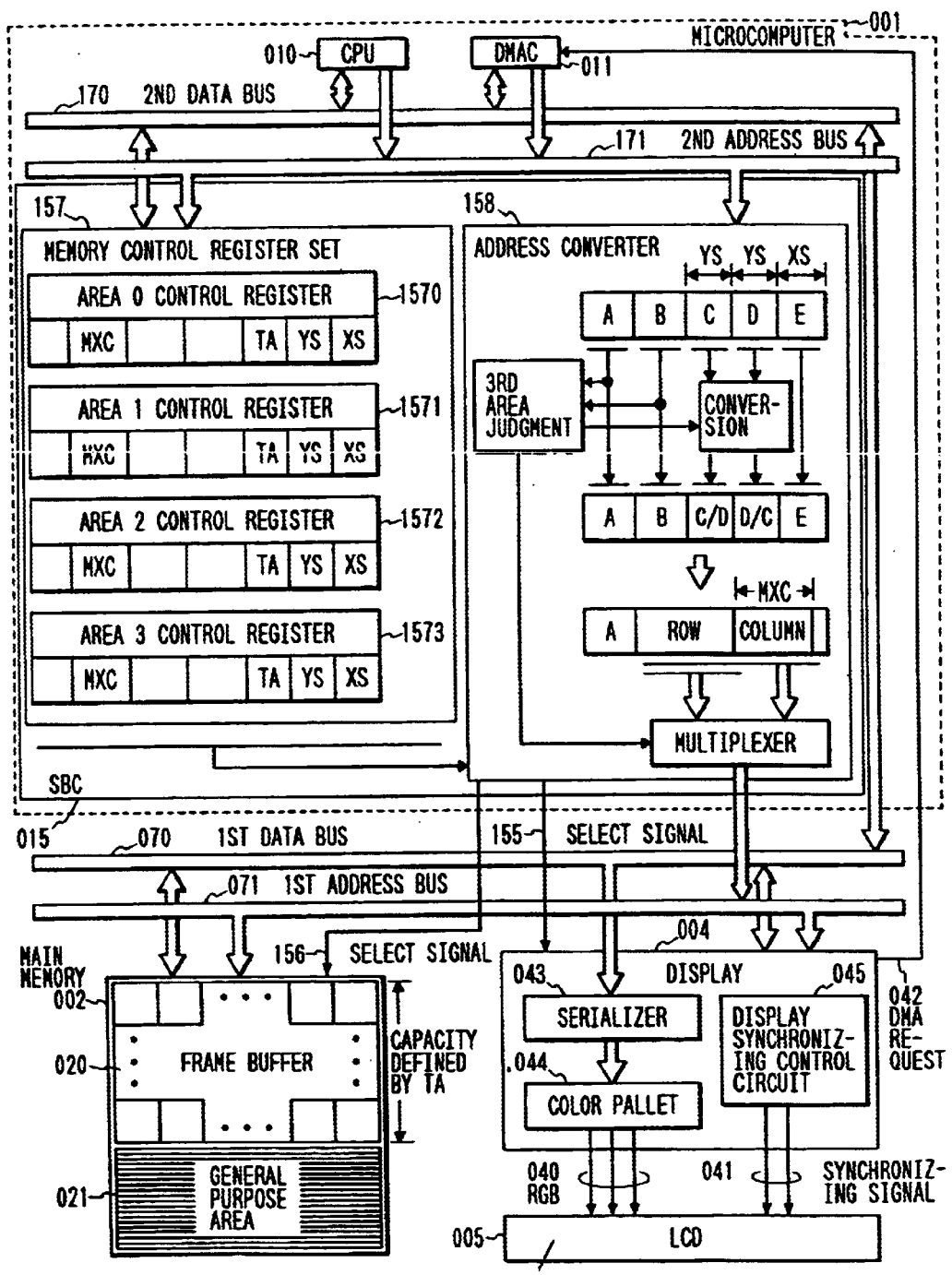
FIG. 8 is a schematic diagram of a graphics computer of the invention.

FIG. 8 shows another embodiment of this invention. A memory control register group 157 is provided in this embodiment. The register group 157 is used to control blocking of addresses in two or more areas. Control registers 1570, 1571, 1572, and 1573 are provided separately in four different areas (0 to 3). The effective address generator 152 and the address multiplexer 153 are united into the address converter 158.

Figure 9:
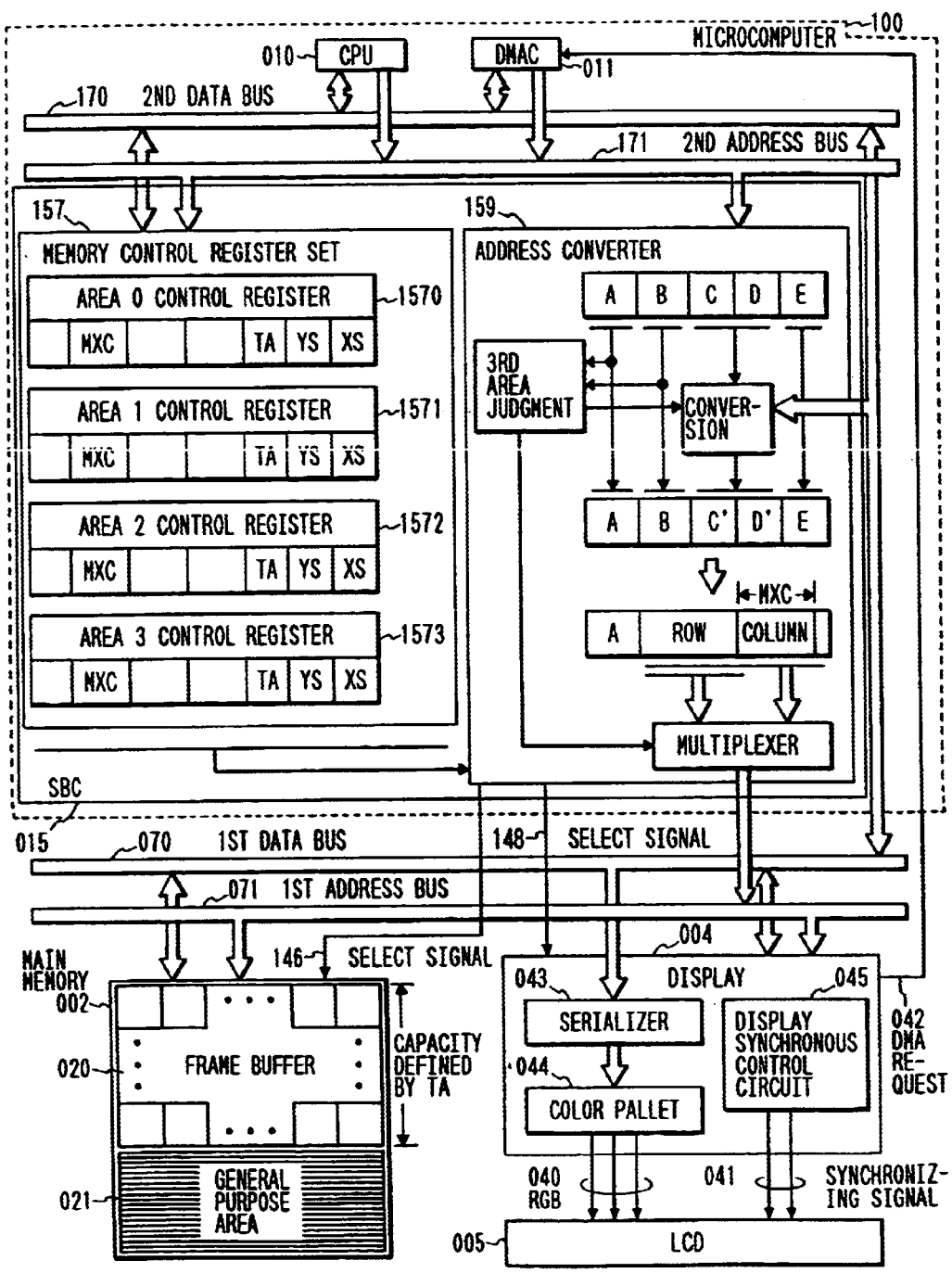
FIG. 9 is a schematic diagram of a graphics computer of the invention.

FIG. 9 shows another embodiment of this invention, in which an address converter 158 that uses a table lookup function is used instead of the address converter 158 shown in FIG. 8.

Next, an embodiment to achieve the 2nd purpose of this invention will be explained below.

The high speed line drawing system in this embodiment belongs to the single function procedure 132 of the draw procedures 131 stored in the 3rd memory 013.

(1st Embodiment to Achieve the 2nd Purpose of This Invention)

Figure 10:
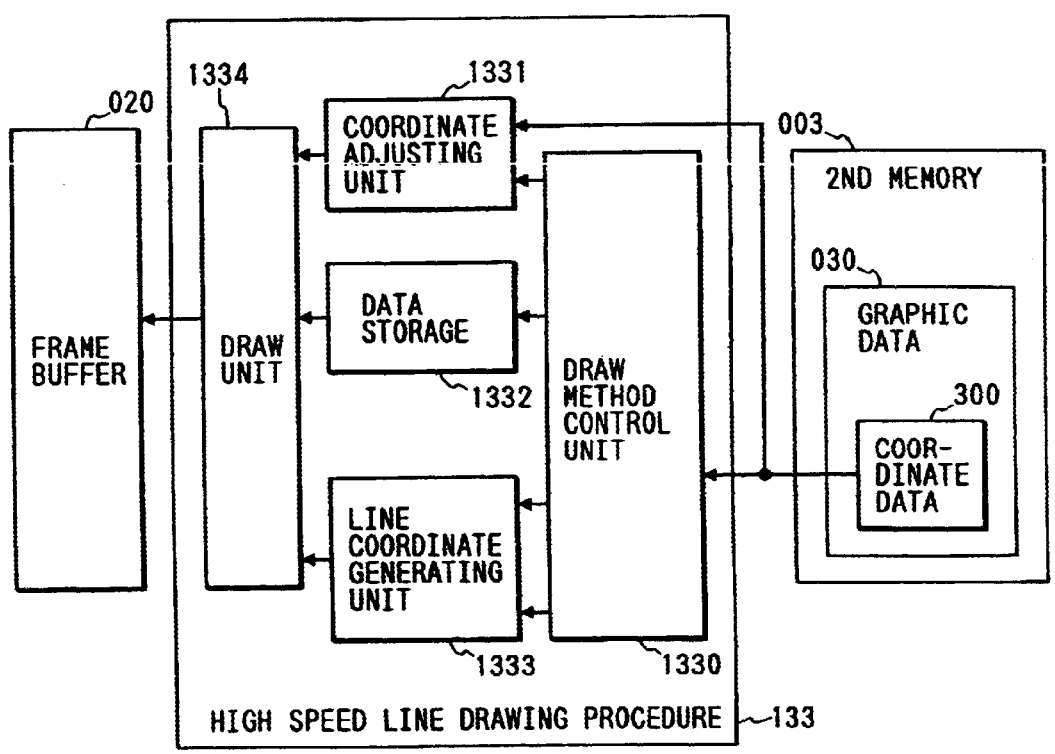
FIG. 10 is a block diagram of a line draw unit.

FIG. 10 is a block diagram of an embodiment of a line drawing unit according to this invention. The straight line drawing unit of this invention fetches coordinate data 300 of the subject line stored as graphic data 030 in the 2nd memory 003. The coordinate data 300 indicates the start coordinate (Xs, Ys) and the end coordinate (Xe, Ye) of the line. The high speed line draw procedure 133 comprises a draw method control unit 1330; a coordinate adjusting unit 1331; a data storage 1332 used to store line vector data; a line coordinate generating unit 1333; and a draw unit 1334. The frame buffer 020 stores pixel data output from the draw unit 1334.

In this section, the draw method control unit 1330 that has features of this invention will be explained.

Figure 11:
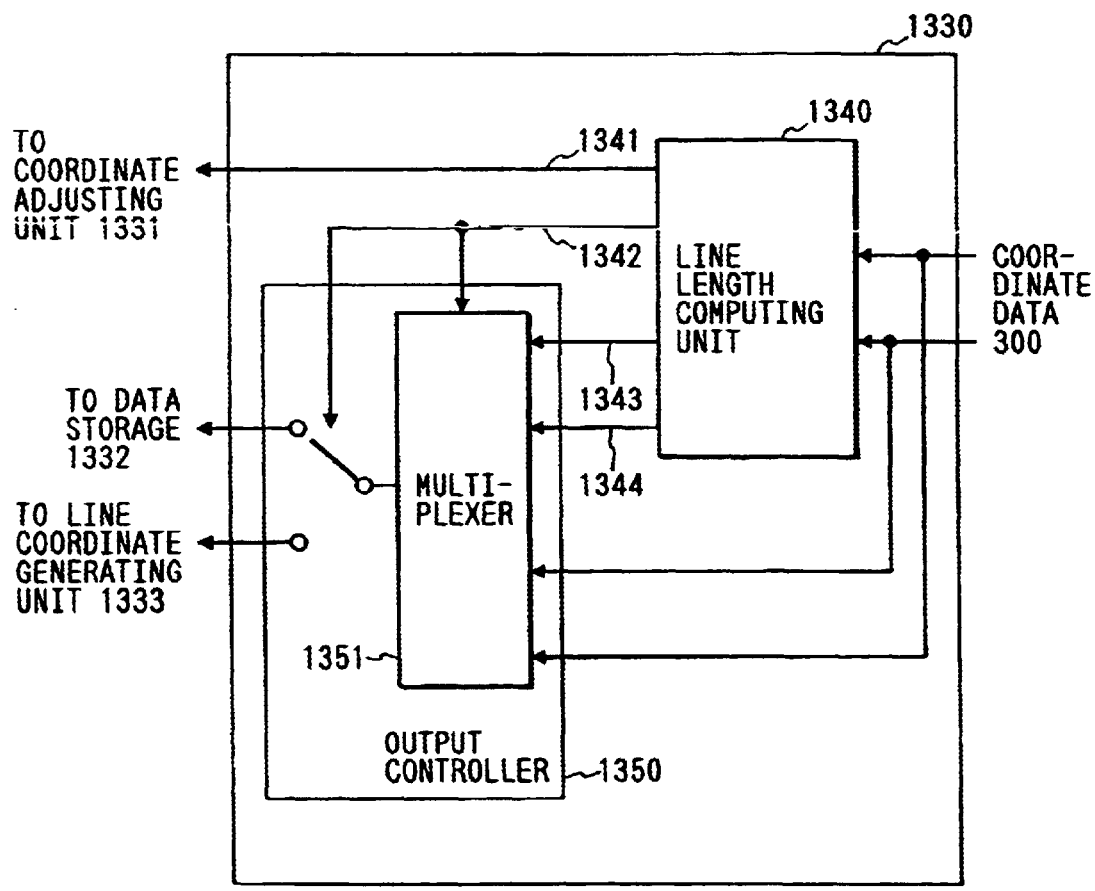
FIG. 11 is a schematic block diagram of a draw method control unit.

FIG. 11 shows the draw method control unit 1330, which is divided into functional blocks. Given coordinate data 300, the line length computing unit 1340 computes the difference between start and end coordinates, $\Delta X$ (=Xe−Xs) and $\Delta Y$ (=Ye−Ys) (hereafter, to be referred to as differential data 1341) and outputs a result to the coordinate adjusting unit 1331. Then, the line length computing unit 1340 outputs the absolute value of the differential data $|\Delta X|$ and $|\Delta Y|$ (hereafter, to be referred to as absolute value data 1344), output selection information 1342, and sign information 1343 to the multiplexer 1351 in the output control unit 1350.

The line length computing unit 1340 is configured so that it may set the output selection information 1342 to "0", for example, when $|\Delta X|$ or $|\Delta Y|$ is greater than 3 and the output select information 1342 to "1" when $|\Delta X|$ or $|\Delta Y|$ is equal to or greater than 3. When $\Delta X$ and $\Delta Y$ have the same sign, the computing unit 1340 sets the sign information 1343 to, for example, "0". When $\Delta X$ and $\Delta Y$ have different signs, the unit sets the sign information 1343 to, for example, "1".

The output control unit 1350, which receives coordinate data 300, absolute value data 1344, and sign information 1343 as inputs, controls whether to output absolute value data 1344 and sign information 1343 to the data storage 1332 or output coordinate data to the line coordinate generating unit 1333. The output control unit 1350 selects absolute value data 1344 and sign information 1343 and outputs this data to the data storage 1332 when the output select information is "0" or it selects coordinate data and outputs it to the line coordinate generating unit 1333 when the output select information is "1".

Next, the coordinate adjusting unit 1331 that has the features of this invention will be explained.

Figure 12:
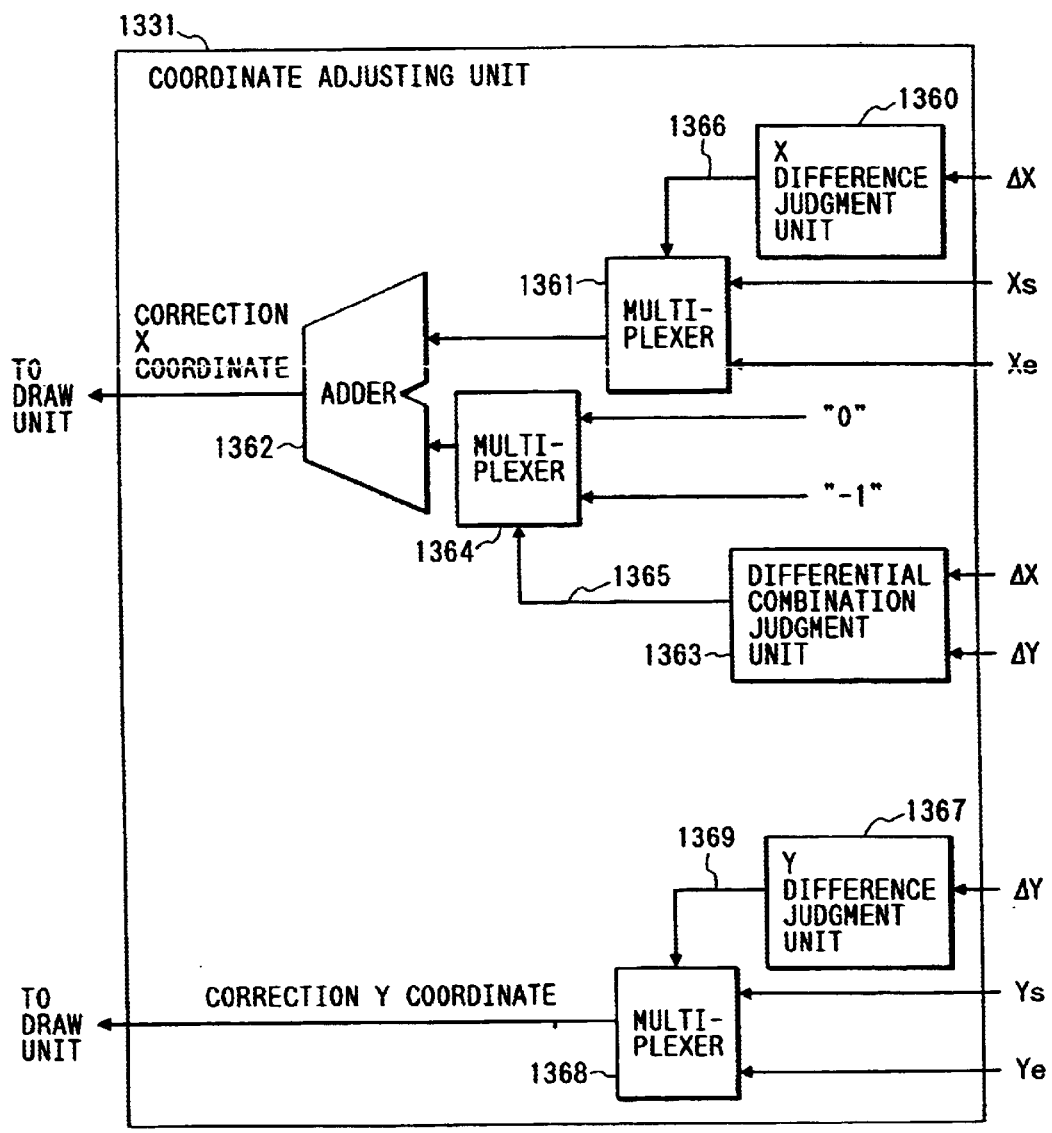
FIG. 12 is a schematic block diagram of a coordinate adjusting unit.

FIG. 12 shows the coordinate adjusting unit 1331, which is divided into functional blocks.

Differential data $\Delta X$ is supplied to the X difference judgment unit 1360. The X coordinate data (Xs, Xe) is supplied to the multiplexer 1361. The X difference judgment unit 1360 is configurated so that it may set the select information to, for example, "1" when $\Delta X$ is smaller than 0 and sets the information to, for example, "0" when $\Delta X$ is equal to or greater than 0.

The multiplexer 1361 is designed so that it may output Xe when the addition value select information is "1" and output Xs when the information is "1". Differential data is supplied to the differential combination judgment unit 1363.

The differential combination judgment unit 1363 is designed so that it may set the combination information 1365 to, for example, "1" when $\Delta XS$ is equal to 1 and $\Delta Y$ is equal to −2 or when $\Delta X$ is equal to −1 and $\Delta Y$ is equal to 2, and it may set the information 1365 to, for example, "1" in other cases. "0" and "−1" are supplied to the multiplexer 1364.

The multiplexer 1364 is designed so that it may select "−1" when the combination information is "1" and select "0" when the combination information is "0".

The adder 1362 adds the output from the multiplexer 1361 to the output from the multiplexer 1364 and outputs the result to the draw unit as a correction X coordinate. Correction Y coordinates are also output to the draw unit in the same way.

Next, the data storage 1332 that has the features of this invention will be explained below.

FIG. 13 shows an example of the vector data to be accumulated in the data storage 1332.

As shown in FIG. 12, the data storage is roughly divided into an identical sign a portion and an opposite sign portion.

"1" and "0" data is accumulated in the addresses of the absolute value data 1344. Sign information 1343 and absolute value data 1344 are supplied to the data storage 1332. When the sign information 1343 is "0", the identical sign portion is selected. When the sign information 1343 is "1", the opposite sign portion is selected. When absolute value data 1344 is specified, the vector data in the identical or opposite sign portion is output to the draw unit 1334.

Next, the unit shown in FIG. 10 will be explained using some examples.

Figure 14:
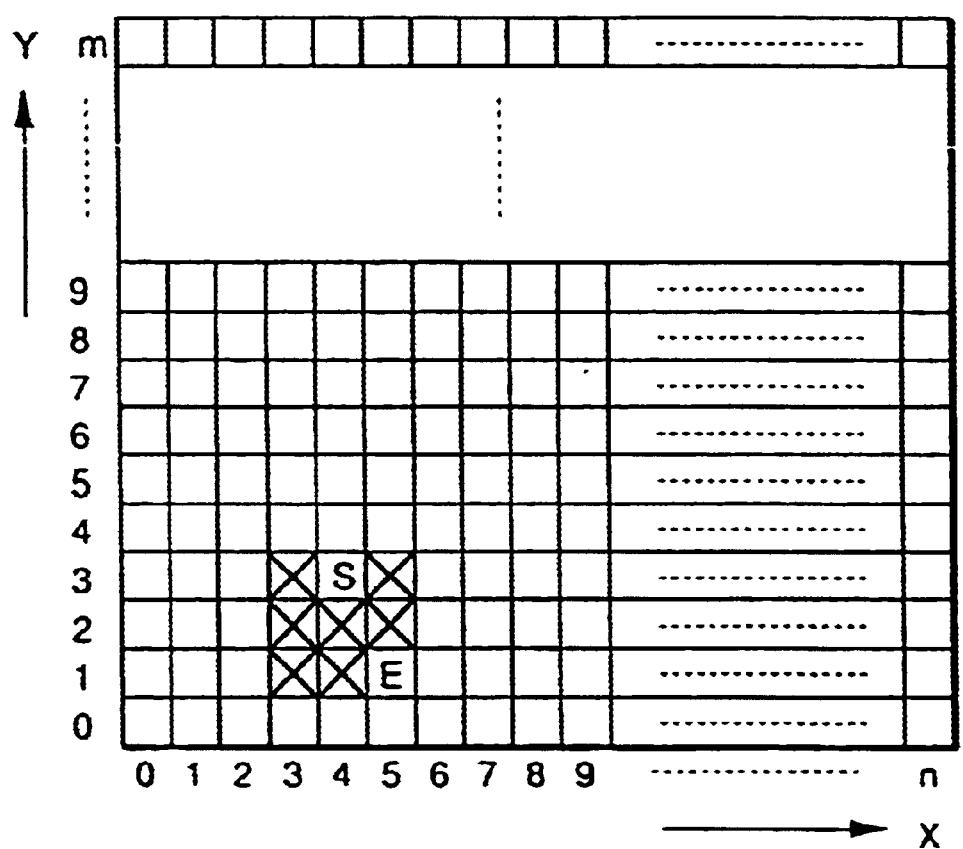
FIG. 14 is a diagram which shows start and end points of a line.

At first, a case assumed when $|\Delta X|$ or $|\Delta Y|$ is smaller than 3 will be explained. In FIG. 14, S indicates the start coordinate (Xs, Ys)=(4, 3), E indicates the end coordinate (Xe, Ye)=(5, 1), and the x mark indicates pixel data which is already drawn. And, a task that generates a coordinate point connecting points S and E will be explained below. The line length computing unit 1340 in the draw method control unit 1330 receives coordinate data and computes $\Delta X$ (=Xe−Xs=1) and $\Delta Y$ (=Ye−Ys=−2) and passes the result to the coordinate adjusting unit 1331. Furthermore, since $\Delta X$ and $\Delta Y$ are opposite signs mutually, "1" is set in the sign information 1343. In this example, since $|\Delta X|=1$ and $|\Delta Y|=2$, "0" is set for the output select information 1342. Since the output select information is "0" at this time, absolute value data 1344 and sign information 1343 are selected and passed to the data storage 1332. In the case shown in FIG. 15, $\Delta X$ and $\Delta Y$ are opposite signs and $|\Delta X|=1$ and $|\Delta Y|=2$ are set in the data storage. Thus, "010 010 001" is output to the draw unit 1334.

On the other hand, $\Delta X=1$, $\Delta Y=-2$, and coordinate data ((Xs=4, Ys=3) and (Xe=5, Ye=1)) are supplied to the coordinate adjusting unit 1331. Since $\Delta X$ is equal to 1, "0" is set for the select information 1366 and the multiplexer 1361 outputs Xs. And, $\Delta X$ and $\Delta Y$ are supplied to the differential combination judgment unit 1363. Since $\Delta X$ is equal to 1 and $\Delta Y$ is equal to −2, "1" is set for the differential combination judgment unit 1363. Since the combination information is "1", the multiplexer 1364 selects "−1" and output it to the adder 1362. The adder 1362 adds the output Xs (=4) from the multiplexer 1361 and the output "−1" from the multiplexer 1364 to its value and outputs "3" to the draw unit as the correction X coordinate.

Figure 15:
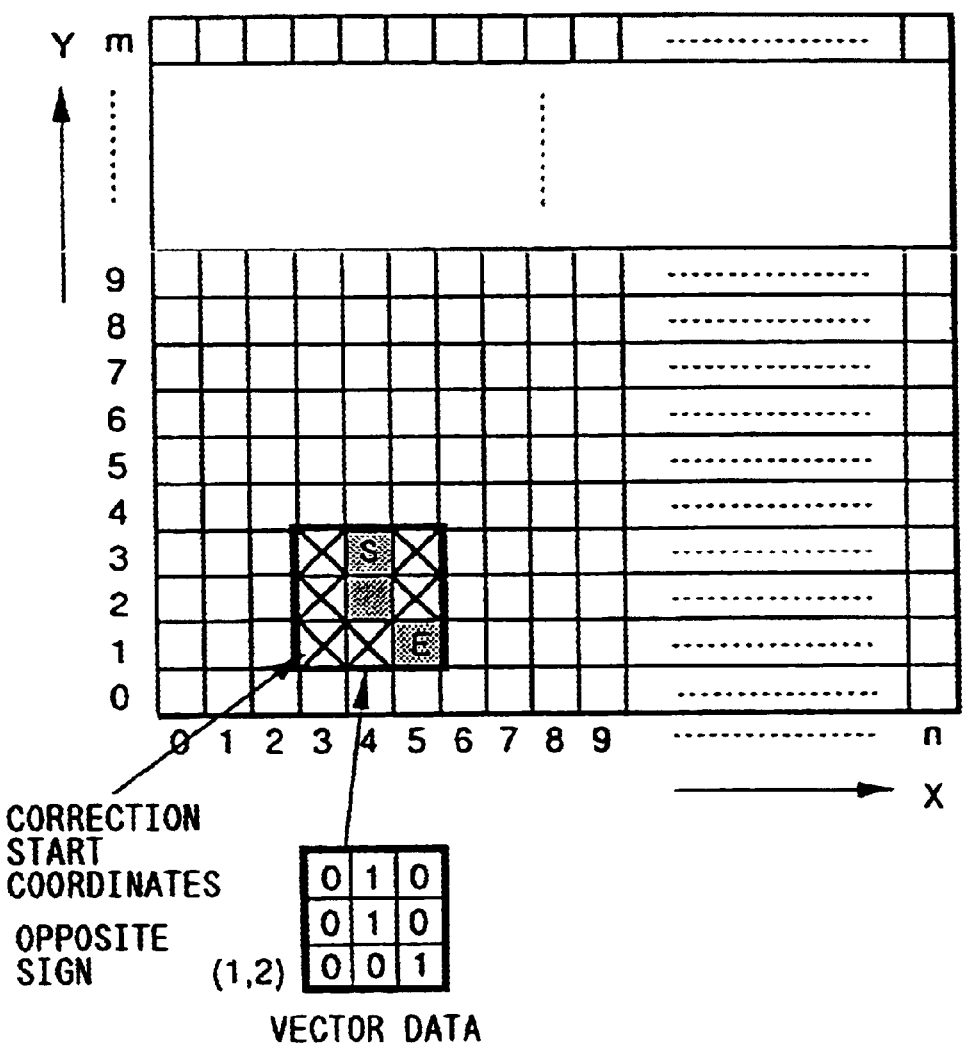
FIG. 15 is a diagram which shows a line drawn in an embodiment of the invention.

On the other hand, since $\Delta Y$ is equal to −2, "1" is set for the select information 1369, and the multiplexer 1368 outputs Ye (=1) to the draw unit as the correction Y coordinate. The draw unit aligns the lower left corner point of the 3×3 vector data in the data storage to the data of (correction X coordinate, correction Y coordinate) to draw graphic elements in the frame buffer 020. At this time, the draw unit expands the "1" part of the vector data to pixel data and transmits the "0" part (initial pixel data remains in the "0" part). Thus, a line from start point S to end point E is completed as shown in FIG. 15.

Figure 16:
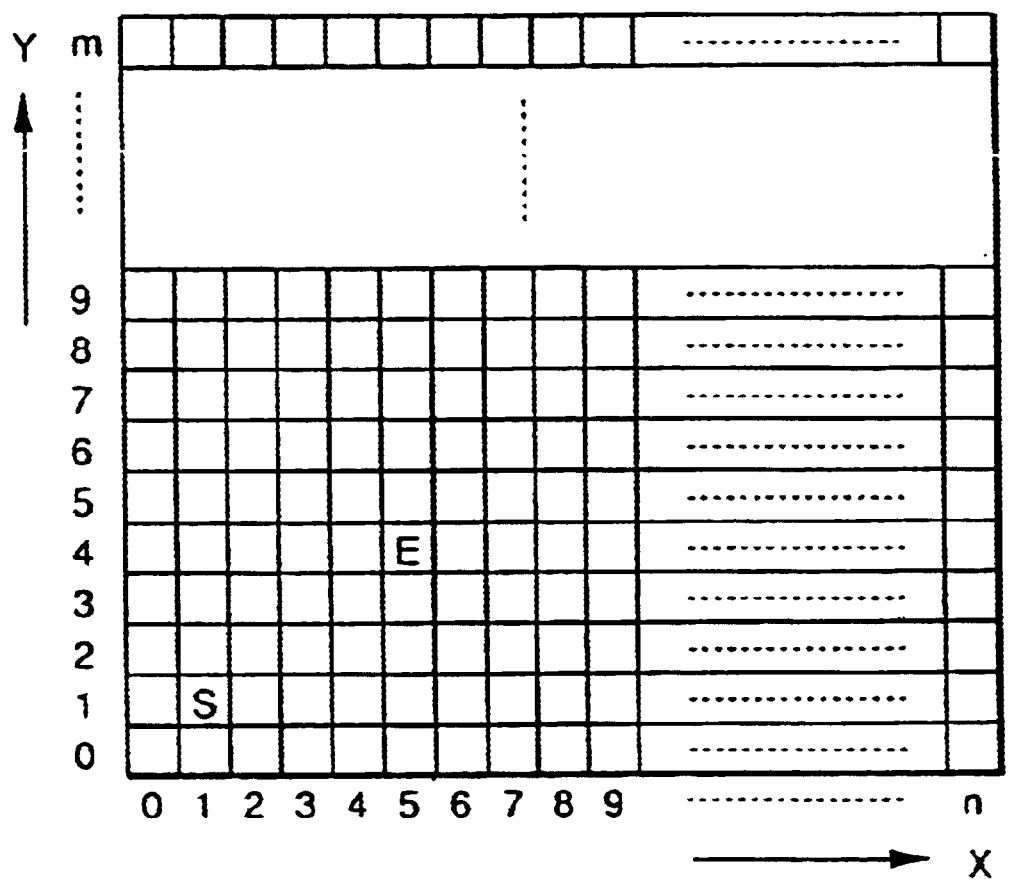
FIG. 16 is a diagram which shows start and end points of a line used in an embodiment.

Next, a case where $|\Delta X|$ or $|\Delta Y|$ is equal to or greater than 3 will be explained below. In FIG. 16, S indicates the start coordinates (Xs, Ys)=(1, 1) and E indicates the end coordinates (Xe, Ye)=(5, 4).

And, a task that generates a coordinate point connecting point S and point E will be explained below.

Figure 17:
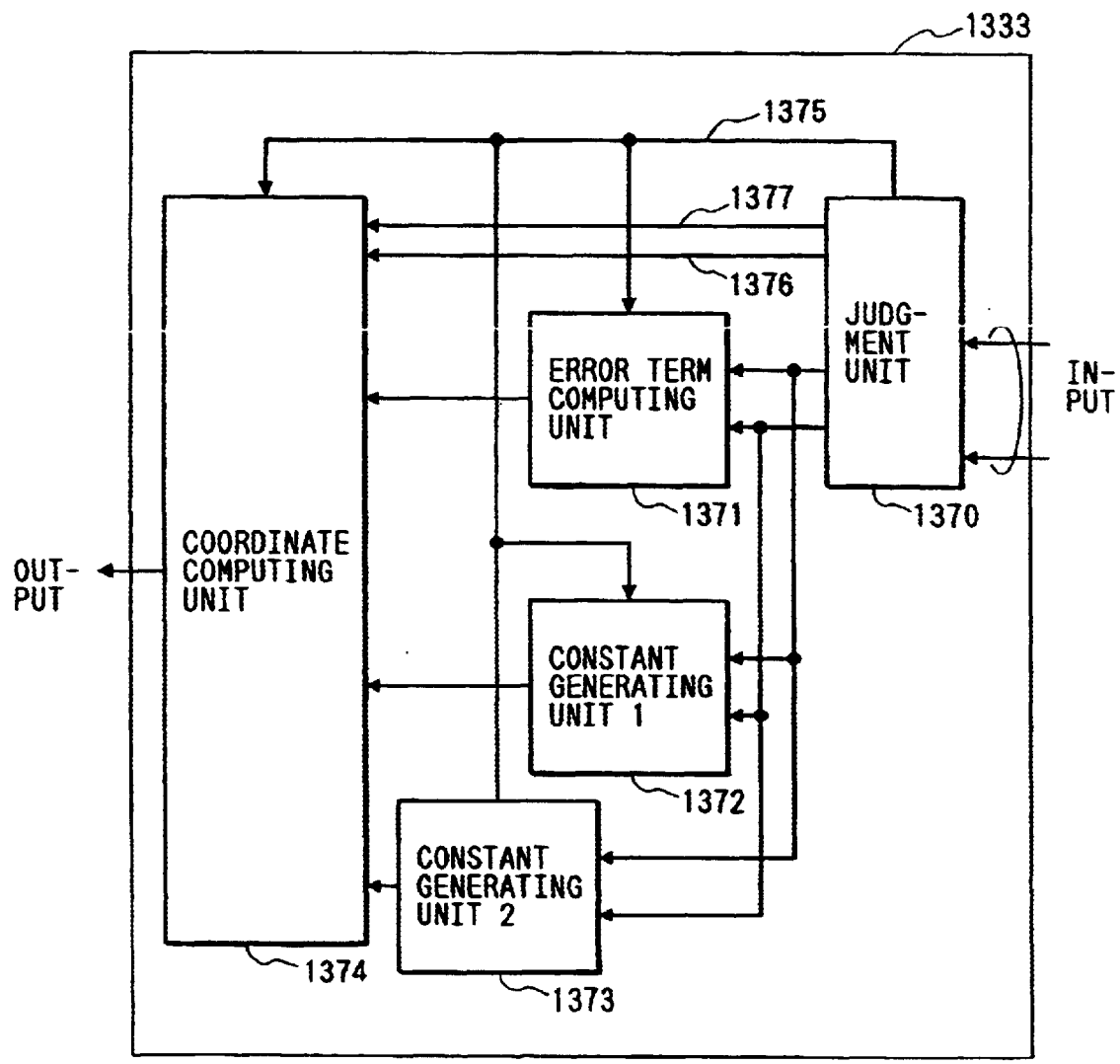
FIG. 17 is a schematic block diagram of a line coordinate generation unit.

FIG. 17 shows the line coordinate generating unit 1333, which is divided into each function block. The line coordinate generating unit comprises a judgment unit 1370; an error term computing unit 1371; a constant generating unit 1 (1372); a constant generating unit 2 (1373); and a coordinate computing unit 1374.

The judgment unit 1370 fetches start coordinates (Xs, Ys) and end coordinates (Xe, Ye) to compute $\Delta X$ (=Xe−Xs) and high (=Ye−Ys). When $\Delta X$ is equal to or greater than 0, the unit sets "1" for the incremental information fx 1376 and passes $\Delta X$ to the error term computing unit 1371 and the constant generating unit 1 (1372), and the constant generating unit 2 (1373). When $\Delta X$ is smaller than 0, the unit sets "0" for the incremental information fx 1376 and passes $-(\Delta X)$ to the error term computing unit 1371 and the constant generating unit 1 (1372), and the constant generating unit 2 (1373). When high is equal to or grater than 0, the unit sets "1" for the incremental information fy1377 and passes high to the error term computing unit 1371 and the constant generating unit 1 (1372), and the constant generating unit 2 (1373). When $\Delta X$ is smaller than 0, the unit sets "0" for the incremental information fy 1377 and passes $-(\Delta X)$ to the error term computing unit 1371 and the constant generating unit 1 (1372), and the constant generating unit 2 (1373). Furthermore, when $\Delta X$ is equal to or greater than high, the unit sets "1" for the judgment information 1375 and passes the result to the error term computing unit 1371 and the constant generating unit 1 (1372), and the constant generating unit 2 (1373). When $\Delta X$ is smaller than $\Delta Y$, the unit sets "0" for the judgment information and passes the result to the error term computing unit 1371 and the constant generating unit 1 (1372), and the constant generating unit 2 (1373).

The error term computing unit 1371 computes the error term d=2×$\Delta Y$ (or −$\Delta Y$) −$\Delta X$ (or −$\Delta Y$) when the judgment information is "1" and outputs the result to the coordinate computing unit 1374. When the judgment information is "0", the error term computing unit 1371 computes the error term d=2 ×$\Delta X$ (or −$\Delta X$) −$\Delta Y$ (or −$\Delta X$) and outputs the result to the coordinate computing unit 1374

The constant generating unit 1 (1372) computes the constant 1c1=2×high (or −$\Delta Y$) when the judgment information is "1" and outputs the result to the coordinate computing unit 804. When the judgment information is "0", the constant generating unit 1 (1372) computes the constant 1c1= 2×$\Delta X$ (or −$\Delta X$) and outputs the result to the coordinate computing unit 840.

The constant generating unit 2 (1373) computes the constant 2c2=2 ×($\Delta Y$ (or −$\Delta Y$) −$\Delta X$ (or −$\Delta X$)) when the judgment information is "1" and outputs the result to the coordinate computing unit 1374. When the judgment information is "0", the constant generating unit 1 (1372) computes the constant 2c2=2 × ($\Delta X$ (or −$\Delta X$) −$\Delta Y$ (or −$\Delta Y$)) and outputs the result to the coordinate computing unit 1374.

The coordinate computing unit 1374 adds fx to the X coordinate when the judgment information is "1" and adds the error term d and the constant 1c1 to the X coordinate when the error term d is smaller than 0. When the error term d is equal to or grater than 0, the unit adds the error term d and the constant 2c2 to the X coordinate and fy to the Y coordinate.

With this, new coordinates are computed. The unit then outputs the result to the draw unit. The above processings are repeated until $\Delta X=-1$ is obtained. When the judgment information is "0", the unit adds fy to the Y coordinate. When the error term d is smaller than 0, the unit adds the error term d and the constant 1c1 to the Y coordinate. When the error term d is equal to or greater than 0, the unit adds the error term d and the constant 2c2 to the Y coordinate and adds fx to the X coordinate.

With this, new coordinates are computed. The unit then outputs the result to the draw unit. The above processings are repeated until $\Delta Y=-1$ is obtained. In FIG. 16, since $\Delta X$ is equal to 4 and $\Delta Y$ is equal to 3, the judgment information becomes "1" and fx=1, fy=1, 1st error term d=2×3−4=2, constant 1 c1=2×3=6, constant 2 c2=2×(3−4)=−2 are assumed. So, the coordinates to be drawn after the start point becomes (2, 2), and constant 2 c2 is added to the error term d. As a result, the result becomes d=O.

Figure 18:
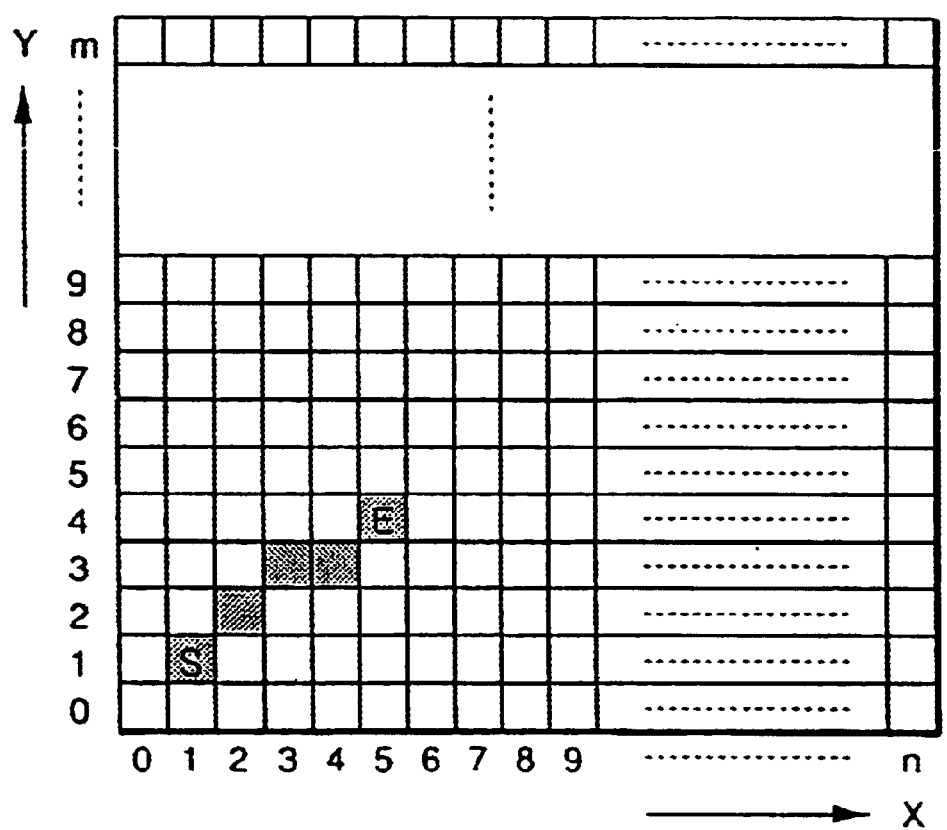
FIG. 18 is a diagram showing a line drawn in the 1st embodiment.
Figure 19:
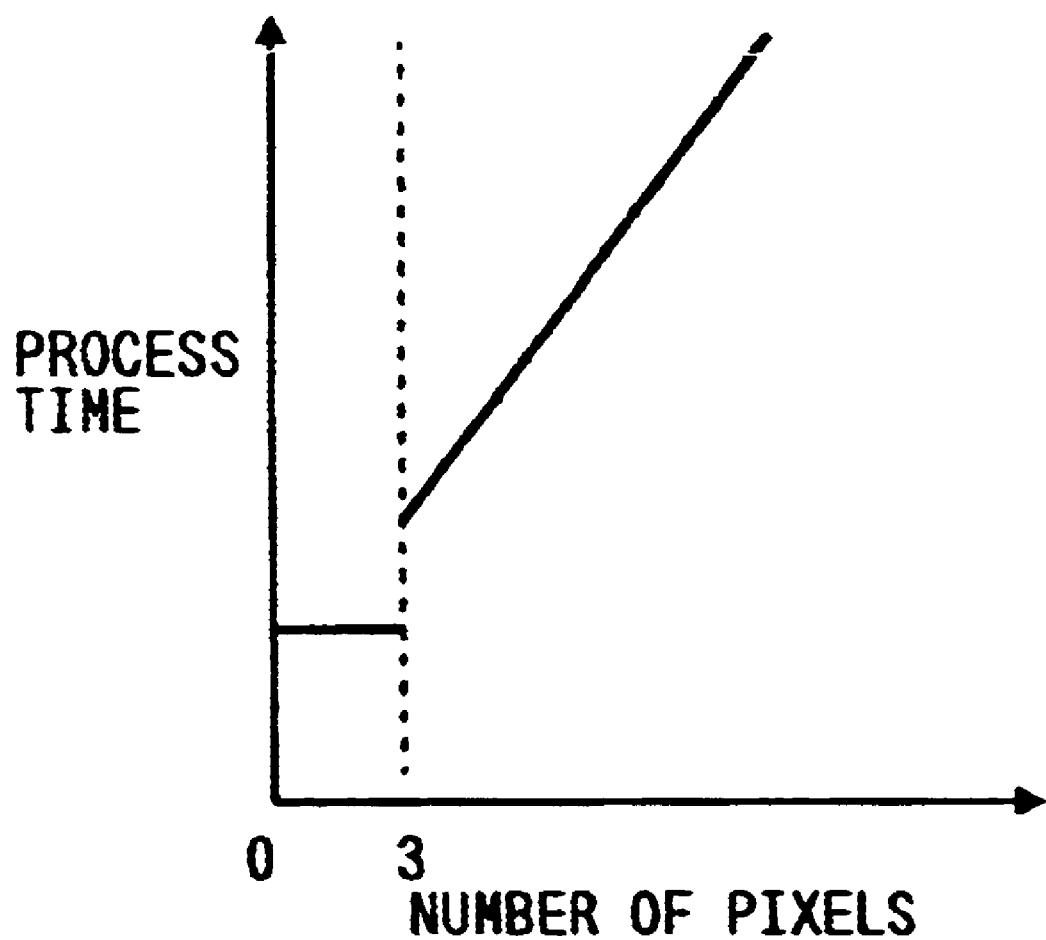
FIG. 19 is a diagram showing a relation between the numbers of pixels in a line and the processing time required.

Repeating the above processings, a vector between start point S and end point E is completed as shown in FIG. 18. FIG. 19 shows the relationship between the number of pixels and the processing time to draw a line using this system. This system reads data for a line from the data storage when the line comprises 3 pixels maximum. It draws a tile comprising 9 pixels (3×3) in any case. For a line comprising 3 pixels or less, therefore, the processing time is fixed regardless of the number of pixels. However, for a line comprising 4 pixels or more, the drawing coordinates must be decided for each pixel, so the processing time is increased in proportion to the number of pixels.

As explained above, this system can output drawing data only by reading the vector data stored beforehand when drawing a short line. It can eliminate or at least reduce the overhead such as computing equations and data necessary to draw lines. When drawing a long line, the system uses equations, so that it can reduce the need to increase the capacity of the vector data storage. This is why the system can draw lines at high speeds with less storage resources.

(2nd Embodiment to Achieve the 2nd Purpose of This Invention)

Figure 20:
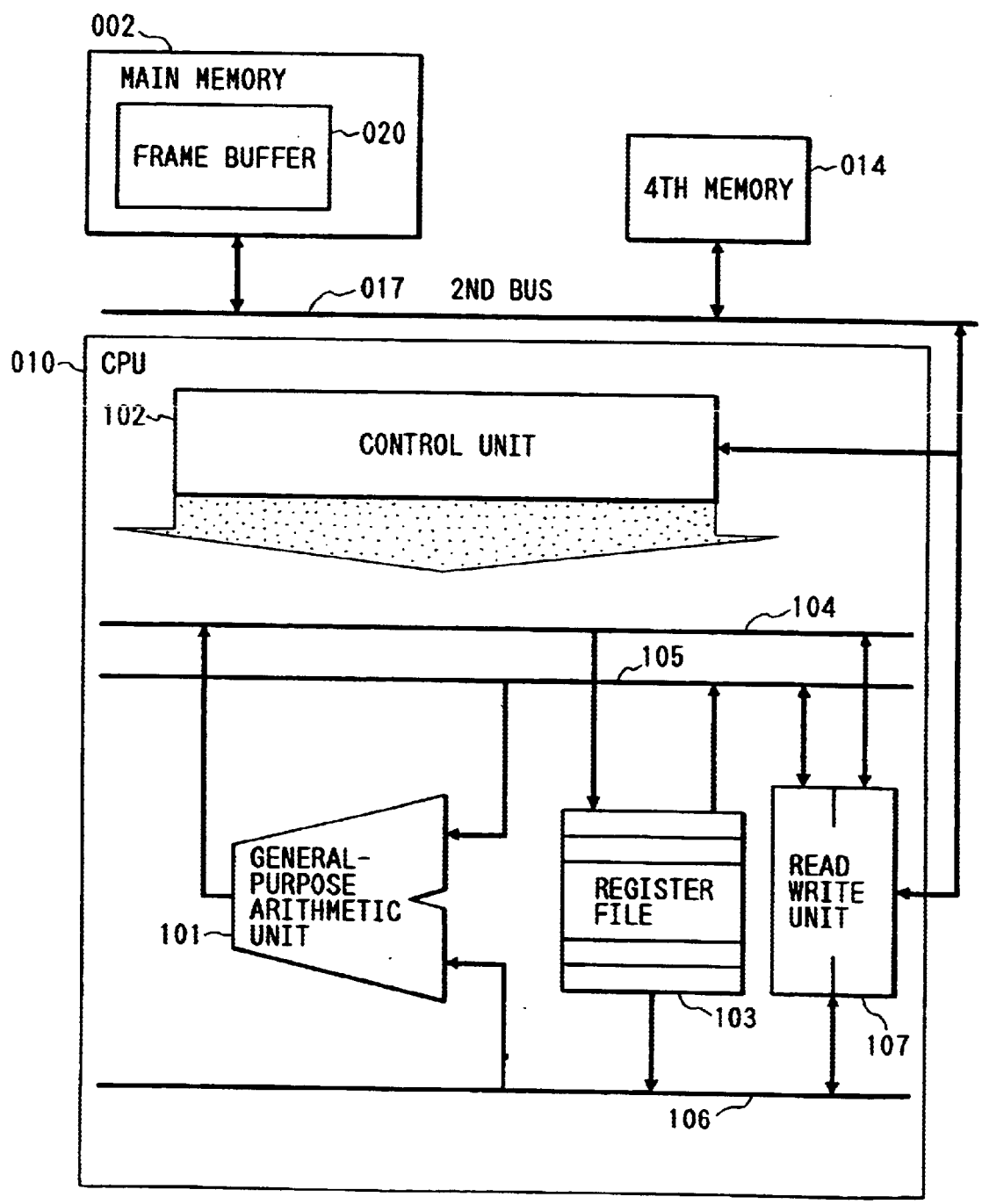
FIG. 20 is a diagram of a CPU configuration.

FIG. 20 shows another embodiment of this invention. In this embodiment, the system comprises a CPU 010 that has a register file 103 that comprises two or more registers; a general-purpose arithmetic unit 101; a read/write unit 107; buses 104, 105 and 106 used to connect the said units; and a control unit 102 used to control the said units. Coupled to CPU 010 is a frame buffer 020; the 4th memory 014; and the 2nd bus 017 that connects to the read/write unit 107.

Figure 21:
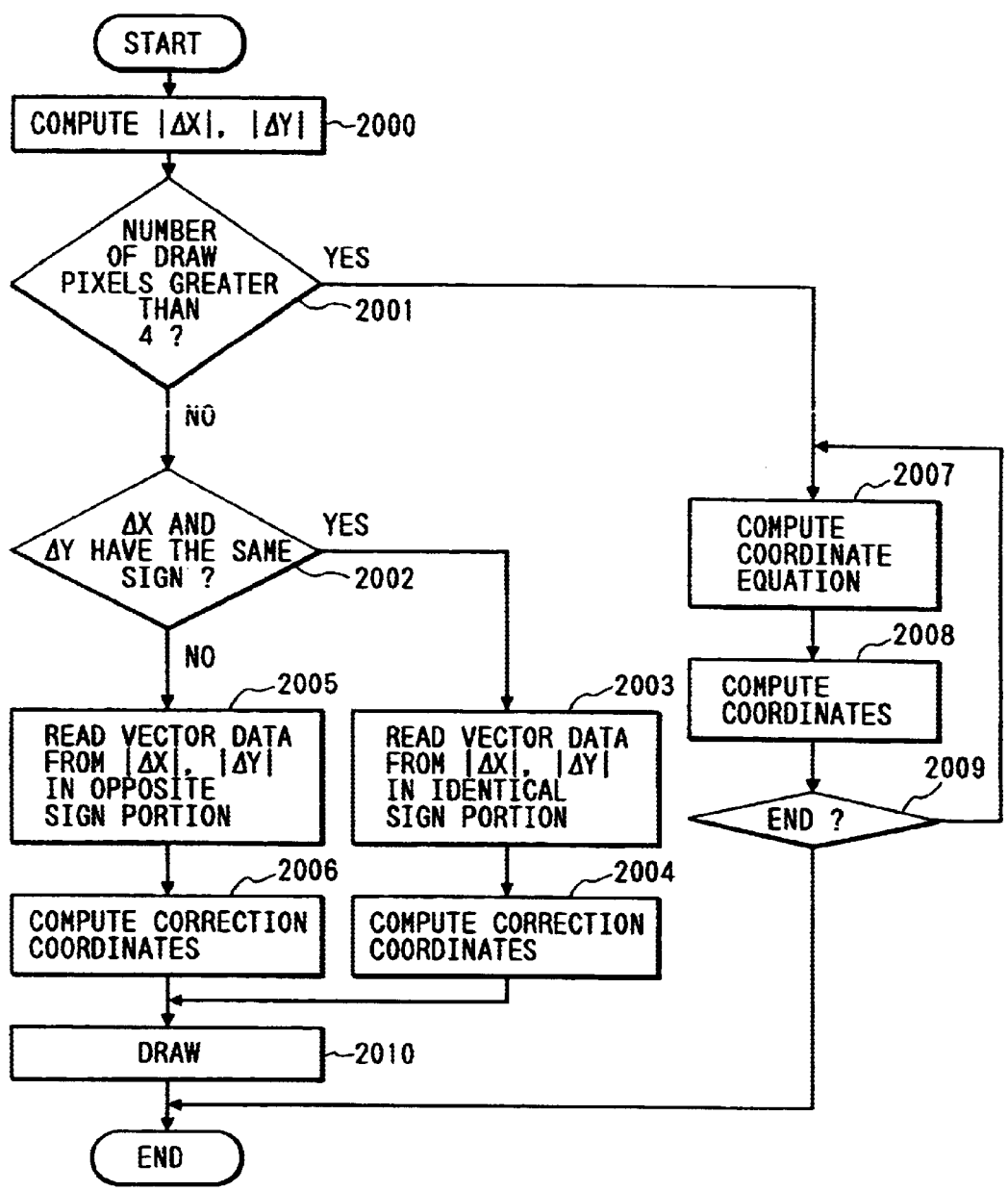
FIG. 21 is a flow diagram of the processing flow of line vector data generation in an embodiment.

FIG. 21 shows the processing flow to generate vector data of a line using this system. When the coordinates of the start and end points are specified, $|\Delta X|$ and $|\Delta Y|$ are computed to judge whether or not the number of pixels to drawn is 4 (steps 2000 and 2001). When it is 4 or under, it is judged whether or not $\Delta X$ and $\Delta Y$ have identical signs (step 2002). When they have identical signs, the vector data stored in addresses $|\Delta X|$ and $|\Delta Y|$ of the identical sign portion in the memory is read (step 2003). Then, if $\Delta X$ is smaller than 0, Xe is selected. If $\Delta X$ is equal to or greater than 0, Xs is selected. Furthermore, if $\Delta X$ is equal to 1 and $\Delta Y$ is equal to −2, 1 is subtracted from Xs. If $\Delta X$ is equal to −1 and $\Delta X$ is equal to 2, 1 is subtracted from Xe to compute the correction X coordinate. If $\Delta Y$ is smaller than 0, Ye is selected as the correction Y coordinate. If $\Delta Y$ is equal to or greater than 0, Ys is selected as the correction Y coordinate (step 2004). When the number of pixels to be drawn is 3 or over, an equation to find the coordinates for the line is computed (step 2007) to compute the coordinates (step 2008). The above processings are repeated until the drawing is finished.

Figure 22:
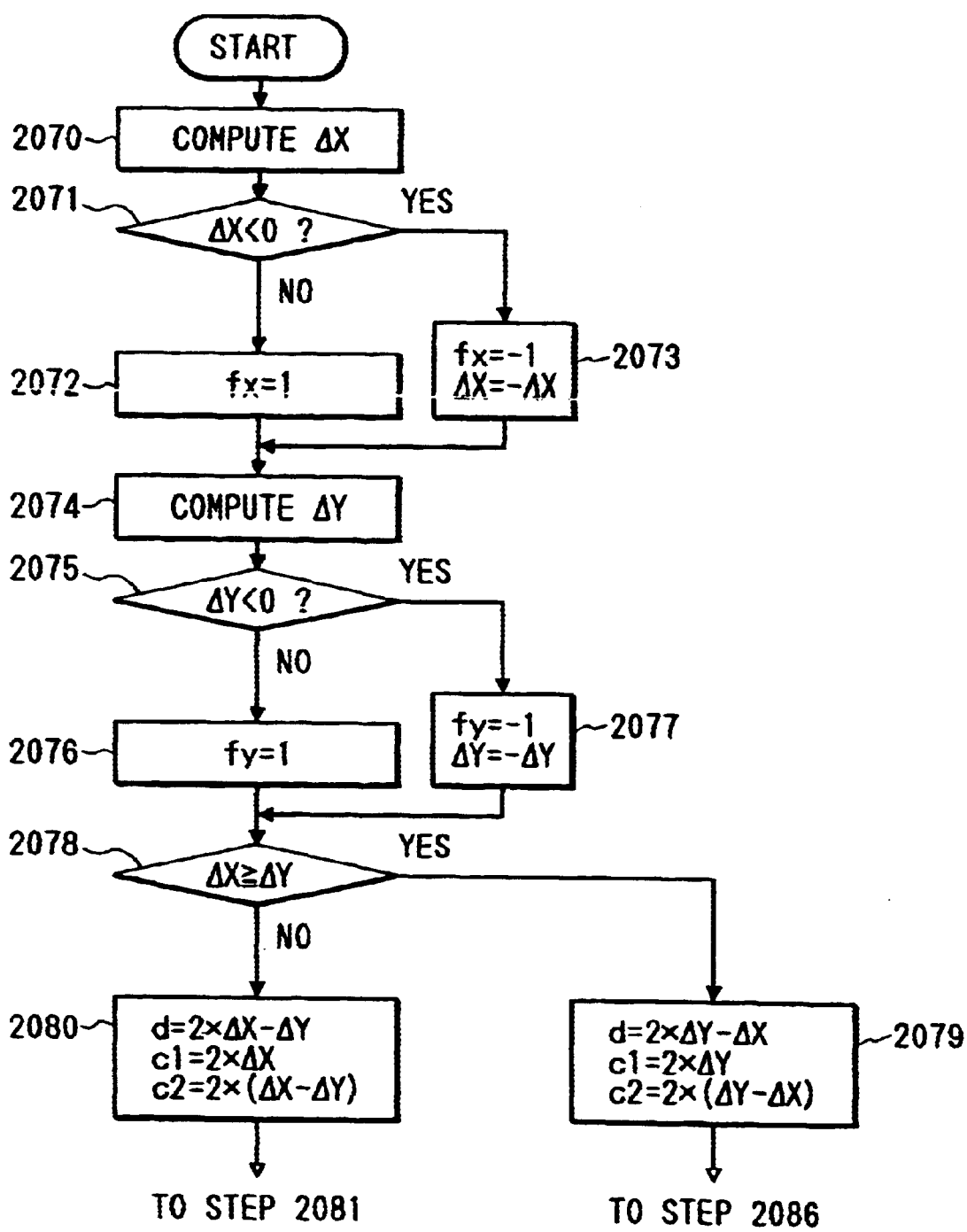
FIG. 22 is a block diagram showing the processing flow in part of a line vector data generation in an embodiment.

FIG. 22 shows the detailed processing flow for step 2007.

At first, $\Delta X$ (=Xe−Xs) is computed (step 2070). If $\Delta X$ is equal to or greater than 0, fx=1 is assumed (steps 2071 and 2072). If $\Delta X$ is smaller than 0, fx=0 is assumed and $\Delta X$ is assumed to be $-(\Delta X)$ (step 2073). Then, $\Delta Y$ (=Ye−Ys) is computed (step 2074). If $\Delta Y$ is equal to or greater than 0, fy=1 is assumed (steps 2075 and 2076). If $\Delta Y$ is smaller than 0, fy=−1 is assumed and $\Delta Y$ is assumed to be $-(\Delta Y)$ (steps 2077). If $\Delta X$ is equal to or greater than $\Delta Y$, error term $d=2\times\Delta Y-\Delta X$, constant 1 $c1=2\times\Delta Y$, and constant 2 $c2=2\times(\Delta Y-\Delta X)$ are computed (steps 2078 and 2080). If $\Delta X$ is smaller than $\Delta Y$, error term $d=2\times\Delta X-\Delta Y$, constant 1 $c1=2\times\Delta X$, and constant 2 $c2=2\times(\Delta X-\Delta Y)$ are computed (steps 2078 and 2079).

Figure 23:
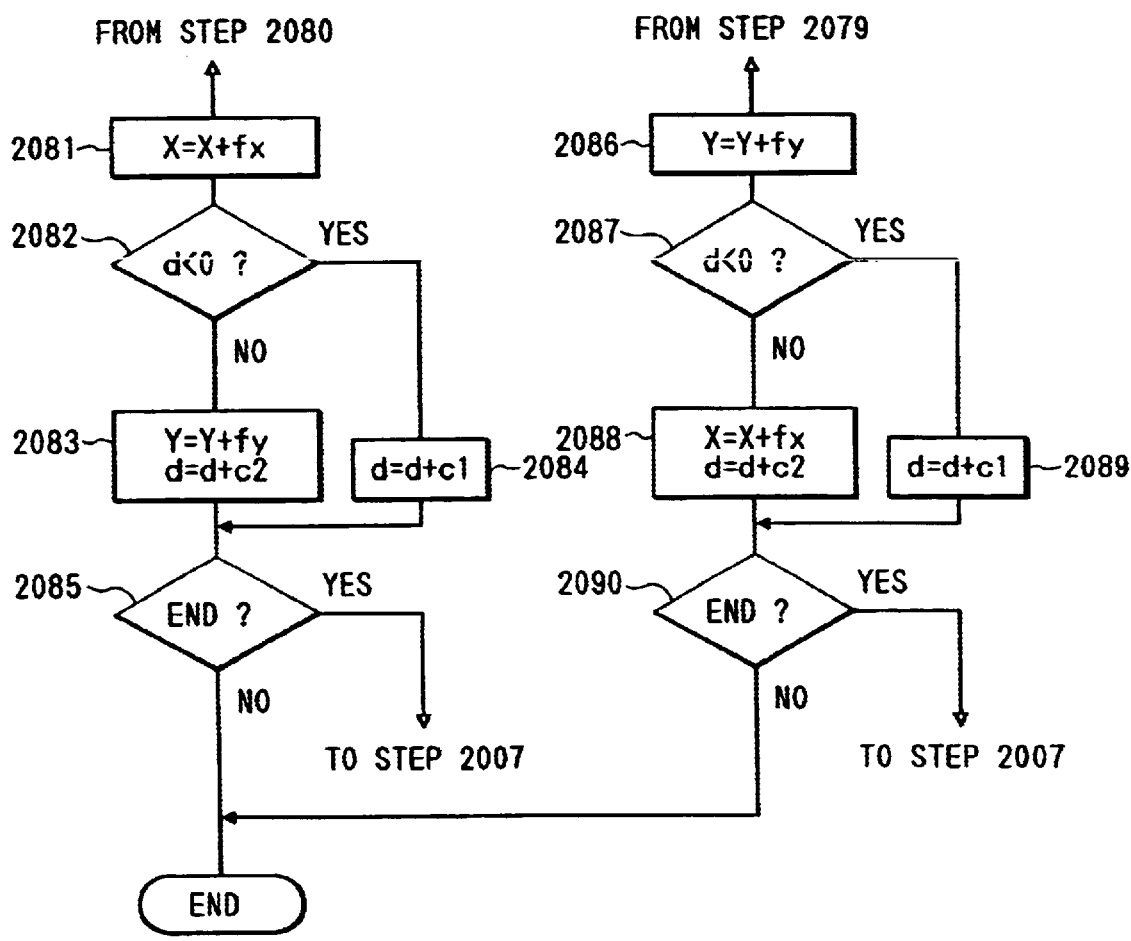
FIG. 23 is a flow diagram showing the processing flow of line vector data generation in an embodiment.

FIG. 23 shows the detailed processing flow in and after step 2080.

The route beginning in step 2081 will be explained below. At first, fx is added to the X coordinate (step 2081). Then, when the error term d is smaller than 0, the error term d and constant 1c1 are added to the result (steps 2082 and 2083). When the error term d is equal to or greater than 0, the error term d and constant 2c2 are added to the result, and then fy is added to the Y coordinate (steps 2082 and 2084). With this, new coordinates are computed. The above processings are repeated until $\Delta X=-1$ is obtained (step 2085). In case of the route beginning in step 2079, fy is added to the Y coordinate (step 2086). Then, when the error term d is smaller than 0, the error term d and constant 1c1 are added to the result (steps 2087 and 2088). When the error term d is equal to or greater than 0, the error term d and constant 2c2 are added to the result, and then fy is added to the X coordinate (steps 2087 and 2089). With this, new coordinates are computed. The above processings are repeated until $\Delta Y=-1$ is obtained (step 2090). FIG. 24 shows an example of vector data stored in the main memory or the incorporated SRAM.

As explained above, according to this embodiment, even a general CPU can draw lines at high speeds and with less storage resources.

Next, some embodiments of this invention to achieve the 3rd and other purposes mentioned above will be explained. The 3rd purpose of this invention is to shorten the processing time that includes binary value expansion for drawing characters, etc.

Figure 25:
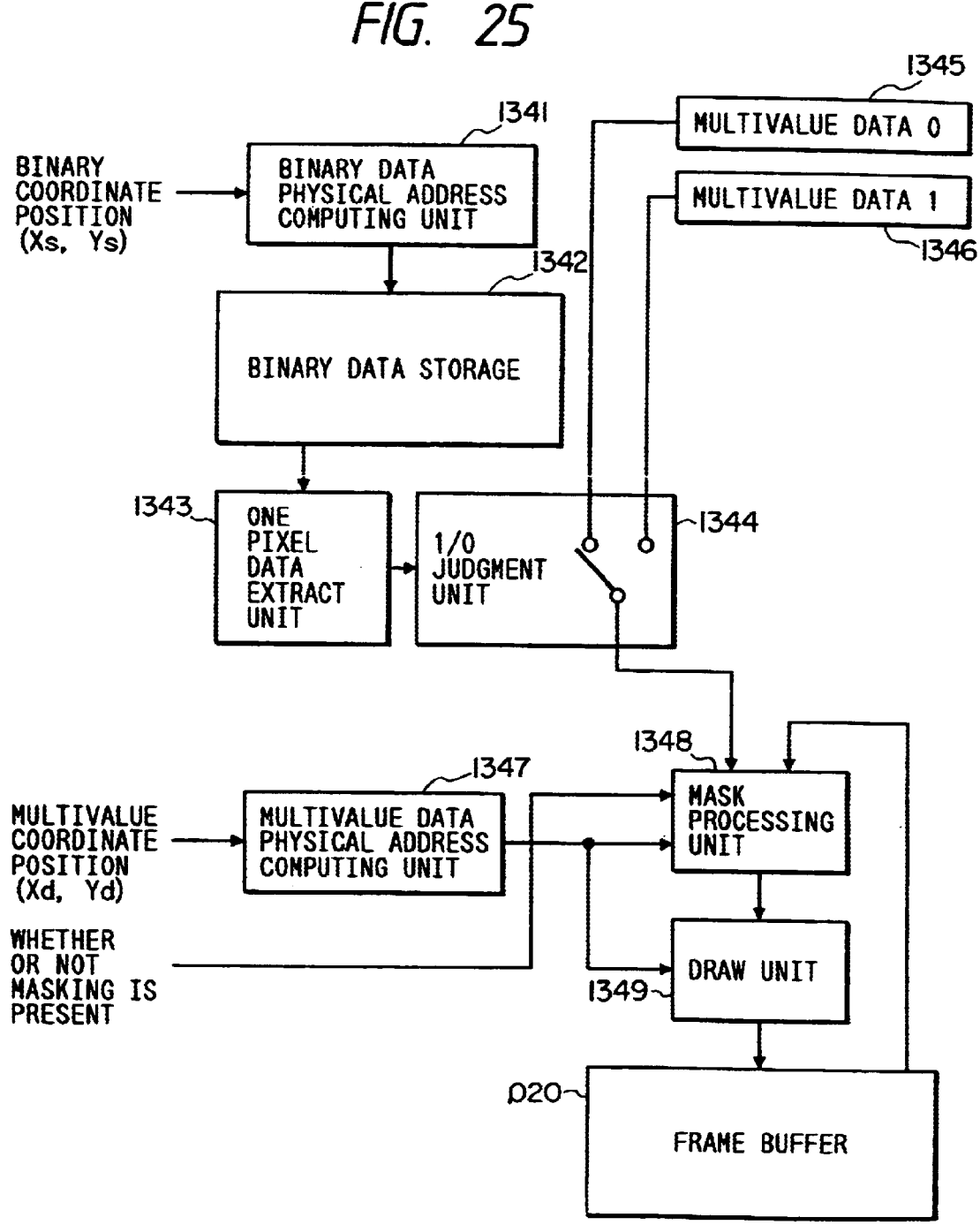
FIG. 25 is a conventional multivalue expansion system block diagram.

FIG. 25 shows a block diagram of the system for drawing binary data using conventional technologies.

Among the elements of the system, items related to multi-value expansion include the binary data physical address computing unit 1341; the binary data storage 1342; the one pixel data extract unit 1343; the 1/0 (one/zero) judgment unit 1344; the multi-value data 0 (1345) or simply referred to as CL0; and the multi-value data 1 (1346) or simply referred to as CL1. The items related to drawing including multi-value expanded data transparent processings are the multi-value data physical address computing unit 1347; the mask processing unit 1348; the draw unit 1349; and the frame buffer 020.

The binary data physical address computing unit 1341 can convert binary coordinate points (Xs, Ys) given to the binary data drawing unit to physical addresses of the binary data storage 1342 (memory).

Data is stored in units of bytes in the memory indicated by these addresses. The amount of stored data is that for 8 pixels.

The addresses are updated to the ones indicating the next pixels for a character when the whole data entered to the one pixel data extract unit 1343 is processed.

The binary data storage 1342 is a memory used to store a binary data group. It fetches the memory addresses output from the binary data physical address computing unit 1341 and outputs the data corresponding to those addresses to the one pixel data extract unit 1343. The unit to transfer memory data differs among systems, but when data is transferred in bytes, 8-pixel data for binary data that represents one pixel by one bit is output to the one pixel data extract unit 1343.

The one pixel data extract unit 1343 divides 8-pixel data output from the binary data storage 1342 into individual pixels and outputs them to the 1/0 judgment unit 1344. A shifter, etc. are used to divide such 8-pixel data into individual pixels. The dividing of 8 pixel data is done once for one multi-value expansion. When dividing of the whole 8-pixel data transferred from the binary data storage is ended, the one pixel data extract unit 1343 fetches new 8-pixel data.

The 1/0 judgment unit 1344 judges whether the binary data of one pixel output from the one pixel data extract unit 1343 is 0 or 1. When the binary data is 0, the unit selects and outputs multivalue data 0 (1345) to the mask processing unit 1348. When the binary data is 1, the unit selects and outputs multi-value data 1 (1346) to the mask processing unit 1348.

Multi-value data 0 (1345) and multi-value data 1 (1346) are areas used to store multi-value data corresponding to binary data 0 and 1 to be set beforehand in the binary data draw unit.

The multivalue data physical address computing unit 1347 can fetch the multivalue coordinate point (Xd, Yd) to be entered to the multivalue expansion procedure 134 and compute the physical addresses of the frame buffer in memory. These addresses are updated to the destination locations to which the next data is to be written. The computed addresses are output to the mask processing unit 1348 and the draw unit 1349.

The mask processing unit 1348 receives information of whether to execute a mask processing; address information of the frame buffer in which data is written from the multivalue data physical address computing unit 1347; data of the frame buffer that stores the addresses; multivalue data 0 (1345); and multivalue data 1 (1346). The information of whether to execute a mask processing is given from the mode control register, etc. The register exists outside the multivalue expansion procedure 134.

How the drawing result will differ when a mask processing is done and when not done will be explained below using FIGS. 27 and 28.

Figure 27:
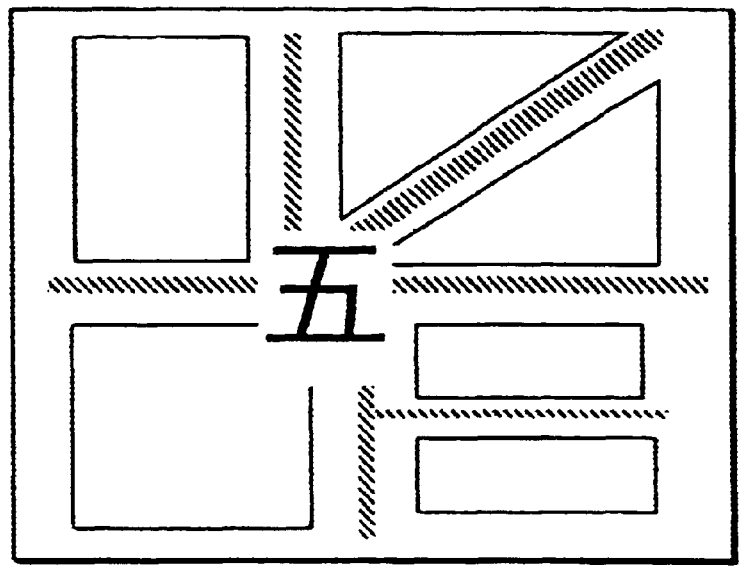
FIG. 27 is a diagram showing the result of the drawing without transparent processing.

FIG. 27 shows how a character is drawn without a transparent processing to be executed as a mask processing. As shown in this figure, the background of the subject character is painted in the color corresponding to "0" of the initial binary bit map data.

Figure 28:
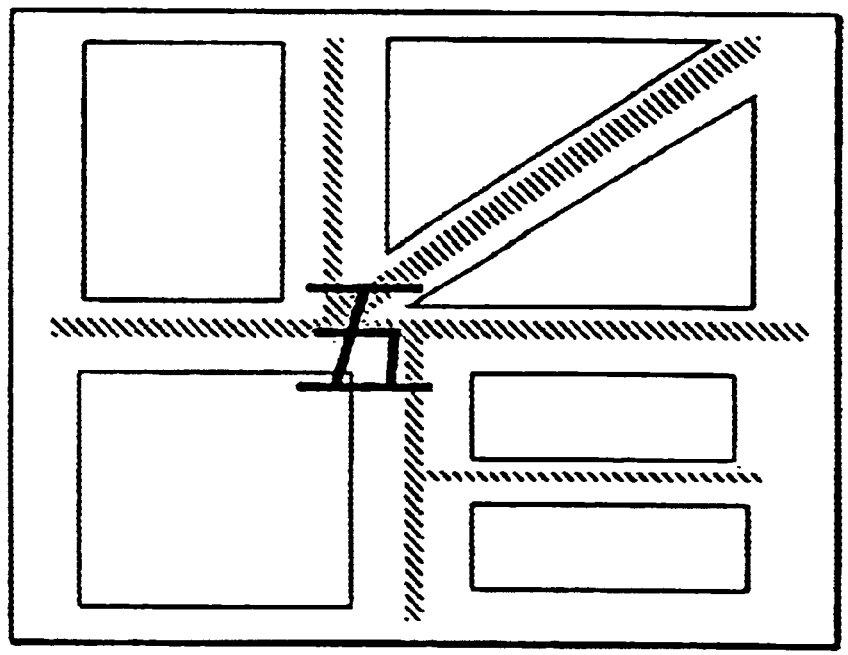
FIG. 28 is a diagram showing the result of drawing with transparent processing.

FIG. 28 shows how a character is drawn with a transparent processing. The grounding frame buffer data is displayed all over except for the portion corresponding to "1" of the initial binary bit map data. Unlike the drawing shown in FIG. 27, where only the portion corresponding to "0" of the initial binary bit map pattern is drawn, the transparent processing allows only the background of the subject character to be drawn as a square and the character is drawn to be transparent.

The draw unit 1349 can write multivalue data output from the mask processing unit 1348 in the memory that has the addresses output from the multivalue data physical address computing unit 1347. The frame buffer 020 is an area used to store drawing data formed in a memory such as a RAM, etc.

Figure 26:
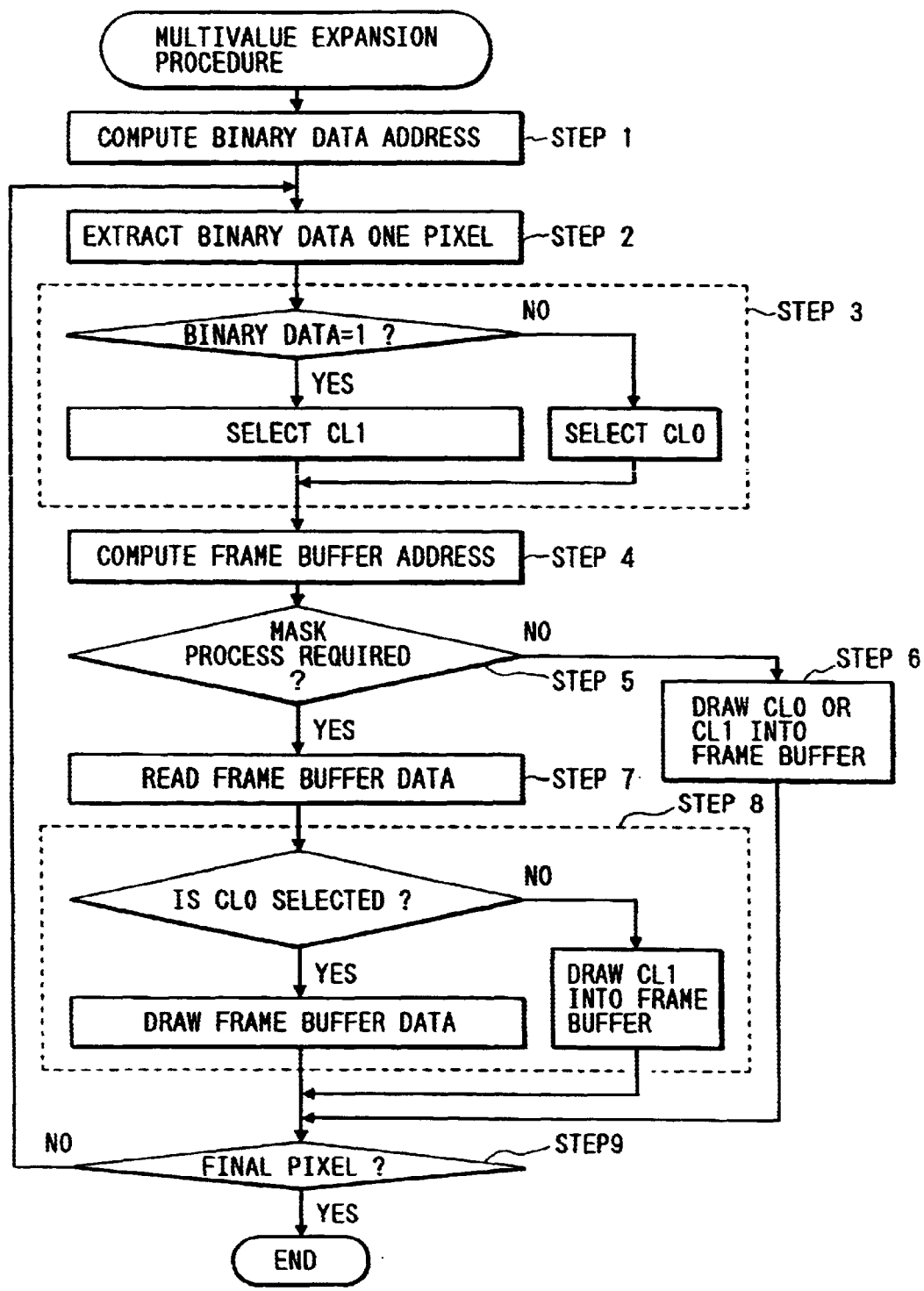
FIG. 26 is a block diagram of a conventional multivalue expansion system operating procedure.

FIG. 26 shows the binary data draw unit processing procedure using the configuration shown in FIG. 25.

This processing comprises steps 1 to 9 as shown below and draws one character by repeating the number of pixels for the character.

In step 1, the memory address corresponding to the specified coordinate point are computed. The coordinate point to be given from outside of the multivalue expansion procedure is the one representing the lower left corner point of the pixel data for the subject character. The computing of the address is done by the binary data physical address computing unit 1341 according to the addresses corresponding to the origin of the pre-defined binary data coordinate system and the memory width in the X direction, which is given to this coordinate system.

In step 2, a pixel of data is extracted from the data that has the addresses computed in step 1. In binary data, one pixel is represented by one bit. This is why in this step one pixel of data is extracted from the two or more pixels of data accessed in bytes, words, long words, etc. (unit for accessing memory) using ordinary buses.

When all the pixels of the subject data are extracted, the addresses computed in step 1 are updated and the data necessary for the next expansion is entered from the binary data storage. This processing is performed in the one pixel data extract unit 1343.

In step 3, a 1/0 judgment is carried out for one pixel extracted in step 2. In other words, when extracted data is 0, the color data stored in the multivalue data 0 (1345) is selected. When extracted data is 1, the color data stored in the multivalue data 1 (1346) is selected. The 1/0 judgment unit executes this processing.

In step 4, the target frame buffer memory addresses are computed. This processing is executed by the multivalue data physical address computing unit 1347.

In step 5, it is judged whether or not the mode is for a transparent processing. This mode information is given from outside the binary data draw unit. When no transparent processing is to be executed at this time, the control goes to step 6. When a transparent processing is to be executed, the control goes to step 7.

Step 6 is a sequence to be generated when no transparent processing is executed. In this step, CL0 or CL1 selected in step 3 is written in the memory that has the address computed in step 5. This completes drawing of one pixel. Control then goes to step 9 to determine whether this is the end of the processing.

Step 7 is a sequence to be generated when a transparent processing is executed. In this step, the address data computed in step 5 is read. In other words, the data in the target frame buffer is held.

Step 8 is a sequence to be generated when a transparent processing is required just like in step 7. In this step, the data to be drawn in a frame buffer is determined according to the selection made in step 3. When CL0 is selected in step 3, the data in the frame buffer read in step 7 is drawn. When CL1 is selected in step 3, the CL1 data is drawn as is.

In step 9, the end of the multivalue expansion means is judged. The repetitive processing to go back to step 2 is controlled until multivalue expansion and drawing are performed for all the pixels of the subject character. When all the pixels are drawn, the multivalue expansion means is ended.

Hereafter, an embodiment to shorten the processing time including multivalue expansion for drawing characters, etc. will be explained using the drawings. In the following explanation, one pixel of multivalue data is represented by 8 bits, but in this invention, the number of bits for one pixel is not limited specially to this amount. Multivalue expansion is also executed not only for drawing characters, but also for painting patterns. In this embodiment, drawing of characters is picked up for explanation, but the multivalue expansion method of this invention can also be applied for other items than characters.

Figure 29:
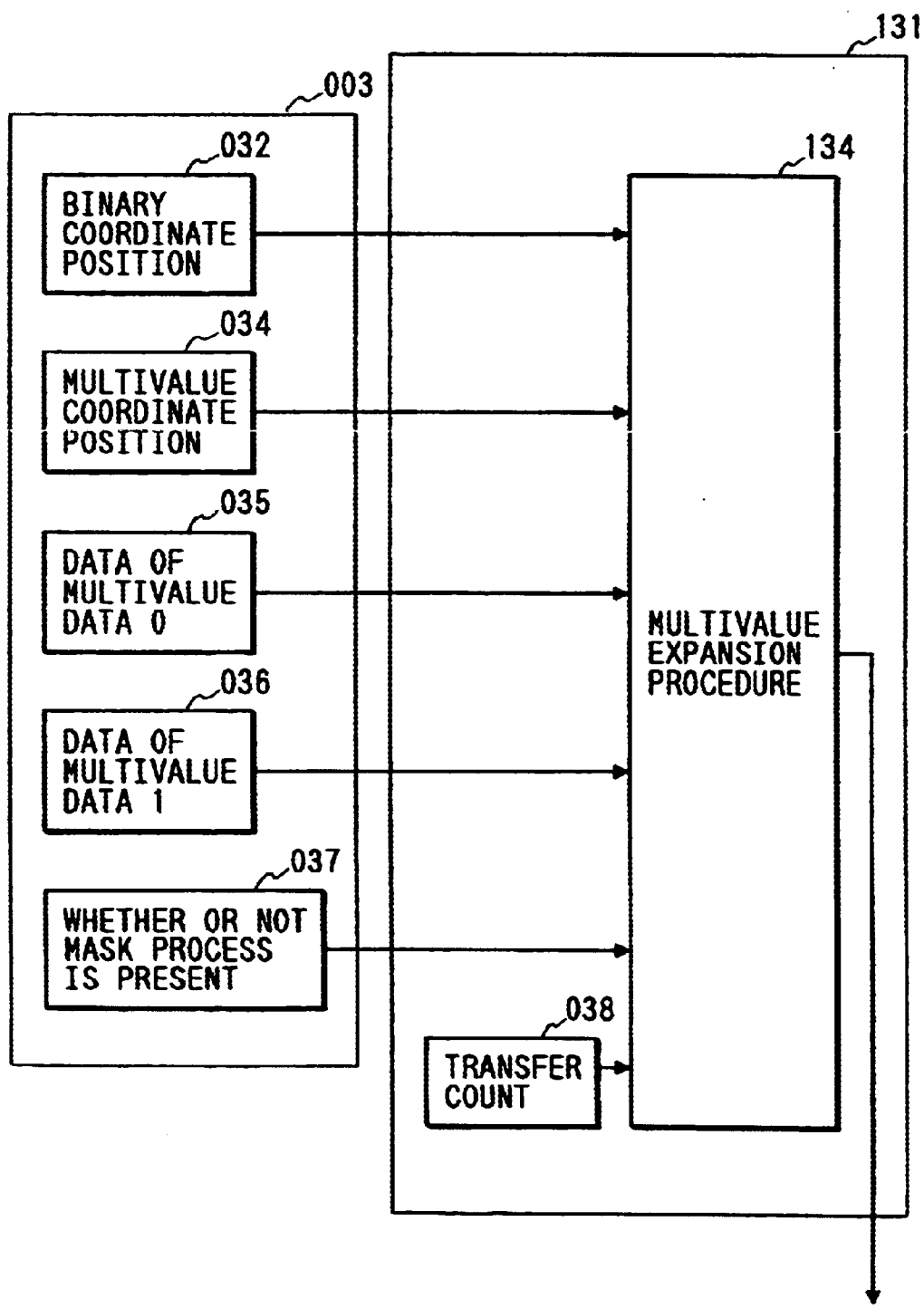
FIG. 29 is a diagram of a drawing procedure including a multivalue expansion procedure.

FIG. 29 shows the function block related to the multivalue expansion procedure 134 that belongs to the drawing procedure 131 in the 3rd memory 013 in which the multivalue expansion procedure of this invention is stored. The multivalue expansion procedure is one process in a series of drawing processes. The following data is obtained from the 2nd memory 031 shown in FIG. 1 through the drawing procedure 131.

The binary coordinate point 032 is a memory indicating the coordinate point in the binary data coordinate system to be expanded. It comprises two data items (X and Y coordinates). The multivalue expansion procedure 134 uses this data to compute the memory addresses, in which binary data is stored, to read the binary data.

The multivalue coordinate point 034 is a memory indicating the coordinate point for drawing existing in the multivalue data coordinate system for the frame buffer. It comprises two data items (X and Y coordinates). The multivalue expansion procedure 134 uses this data to compute the memory addresses of the frame buffer in which data is to be drawn after multivalue expansion. The procedure 134 also uses this data for masking and drawing processings.

The data 035 in the multivalue data 0 is a memory used to store multivalue data cooresponding to binary data 0. This data 035 is defined before a processing is carried out that requires multivalue expansion for characters, etc. The multivalue expansion procedure 134 reads color data corresponding to binary data "0" from this data 035. The color data stored in this data area 035 is changed by the drawing procedure 131 or directly by the CPU.

The data 036 in the multivalue data 1 is a memory used to store multivalue data corresponding to binary data "1". This data 036 is defined before a processing is carried out that requires multivalue expansion for characters, etc. The multivalue expansion procedure 134 reads the color data corresponding to binary data "1" from this data 036. The color data stored in this data area 036 is changed by the drawing procedure 131 or directly by the CPU.

The area for judging whether or not mask processing is required 037 is a memory used to set information of whether or not a mask processing is required for multivalue-expanded data.

The transfer count 038 is computed in the drawing procedure 131 and given to the multivalue expansion procedure 134. This information indicates the number of pixels necessary to complete a drawing. For example, when drawing a character comprising 16×16 pixels, 256 is given as the transfer count.

The multivalue expansion procedure 134 is a memory used to store the multivalue data drawing procedure stored in the frame buffer after binary data is expanded to multivalue data using the said information and a mask processing is performed for the result as a transparent processing as needed.

The basic concept of this multivalue expansion procedure 134 is as follows. Although, multivalue expansion has been executed for each pixel conventionally, in this invention multivalue data patterns made from all the possible combinations of two or more pixels are prepared first, then plural pixels extracted from a binary data group are related to the said multivalue patterns. After this, some mask patterns are also prepared. Those patterns are combinations of information of whether or not a mask processing is required for the plural pixels to be extracted. Then, a multivalue pattern and a mask pattern are selected from elements of extracted plural binary pixels, target frame buffer addresses, information of whether or not a mask processing is required, a transfer count, etc. to process plural pixels simultaneously coping with the mask processing and the memory access restriction.

Figure 30:
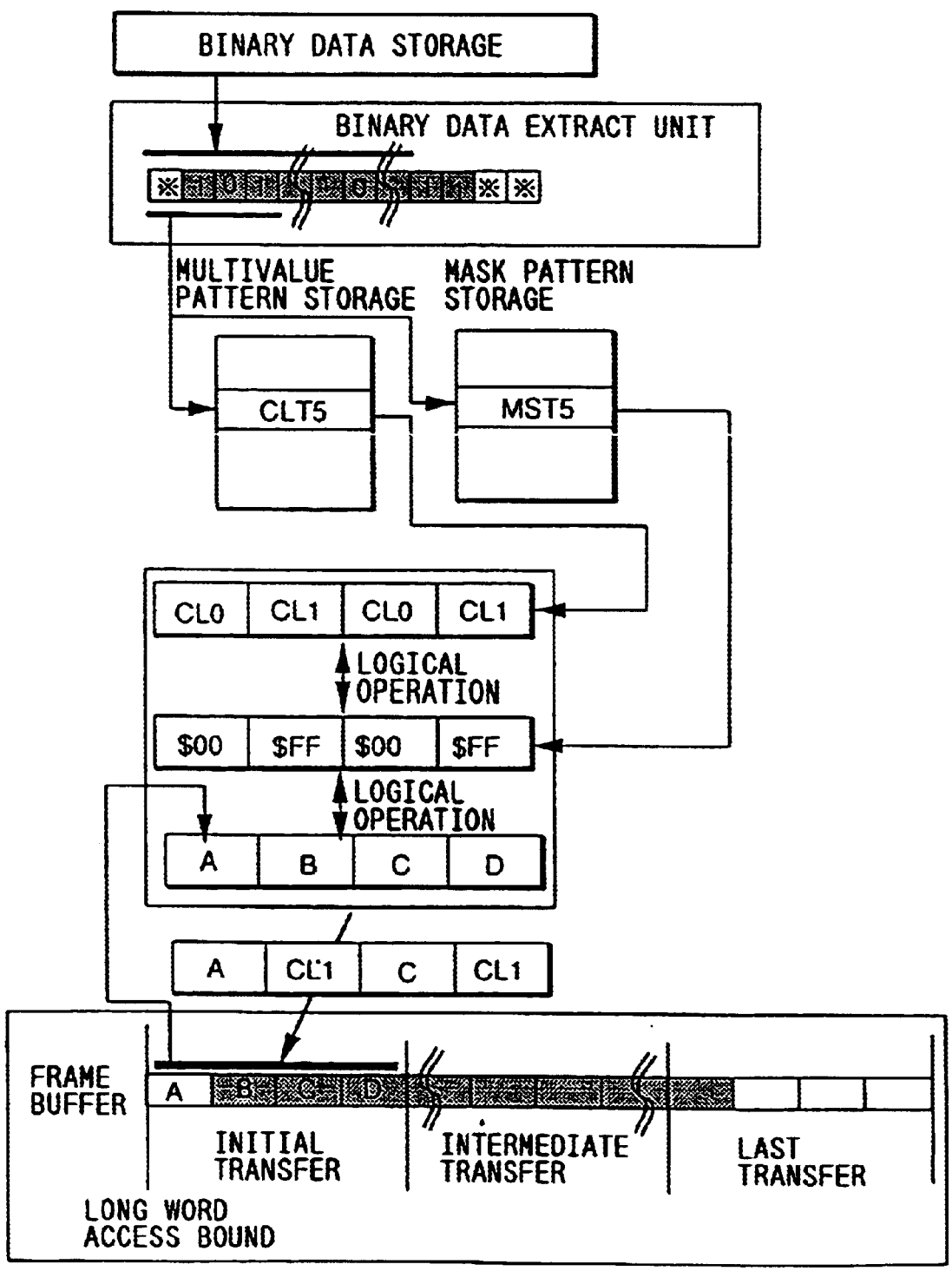
FIG. 30 a diagram indicative of avoiding memory access restriction by mask processing.

Hereafter, how to cope with the memory access restriction by a mask processing will be explained using FIG. 30. According to the memory access restriction, when accessing a memory in long words (4 bytes), the address must be a multiple of 4, and when accessing a memory in words (2 bytes), the address must be a multiple of 2. No restriction is applied when accessing a memory in bytes. In this embodiment, as shown in FIG. 30, the long word access boundary address and the frame buffer address specified freely for writing are assumed to a multiple of four plus one, respectively.

In this case, the target processing is to reduce the memory access count and improve the system performance to write multivalue-expanded 4-pixel data effectively in memory by writing 4 pixels in the frame buffer concurrently in long words. The following processings are executed to write 4 pixels concurrently while coping with the memory access restriction.

Data from the binary data storage is output to the binary data extract unit according to the binary coordinate point. The binary data extract unit extracts the data for the number of pixels to be processed concurrently from the two or more pixels (bits) received. This extraction is adjusted according to the relationship between the frame buffer memory and the physical memory address converted from a multivalue coordinate point, as well as when the concurrent multivalue expansion is performed for plural pixels in the order of the multivalue expansion. At first, for the relationship between the frame buffer memory and the converted physical address, an extraction is performed corresponding to the number of effective data items in the 4-byte data to be written in long words. In the embodiment shown in FIG. 30, since no drawn data is stored in the point corresponding to A selected from among the points in which data A, B, C, and D to be transferred in long words are stored, the number of effective data items becomes 3. Receiving this result, the binary data extract unit divides 3-pixel data as right-justified 4-bit data. At this time, the left end 1-bit data does not affect the subsequent processings at all, so 0 or 1 data is padded in it. Then, how many times the concurrent multivalue expansion has been performed for plural pixels before the subject one indicates the initial, an intermediate, or the last multivalue expansion executed for a binary data group. In other words, this expansion is carried out to prevent the said effective data position from being changed. The data position is changed according to whether the data expanded by a concurrent processing is transferred initially, intermediately, or lastly to be written in the frame buffer. When the data is transferred initially, the effective data is right-justified in consecutive 4 pixels. When the data is transferred intermediately, all the 4 pixels become effective. When the data is transferred last, the effective data is left-justified. In case of binary data extraction in the initial transfer, only the number of binary pixels is extracted while they are right-justified corresponding to the number of effective pixels in the frame buffer, as explained in the relationship with the frame buffer addresses. In case of the intermediate transfer, since all the pixels are effective, binary data after the first extracted one is extracted by 4 pixels at a time. In case of the last transfer, the rest of the binary data following the extracted data in the intermediate transfer is left-justified and 4 bits are extracted from this data. In this case, 0 or 1 is padded in points corresponding to the data except for the right side effective data.

The binary data dividing method explained above allows the displacement of the effective pixel point from the long word access boundary caused by the memory access restriction to be adjusted with the dividing method for binary data in the initial and last transfers. Intermediate transfers can be made regardless of the memory access restriction.

According to the binary data extracted in this way, corresponding multivalue data for 4 pixels can be obtained in multivalue expansion by searching the table in which 4-pixel multivalue data combinations are stored. The table searching is done by assuming extracted 4-pixel multivalue data as a numeral and by assuming that the numeral is the address at which to analyze the correspondence to the table. On the other hand, one corresponding data item is obtained from the mask pattern table together with 4-pixel mask point combinations according to the extracted binary data, the address restriction related address displacement type, and the said transfer order information. For example, in case of the initial transfer shown in FIG. 30, a pattern in which 0 is padded in all the 8 bits of a byte corresponding to the masking position is selected for the data corresponding to the point A existing in the frame buffer. It is judged from the address displacement and the binary data with which the point C, which should be masked, is extracted that no data should be written in the point. When the operation mode that requires no mask processing is selected, the pattern that masks the point A to cope with the address displacement is selected. This is because no mask processing is required for the point C. And finally, write data is generated in the frame buffer when a logical product of a 4-pixel multivalue data combination pattern and a mask pattern, obtained in this way, and a logical product of the data of A to D points in the frame buffer and a mask pattern of reversed value, and a logical sum of those two logical products are assumed.

In case of intermediate transfers, the mask pattern is selected only by watching the masking point when a mask processing is selected. The memory access restriction problem is already solved by the initial transfer. In case of the last transfer, the processing is the same as other transfers except that the masking point to cope with the memory access restriction differs from that of the initial transfer.

In such concurrent processing of plural pixels, for example, when expanding the binary data for 8 pixels, access to the frame buffer is required only two times when memory access is restricted. When memory access is not restricted, the access to the frame buffer is required only 3 times to assume the same processing as that of the conventional system, in which data must be written in the frame buffer 8 times.

Figure 31:
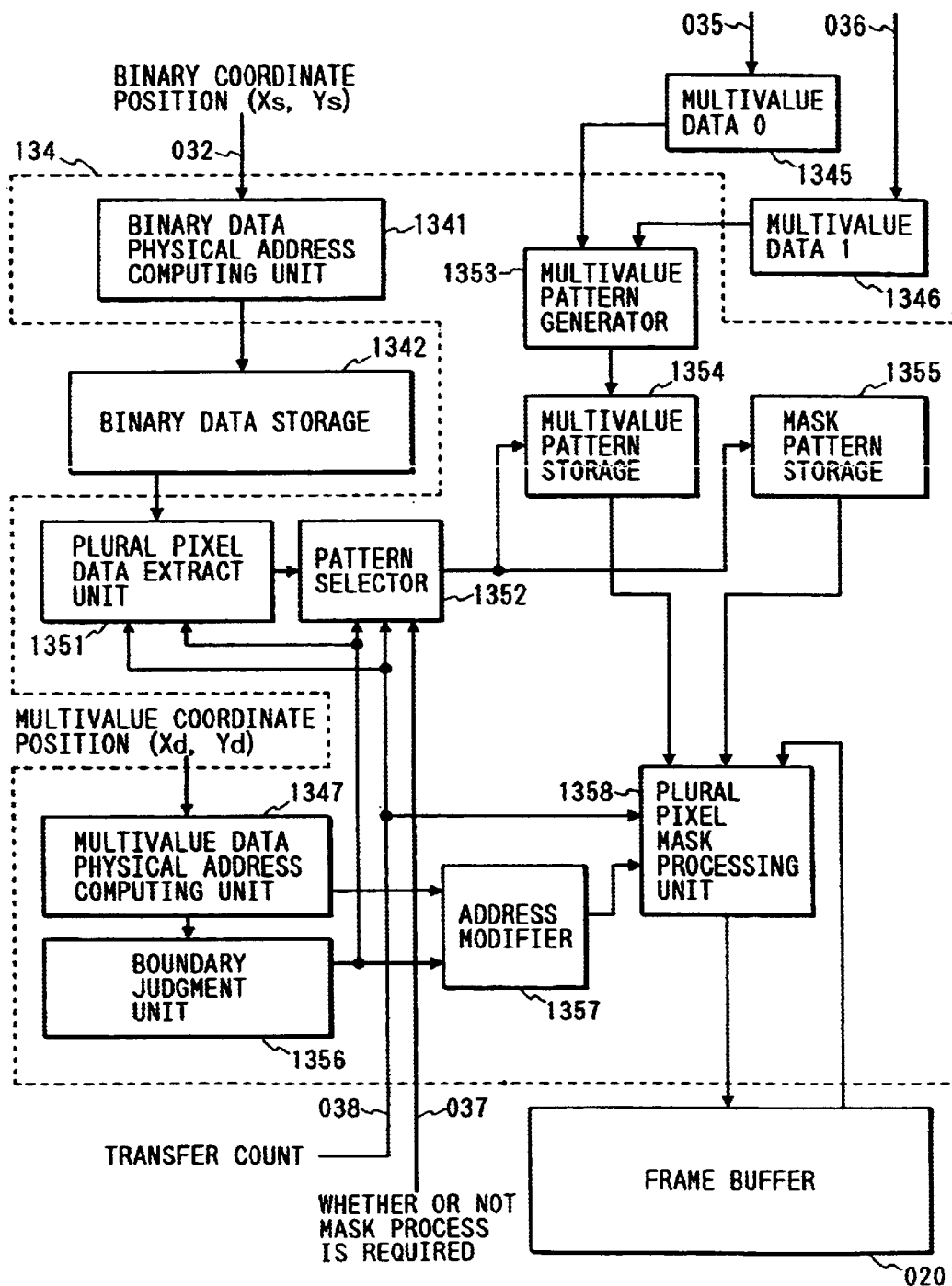
FIG. 31 is a block diagram of a multivalue expansion system.

FIG. 31 is a functional block diagram of the multivalue expansion procedure 134. In this section, however, an explanation of the binary data physical address computing unit 1341, the binary data storage 1342, the multivalue data 0 (1345), the multivalue data 1 (1346), the multivalue data physical address computing unit 1347, and the frame buffer 020 will be omitted, since they are the same as those in the basic configuration of the conventional system shown in FIG. 25 and they have the same functions as those of the conventional system.

The boundary judgment circuit 1356 can judge the relationship with the memory access restriction according to the addresses of drawing points, which are output from the multivalue data physical address computing unit 1347 and stored in the frame buffer 020.

Judgment of the corresponding state is carried out in the circuit 1356 by decoding the lower 2 bits of the target address output from the multivalue data physical address computing unit 1347 and stored in the frame buffer. The lower 2 bits of the target address is decoded because the address must be a multiple of 4 when data is transferred in long words (4 bytes) in this embodiment.

Figure 32:
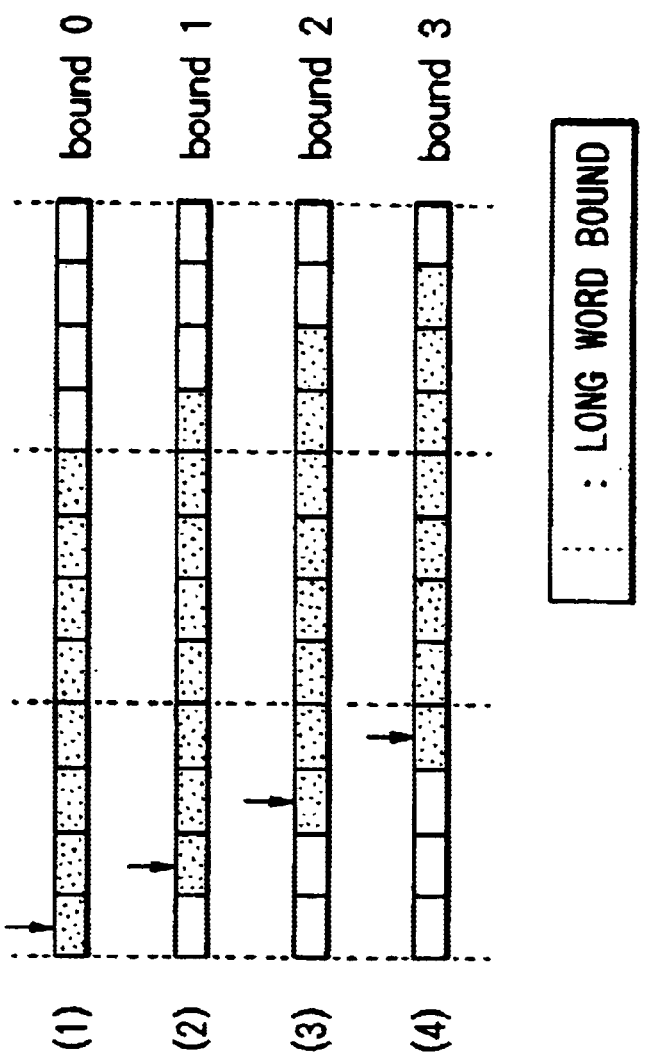
FIGS. 32A and 32B are diagrams which show operation of a boundary judgment unit.

There are 4 states which appear after the decoding, as shown in FIG. 32A. Each state indicates:

State (1) The address is a multiple of 4 and it does not conflict with the memory access restriction.

State (2) The address is a multiple of 4+1 and it conflicts with the memory access restriction.

State (3) The address is a multiple of 4+2, and it conflicts with the memory access restriction.

State (4) The address is a multiple of 4+3, and it conflicts with the memory access restriction.

In this embodiment, those states are called bound 0, bound 1, bound 2, and bound 3, as seen in FIG. 32B. Those information items are output to the plural pixel data extract unit 1351, the pattern select unit 1352, and the address modifier 1357. A processing to the subject bound is selected in each block.

The plural pixel data extract unit 1351 can extract the binary data for multivalue expansion from the binary data for 8 pixels output from the binary data storage 1342 according to the information from the boundary judgment unit 1356 and the information from the transfer count 038. Extracted data is transferred to the pattern select unit 1352 as the information to select the target pattern from the multivalue pattern storage 1354 and the mask pattern storage 1355. This select information is assumed to be 16 types of information (O to F) when 4 pixels are processed concurrently.

Figure 33:
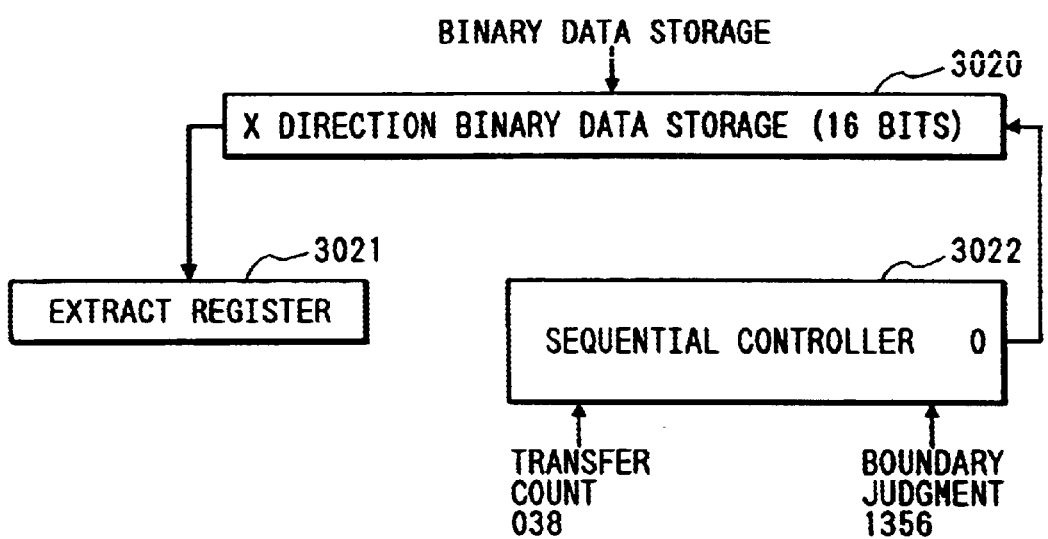
FIG. 33 is a block diagram illustrating the internal configuration of a plural pixel extract unit.

FIG. 33 shows the internal configuration of the plural pixel data extract unit 1351.

The X direction binary data storage 3020 is a register set used to store binary data for 16 pixels transferred from the binary data storage. In this embodiment, character data comprising 16×16 dot pixels is assumed for drawing. Thus, all X direction related continuous data is stored in this register.

The extract register 3021 is used for binary data for 4 pixels extracted from the X direction pixel data stored in the X direction binary data storage 3020.

The sequence controller 3022 can control the operation of the plural pixel data extract unit 1351 according to the information output from the transfer count 038 and the boundary judgment unit 1356.

Figure 34:
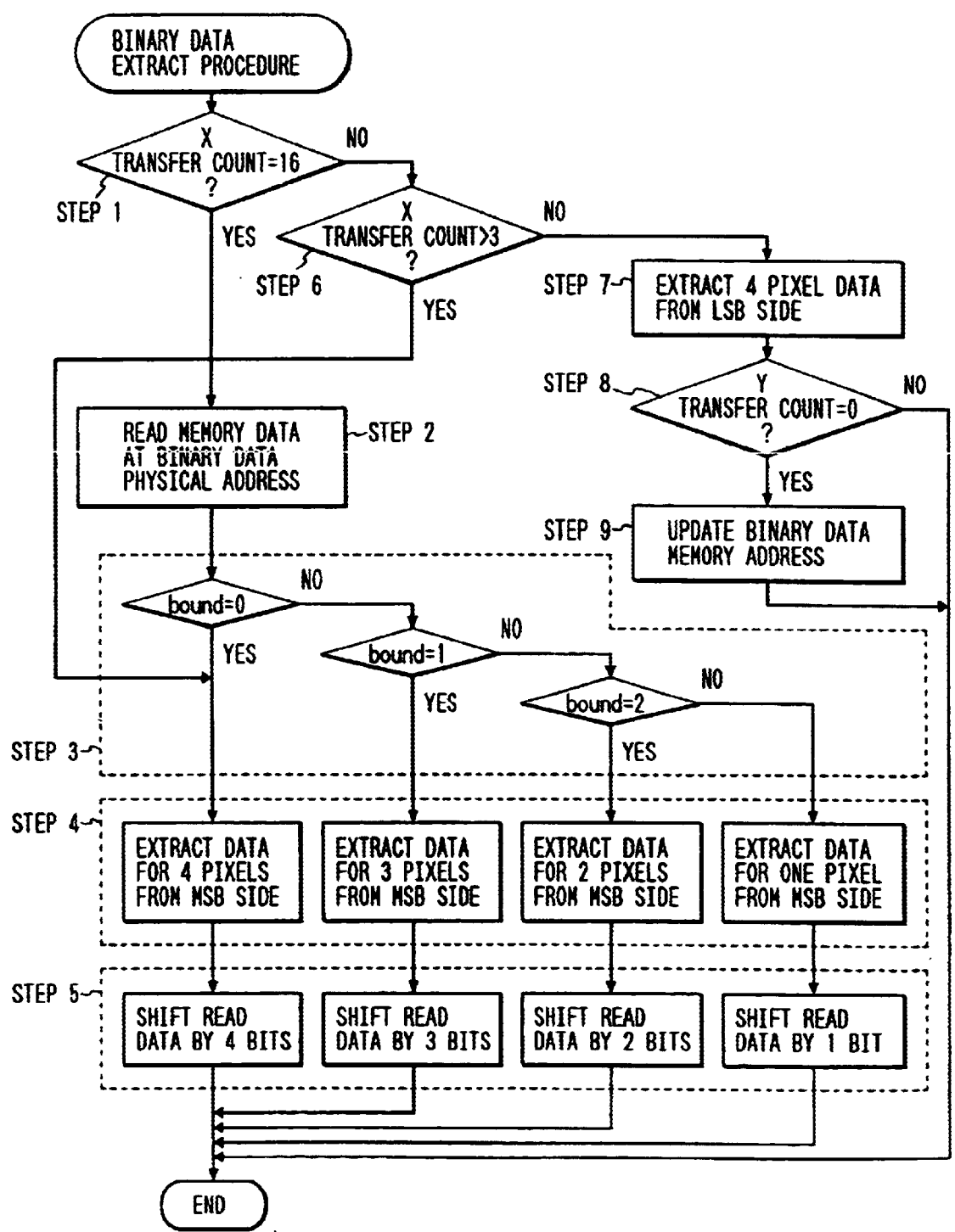
FIG. 34 is a flow diagram which illustrates the operating procedure of the plural pixel extract unit.

FIG. 34 shows the operation of the sequence controller 3022.

In step 1, according to the X direction transfer count selected from the information from the transfer count 038, the processing branches. When the transfer count is 16, the processing goes to step 2 and following steps. In other cases, the processing goes to step 6 and following steps. The transfer count 038 indicates the remaining number of pixels to draw. Character data in the information comprises 16 pixels in the X direction. Thus, this judgment is carried out to determine whether or not the transfer is the first one in the X direction.

Step 2 is executed when it is judged that the transfer is the first one in the X direction in step 1. The pixel data that has the address computed in the binary data physical address computing unit 1341 is read from the binary data storage 1342 and then stored in the X direction binary data storage 3020. With this, 16-bit data, which is 16-pixel binary data, is stored in a register.

In step 3, the information that indicates the relationship with the memory access restriction output from the boundary judgment unit 1356 is judged to select the subsequent processings.

The following processings are executed according to the result of the judgment in step 3.

For bound 0, 4-pixel binary data beginning at the MSB side is transferred to the extract register 3021 from the X direction binary data storage 3020.

For bound 1, 3-pixel binary data beginning at the MSB side is transferred to the extract register 3021 from the X direction binary data storage 3020.

For bound 2, 2-pixel binary data beginning at the MSB side is transferred to the extract register 3021 from the X direction binary data storage 3020.

For bound 3, 1-pixel binary data beginning at the MSB side is transferred to the extract register 3021 from the X direction binary data storage 3020.

Each pixel data transferred from the X direction binary data storage 3020 to the extract register 3021 is supplied to the pattern select unit as a right-justified numeral. Thus, the representation range of the data numerated with each bound becomes as shown below.

For bound 0, the range is 0 to 15. For bound 1, the range is 0 to 7. For bound 2, the range is 0 to 3. For bound 3, the range is 0 to 1.

In step 5, the data transferred to an extract register in a 16-bit register is shifted out, preparing for the extraction of the next pixel. Since the amount of data extracted differs among bounds, the shifting value also differs as follows. For bound 0, data is shifted by 4 bits to the left. For bound 1, data is shifted by 3 bits to the left. For bound 2, data is shifted by 2 bits to the left. And, for bound 3, data is shifted by one bit to the left. 0 is padded from the LSB side when data is shifted.

Step 6 is a sequence to be executed when the X direction transfer count is 16 in step 1. In this step, a judgment is carried out to determine whether or not the X direction transfer count is 3 or greater. This judgment has the following meaning.

A series of multivalue expansion refers to the executing of a 4-pixel concurrent processing sequence. When the remaining transfer count is 3 or under, therefore, it indicates that the transfer is the last one in the X direction. In other words, this judgment is performed to determine whether or not the subject transfer is the last one in the X direction. When the transfer is the last one, control goes to step 7. In other cases, pixel data is extracted in units of 4 pixels just like in case of bound 0 in step 4.

In step 7, data for 4 pixels (4-bit data) beginning at the MSB is transferred to an extract register from a 16-bit binary data register. Step 7 is a sequence to be executed when the subject transfer is judged the last one in the X direction in step 6. Since 4-pixel data is extracted in this step as well, data other than pixels is also extracted depending on the bound. In such a case, the pattern select unit 1352 ignores data other than pixels.

In step 8, a judgment is performed to determine whether to end the whole character drawing processing according to the Y direction transfer count in the transfer count 038. If it is judged that any data is left unprocessed in the Y direction, control goes to step 9, where the binary data memory address is updated to read the next X direction binary data.

In step 9, the Y direction address is updated, preparing for reading the next X direction binary data.

FIGS. 35, 36, 37, and 38 show operation examples that use the above sequences.

FIG. 35 shows the status change of the X direction binary data storage 3020 and the extract register 3021 when the transfer count is 16 and the bound is 0. In this case, it is assumed that the value of the data entered from the binary data storage 1342 indicates "1000101011101000". The sequence controller 3022 transfers 4-bit data beginning at MSB to the extract register 3021 from the X direction binary data storage 3020 according to the X direction transfer count and the 63 bound information. After this, the data in the X direction binary data storage 3020 is shifted by 4 bits to the left, and the data value becomes "1010111010000000". In this figure, the LSB side hatching portion indicates "0" padded after the left shifting.

FIG. 36 shows the status change of the same units when the transfer count is 16 and the bound is 2. The value of the data entered from the binary data storage 3020 indicates "1000101011101001". The sequence controller transfers right-justified 2-bit data beginning at MSB from the X direction binary data storage 3020 to the extract register 3021 according to the X direction transfer count and the bound information. As a result, "0010" is set in the extract register 3021. After this, the sequence controller shifts the data in the X direction binary storage 3020 by 2 bits to the left. The data value thus becomes "1010111010000100".

When the transfer count is 16 and the bound is 1 or 3, the operation is the same as the operation in FIG. 33, when the bound is 2, except that the number of bits to be transferred to the extract register 3021 and the number of bits to be shifted in the X direction binary data storage after the transfer are 1 bit and 3 bits respectively.

Figure 37:
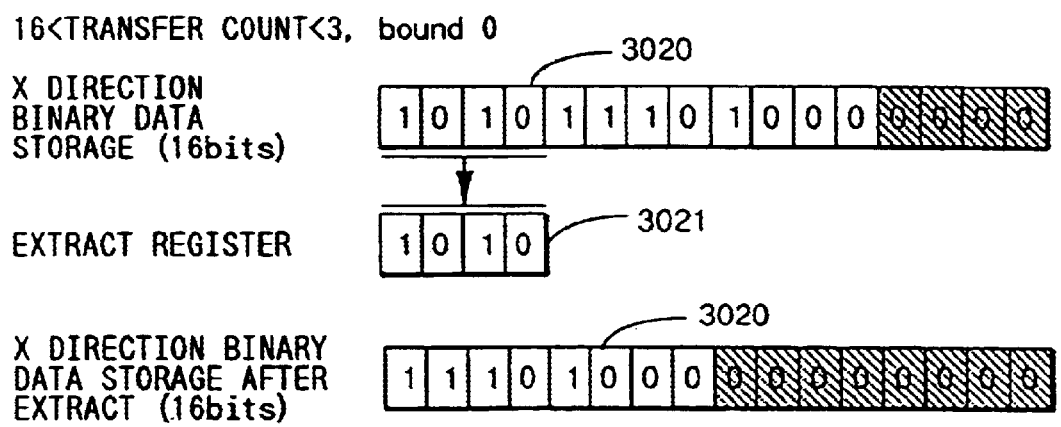
FIG. 37 is a diagram showing still another example of plural pixel extract.

FIG. 37 shows the status change of the X direction binary data storage 3020 and the extract register 3021 when the transfer count is greater than 16 and smaller than 3, and the bound is 0. The value of the data in the X direction binary data storage 3020 is "1010111010000000" after the extraction performed thus far. In cases except for those when the transfer count is 16, the sequencer controller 3022 transfers data in units of 4 bits from the X direction binary data storage 3020 to the extract register 3021. In this case, therefore, "1010" is transferred beginning at the MSB from the X direction binary data storage 3020 to the extract register 3020. After this, the data in the X direction binary data storage 3020 is shifted by 4 bits to the left, and the data value becomes "111010000000000".

Figure 38:
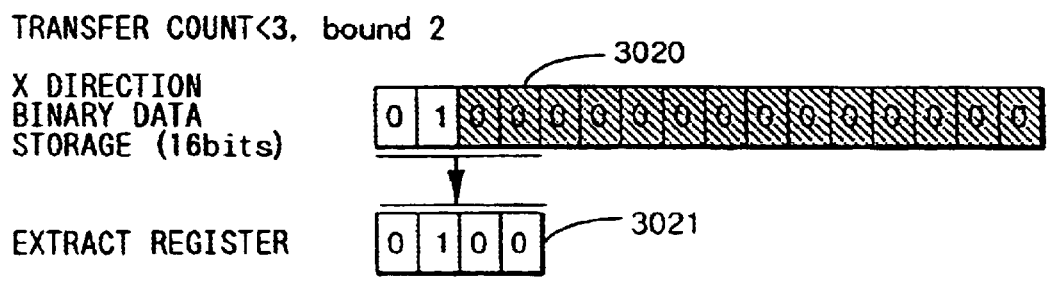
FIG. 38 is a diagram of another example of plural pixel extract.

FIG. 38 shows the status change of the X direction binary data storage 3020 and the extract register 3021. When the transfer count is smaller than 3, and the bound is 2, in the X direction binary data storage 3020, only the 2 bits on the MSB side are significant as binary data. The LBS hatching part is "0" padded after the shifting. Even in such a case, the sequence controller 3022 transfers 4-bit data beginning at the MSB to the extract register 3021. Thus, the value of the data stored in the extract register 3021 becomes "0100".

The multivalue pattern generation unit 1353 generates all patterns to be assumed when the multivalue data 0 (1345) and the multivalue data 1 (1346), in which multivalue data for one pixel is stored, respectively, are combined for plural pixels. The multivalue pattern generation unit 1353 can output those patterns to the multivalue pattern storage 1354. In this embodiment, since it is premised that 4 pixels are processed concurrently, 16 types of patterns are generated.

Figure 39:
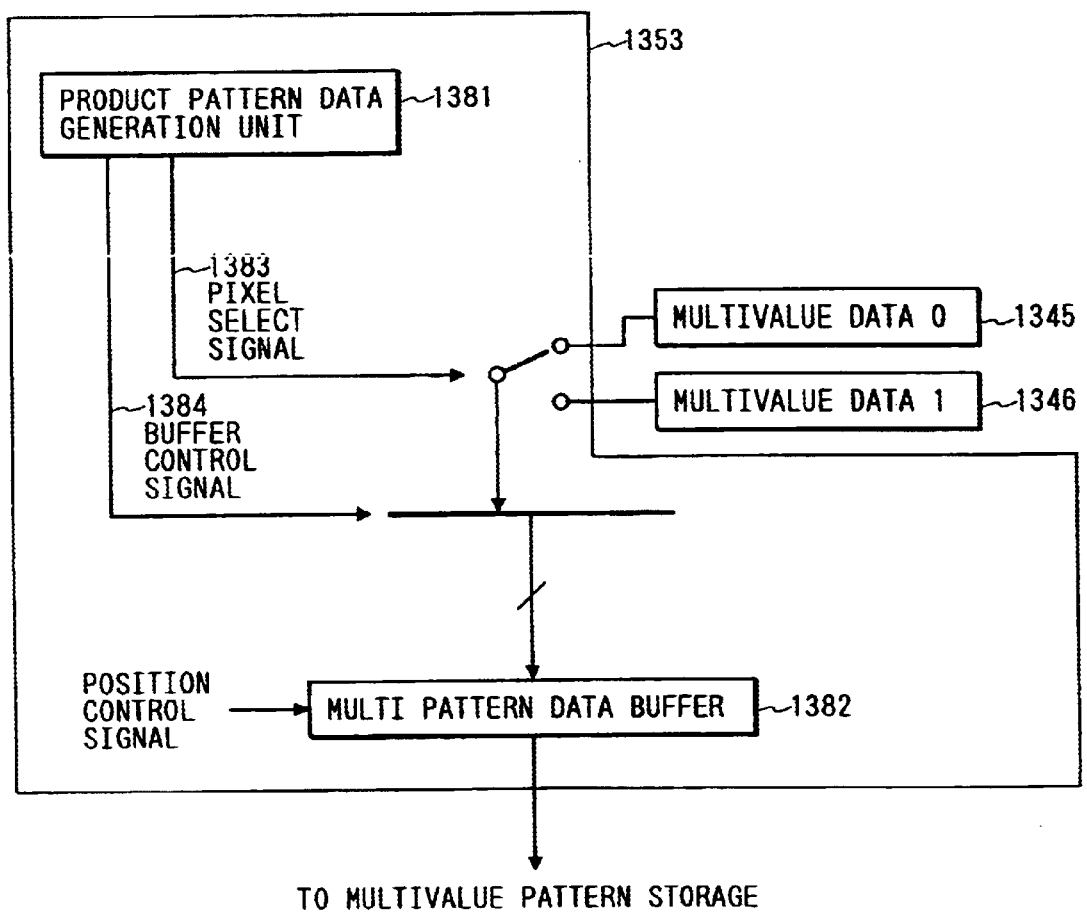
FIG. 39 is a schematic diagram of a multivalue pattern generation unit.

FIG. 39 shows the configuration of the multivalue pattern generation unit 1353. As shown in this figure, the product pattern data generation unit 1381 computes the number of combinations according to the number of pixels to be processed concurrently. In case of concurrent processing of 4 pixels as in this embodiment, since the number of combinations becomes 16, the unit 1353 generates 0 to 15 bit patterns as combination information. This information is used to select multivalue data 0 (1345) and multivalue data 1 (1346) as the bit select signal and to control the number of data items to be written in the multivalue pattern data buffer 1382.

The pixel select signal 1383 output from the product pattern generation unit is bit patterns, which are combination data of plural pixels output sequentially. In case of a 4-pixel concurrent processing, "0000" that represents "0" is output from the MSB side bit by bit, then "0001" that represents "1" is output in the same way. And finally, "1111" that represents "15" is output. When this information output bit by bit is 0, multivalue data 0 is selected. When the information is 1, multivalue data 1 is selected.

The buffer control signal 1384 is used to control multivalue data 0 (1345) or multivalue data 1 (1346) to be written in the specified position in the multivalue pattern buffer 1382. The multivalue pattern data buffer stores selected multivalue data 0 (1345) or multivalue data 1 (1346) according to the number of pixels to be processed concurrently, then outputs the data to the multivalue pattern storage 1354.

This multivalue pattern generation processing is started synchronously with the updating of multivalue data 0 (1345) and multivalue data 1 (1346) or it is started with a dedicated instruction for starting.

The multivalue pattern storage 1354 can store multivalue data combination patterns for the number of pixels to be processed concurrently, which are output from the multivalue pattern generation unit 1353. FIG. 40 shows the contents of the data stored in the multivalue pattern storage 1354. In this way, 16 types of tables (CLT0 to CLT15) are created.

The mask pattern storage 1355, as shown in FIG. 41, can store MST0 to MST15, which are all the mask data combinations corresponding to the number of pixels to be processed concurrently. In this embodiment, therefore, the data in this unit 1355 comprises 16 types of combination data just like multivalue patterns.

We return to FIG. 31 again to continue the explanation.

The pattern select unit 1352 can select one of the mask patterns and the multivalue patterns stored in the multivalue pattern storage 1354 and the mask pattern storage 1355, which corresponds to the said input information according to the information output from the plural pixel data extract unit 1351, the boundary judgment unit 1356, and information as to whether or not a mask processing is required 036. In this embodiment, the binary data for 4 pixels entered from the plural pixel data extract unit 1351 is handled as a 4-bit numeral. Thus, ) to F in hexadecimal and handled as data.

Figure 42:
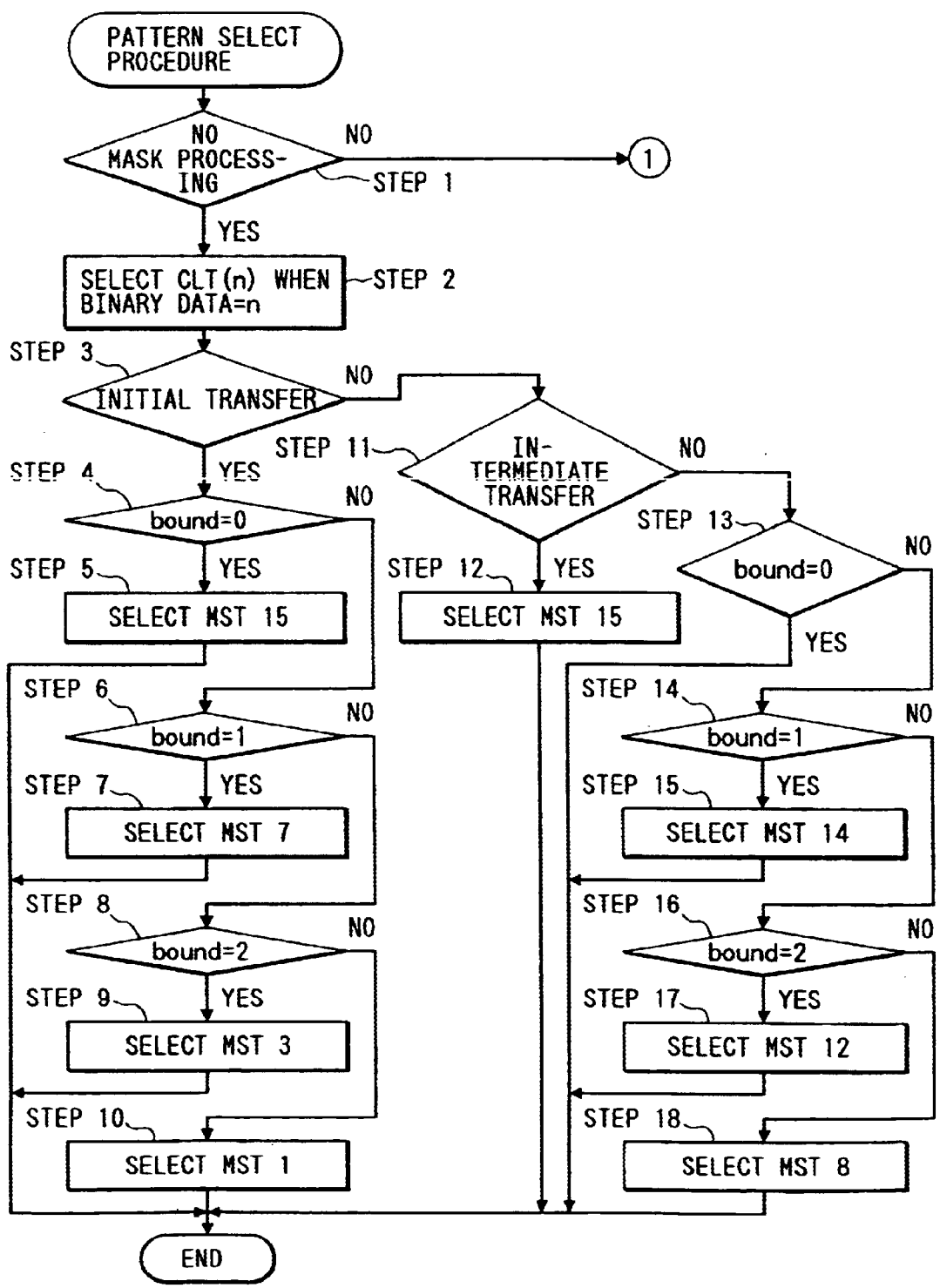
FIG. 42 is a flow diagram of a pattern judgment procedure.
Figure 43:
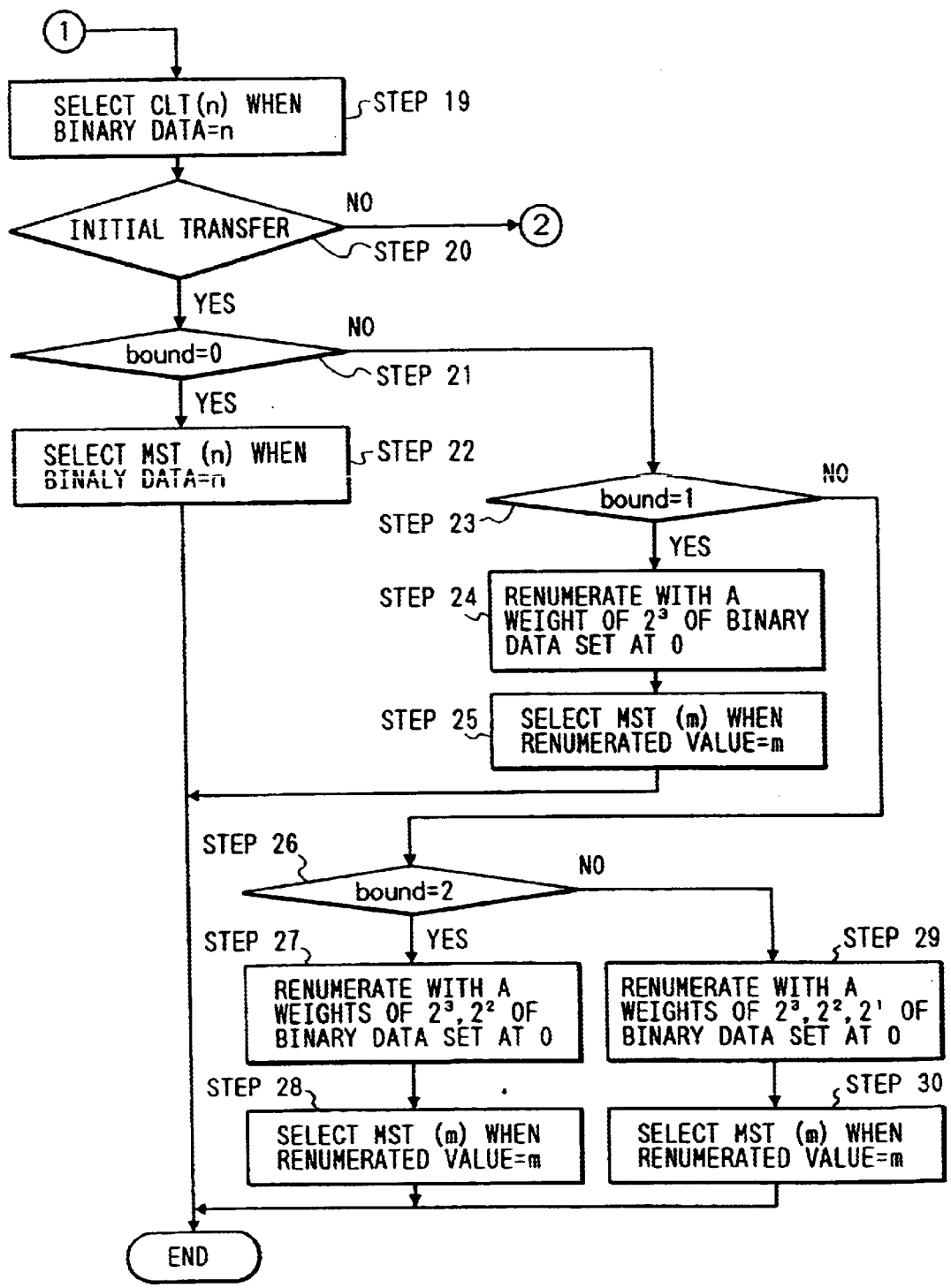
FIG. 43 is a flow diagram of another pattern judgment procedure.
Figure 44:
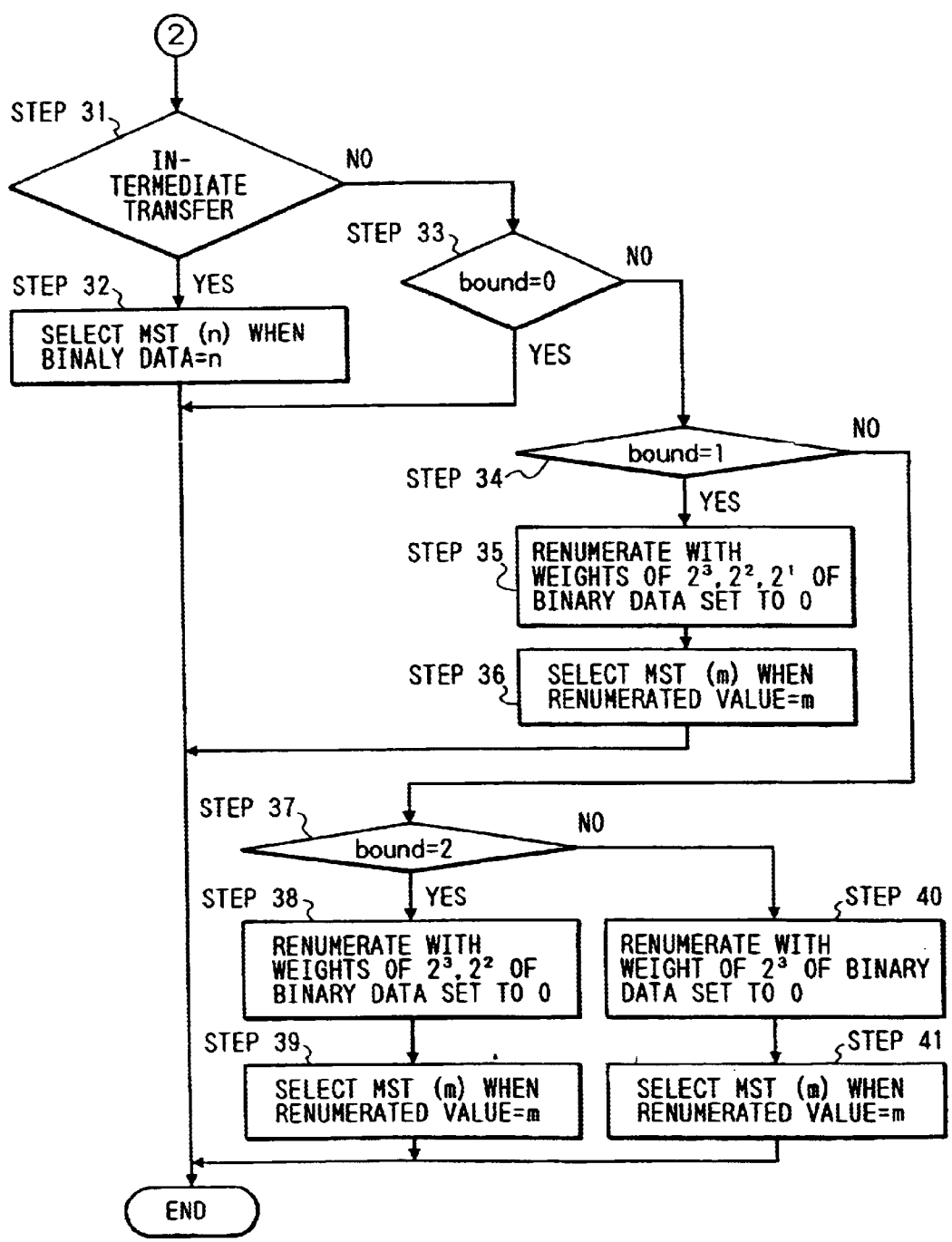
FIG. 44 is a flow diagram of still another pattern judgment procedure.

FIGS. 42, 43, and 44 show the procedures to select necessary information from the multivalue pattern storage and the mask pattern storage according to the said information supplied to the pattern select unit 1352. Hereafter, a case that requires no mask processing will be explained using FIG. 42 and a case that requires a mask processing will be explained using FIGS. 43 and 44.

At first, FIG. 42 will be explained below.

A pattern selection begins with judgment as to whether or not a mask processing is required. According to the result of the judgment in step 1, control goes to step 2 when no mask processing is required. When a mask processing is required, control goes to step 19 shown in FIG. 43. In step 2 to be executed when a mask processing is required, a multivalue pattern is selected from the patterns stored in the multivalue pattern storage. In this processing, binary data for plural pixels output from the plural pixel extract unit is handled as a numeral represented by a binary number. Then, a multivalue pattern corresponding to the binary number is selected. If the value of the binary data for plural pixels is assumed to be n, the selected multivalue pattern becomes CLT (n).

The processings in and after step 3 are for selecting a mask pattern. When a transfer for multivalue expansion is an initial one, control goes to step 4. In one cases, control goes to step 11.

A judgment is carried out for the transfer type (initial transfer, intermediate transfer, or last transfer) according to the transfer count 038 supplied to the multivalue expansion procedure 134 to control the transfer sequence. In the multivalue expansion procedure 134, this transfer count is stored after the number of actual multivalue-expanded pixels is subtracted from the count each time. In other words, in the multivalue expansion procedure 134, the number of remaining multivalue expanded pixels is put under control, the transfer sequence is divided into initial, intermediate, and last ones according to the number of pixels, and multivalue expansion is performed with a procedure corresponding to the subject transfer type. The transfer sequence judgment is performed as follows. When the transfer count stored in the multivalue expansion procedure 134 matches the transfer count 038 supplied to the multivalue expansion procedure 134, it is judged as the initial transfer. When the transfer count stored in the multivalue expansion procedure 134 is under the number of pixels to be processed concurrently, it is judged as the last transfer. In other cases, it is judged as an intermediate transfer.

When the transfer is judged as the initial transfer, the processing in step 4 is executed. In step 4, it is judged whether or not the frame buffer destination address displacement type is bound 0 for the memory access restriction entered from the boundary judgment unit 1356. When the bound is 0 for the initial transfer, MST 15 is selected from the mask storage in step 5. In other cases, it is judged whether or not the bound is 1 in step 6. If the bound is 1, MST7 is selected in step 7. In other cases, it is judged whether or not the bound is 2 in step 8. If the bound is 2, MST3 is selected in step 9. In other cases, MST1 is selected in step 10 to end the series of processings.

If it is judged "NO" in step 3, that is, when the transfer is not the initial one, it is judged whether or not the transfer is an intermediate one in step 11. When it is judged to be an intermediate transfer in the step, MST15 is selected regardless of the bound information. If it is not an intermediate transfer, that is, when it is the last transfer, the bound information is judged in steps 13, 14, and 16 respectively. And when the bound is 0, the processing is ended. When the bound is 1, MST14 is selected. When the bound is 2, MST12 is selected. When the bound is 3, MST8 is selected. Especially, when the bound is 0 for the last transfer, the remaining transfer count always becomes 0. Thus, the end of processing is selected with no operation in this case.

FIG. 43 shows the procedure to select a pattern when a mask processing is performed after the judgment in step 1. In step 19, a multivalue pattern is selected from the multivalue pattern storage. The judgment method is the same as that in step 2 when no mask processing is required. The processing in step 20 corresponds to that in step 3 when no mask processing is required. In this step, it is judged whether or not the transfer is the initial one in the transfer sequence. If it is judged to be the initial one in step 20, the processings in and after step 21 are executed. The processings in and after step 21 correspond to that in step 4 when no mask processing is required. A judgment is carried out for the relationship with the memory access restriction output from the boundary judgment unit. When the bound is 0, MST (n) is selected corresponding to the value n, which is a binary number. When the bound type is 1, the bits, each of which has a weight of 23 when extracted binary data is handled as numerals, are all set to 0. Then, a renumerated value m is found. The mask pattern MST (m) is selected in this case. When the bound is 2, the bits, each of which has a weight of 23, as well as the bits, each of which has a weight of 22 when extracted binary data is handled as numerals, are all set to 0. Then, a renumerated value m is found. The mask pattern MST (m) is selected in this case. When the bound is 3, the bits, each of which has a weight of 23, a weight of 22, and a weight of 21, when extracted binary data is handled as numerals, are all set to 0. Then, a renumerated value m is found. The mask pattern MST (m) is selected in this case.

FIG. 44 shows the procedure to select a pattern when the transfer is judged to be an intermediate or the last one in step 20. In step 31, it is judged whether or not the transfer is an intermediate one. When it is judged to be an intermediate one, control goes to step 32. In other cases, control goes to step 33.

Step 32 is a procedure to select a mask pattern when the transfer is judged to be an intermediate one. The MST (n) is selected corresponding to the numerated value n of extracted binary data. When the transfer is judged to be the last one in the transfer sequence, a mask pattern is selected for each bound type judged according to the information from the boundary judgment unit, just like the processings in and after step 13 when no mask processing is required. Steps 35 and 36 are procedures to judge a mask pattern when the bound type is 1. In these steps, a value m, renumerated with bits that, having a weight of 23, 22, and 21 when extracted binary data is handled as numerals, are set to 0, is found to select a mask pattern MST (m). Steps 38 and 39 are procedures to judge a mask pattern for bound 2. A value m, numerated with bits that, having a weight of 23 and 22, when extracted binary data is handled as numerals, are set to 0, is found to select a mask pattern MST (m). Steps 40 and 41 are procedures to judge a mask pattern for bound 2. In this case, a value m, numerated with bits that, having a weight of 23 when extracted binary data is handled as numerals, are set to 0, is found to select a mask pattern MST (m). In this embodiment, each pattern corresponding to every case is selected with the procedures to select multivalue patterns and mask patterns as explained above.

The multivalue pattern select unit stores the transfer count 038 to be entered to the multivalue expansion procedure 134 to control the transfer sequence, and subtracts the number of pixels from the transfer count each time a multivalue expansion is performed. With this, information that indicates the initial transfer, an intermediate transfer, or the last transfer, which is an element for pattern selection, is generated.

The address modifier 1357 modifies address data so that the address data may be returned to the nearest address that satisfies the memory access restriction when memory accesses are restricted and outputs the result to the plural pixel mask processing unit 1358. Address modification is made by clearing the lower 2 bits of the frame buffer physical address to 0.

The plural pixel mask processing unit 1358 can write data multivalue-expanded in units of plural pixels in the frame buffer. The data to be written in this case is the one assumed after the following logical operation is executed for the data corresponding to the write position in the frame buffer, the selected multivalue pattern, and the selected mask pattern.

Figure 45:
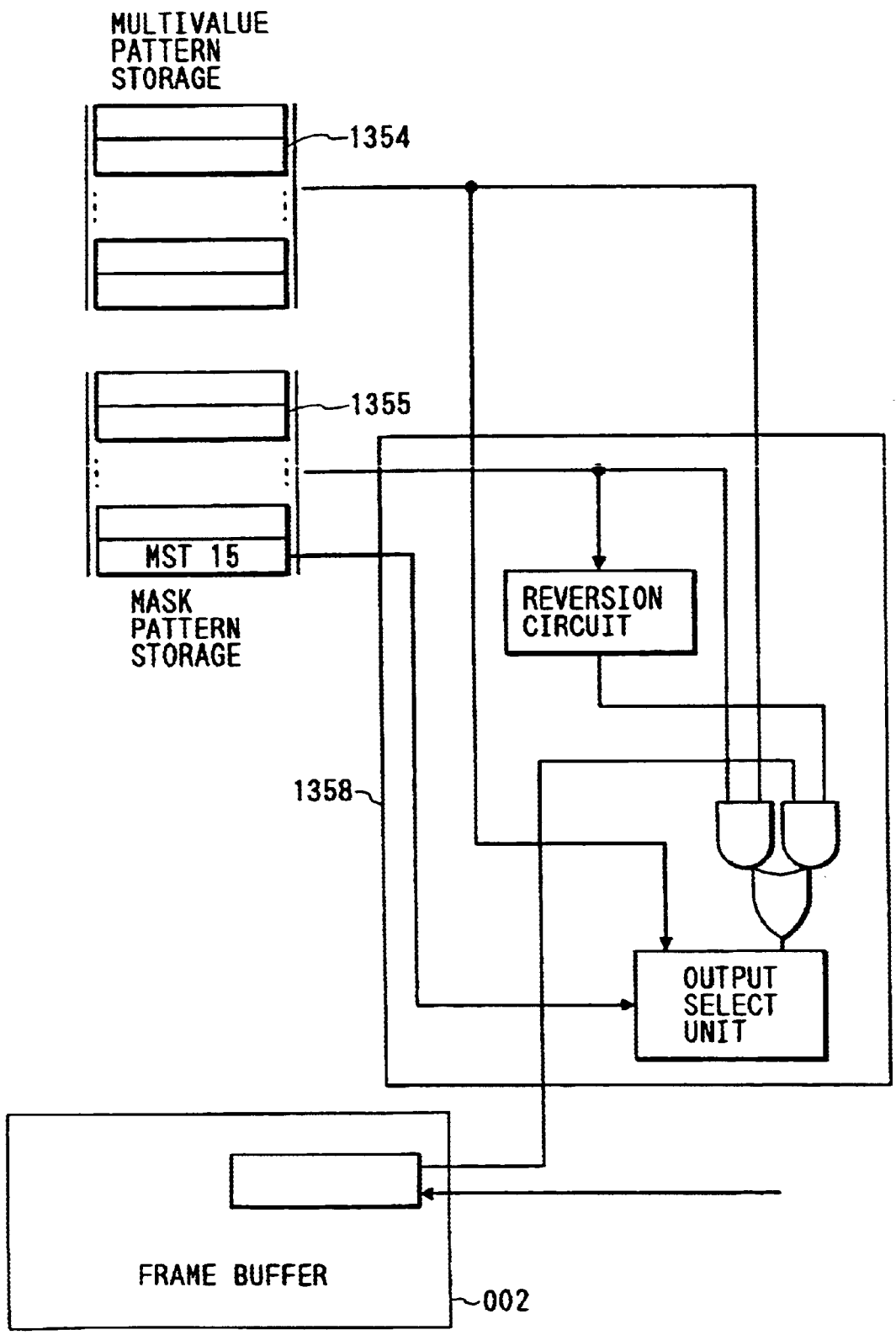
FIG. 45 is a schematic diagram of a plural pixel mask processing unit.

In other words, as shown in FIG. 45, when a logical sum is found from the two logical products (one logical product of multivalue pattern and a mask pattern and the other logical product of the mask pattern reversed value and the frame buffer data), the corresponding frame buffer data is padded in the position 0, which indicates the masking position by the selected mask pattern. When MST15 is selected as the mask pattern, however, data can be written regardless of the data in the frame buffer. Thus, the selected multivalue pattern is drawn directly in the frame buffer without doing such a logical operation.

As explained above, according to this embodiment, a multivalue expansion processing and a mask processing can be performed on-line for plural pixels concurrently without doing such processings for each pixel. Furthermore, plural pixels can be handled while coping with memory access restrictions. As a result, the drawing time can be reduced to 1/the number of pixels to be processed concurrently, and the whole processing time can be reduced significantly.

Next, another embodiment will be explained. In the explanation, the faster multivalue expansion method is applied to the drawing procedure 131.

FIG. 46 shows the processing flow of the multivalue expansion/drawing executed in the CPU 010. The procedure to draw this character is stored together with other items in the drawing procedure 131 in the 3rd memory 013.

In general, a high class language is used in many cases as an interface with the programmer when executing an application program for a processing such as drawing characters. Especially, the C language structures processings by defining processing functions as a function. Also in this embodiment, a series of procedures to draw characters are handled as a function. In general, character data is stored in a ROM such as a character generator, etc. in the format of plural pixels x plural pixels per character. In this embodiment, however, character data is stored in the format of 16×16 pixels per character.

When character drawing procedures are represented as a function, the result becomes like TCOPY (Xs, Ys, dx, dy, Xd, Yd) 1600. TCOPY means that a copy processing is to be carried out to convert binary data to multivalue data. Xs and Ys are binary data source coordinates, while dx is the number of pixels to be transferred in the X direction and dy is the number of pixels to be transferred in the Y direction. Xd and Yd are the destination coordinates of multivalue-expanded data. In this embodiment, dx=16 and dy=16 are assumed, and the number of pixels to be transferred actually is 16×16 pixels, that is, 256 pixels.

The Y direction transfer count refers to the dy value stored in memory 1601. This value is used in the judgment for ending character drawing 1608. The X direction transfer count refers to the dx value stored in the memory 1602. The value is transferred to the multivalue expansion procedure 134 and is used for the judgment of transfer sequences. The step 1603 "Transfer the binary data coordinate point (Xs, Ys) to the multivalue expansion procedure" means that the lower left coordinates of binary data indicated in a rectangular area, which is the source, are transferred to the multivalue expansion procedure 134. The step 1604 "Transfer multivalue data coordinate point (Xd, Yd) to the multivalue expansion procedure" means that the lower left corner coordinates corresponding to the transfer destination of the frame buffer, which is the source, is transferred to the multivalue expansion procedure. Receiving each of the said coordinate points, the multivalue expansion procedure converts the coordinate points to addresses in memory for use.

The step 1605 "Transfer X direction transfer count to multivalue expansion procedure" is used by the multivalue expansion procedure to judge transfer sequences. According to this transfer count information, the multivalue expansion procedure subtracts data for the number of multivalue-expanded/drawn pixels from the count information and judges the transfer sequence (initial, intermediate, or last transfer) with the result of the subtraction. This value is also used as the criterion for whether to end the X direction transfer 1606. As a result of this judgment, if the transfer is not ended yet, the multivalue expansion procedure 134 is repeated. This repetition is made 4 times when a 4-pixel concurrent processing described in this embodiment is performed for the multivalue expansion of the binary data shown in FIG. 2 and the processing does not conflict with the memory access restriction. The processing is repeated 5 times even when the processing conflicts with the memory access restriction. On the other hand, when the X direction transfer is judged to be ended, step 1607 is executed to subtract 1 from the Y direction transfer count. Then, the processings in and after step 1605 "Transfer X direction transfer count to multivalue expansion procedure" are repeated until the Y direction transfer count becomes 0.

In the series of processings, when binary data is expanded to multivalue data and drawn in the frame buffer, as shown in FIG. 2, the frame buffer memory access count becomes 4 in the X direction x 16 in the Y direction regardless of the memory access restriction. In other words, the memory is accessed 64 times in total. This value becomes 256 when binary data is expanded to multivalue data using the conventional technology.

The memory access count, when a mask processing is required, becomes 8 in the X direction and 16 in the Y direction, 128 times in total in this embodiment. This is because memory accesses to read the data from the frame buffer for a mask processing are included in the count. According to this, the memory access count in the X direction becomes double the memory access count when no mask processing is required.

On the other hand, the memory access count becomes 512 when conventional technologies are used.

Because registers and the address conversion unit are provided, the CPU and DMAC can handle addresses of the same row in the general purpose area in the main memory as continuous addresses. Addresses of the same row in the frame buffer are arranged 2-dimensionally when viewing them from the CPU or DMAC. So, the continuous pixels in the vertical direction can be accessed within the same row addresses. When CPU programs, arithmetic operation data, etc. that are often arranged continuously in one dimension are stored in the general-purpose area, while graphics pixel data that is often arranged continuously in two dimensions is stored in the frame buffer, both drawing accesses for drawing and other accesses can be speeded up significantly.

And, according to this invention, when drawing a short line, it is only needed to read vector data stored beforehand to output the drawing data. Equations to draw a line and overheads to compute the necessary data can be eliminated. When drawing a long line, equations are used to draw it, so the storage capacity to store the vector data can be kept from increasing. This invention can thus provide a system that can draw lines at high speeds and with less storage resources.

In addition, according to this invention, CPU can also expand binary data to multivalue data easily for processing plural pixels concurrently. And, since multivalue pattern data is stored in memory, multivalue expansion can be made off-line and plural dots can be handled concurrently. The performance of multivalue expansion/drawing processings can be prevented from deterioration even when they are executed by CPU.

What is claimed is:

1. A method of operating a microcomputer comprising the steps of:

computing, at a central processing unit (CPU), data to be displayed on a raster scanning type display unit;

carrying addresses to specify a destination of said data in a first address bus connected to said CPU;

storing said data in a memory connected to a second address bus;

storing address conversion data set by said CPU in registers; and converting, at an address converter, addresses received from the first address bus and outputting converted addresses to the second address bus in accordance with the address conversion information set by said CPU.

2. The method of operating a microcomputer as claimed in claim 1, wherein said address converter is provided with first information that specifies an area in said memory to convert addresses according to address conversion information stored in said registers, and addresses received from the first address bus according to said first information in said address converter.

3. The method of operating a microcomputer as claimed in claim 2, wherein said address converter is provided with second information used to obtain a first field of a XS bit from a lower part of an address according to address conversion information stored in said registers and third information used to distinguish a second field of a YS bit from a third field, and to exchange the second and third fields to convert addresses in said address converter.

4. The method of operating a microcomputer as claimed in claim 3, wherein the exchanging of the second and third fields in said address converter operates on an address received from the first address bus according to said first information.

5. The method of operating a microcomputer as claimed in claim 1 wherein said address converter is provided with second information used to obtain a first field of a XS bit from a lower part of an address according to address conversion information stored in said registers and third information used to distinguish a second field of a YS bit from a third field, and to exchange the second and third fields to convert addresses in said address converter.

6. A method of line drawing comprising the steps of: generating information to select a draw method from an absolute value of a difference between start and end coordinates of a subject line to generate input information using a selected draw method; storing vector data in a data storage unit at an address of the absolute value of the difference between the start and end coordinates; generating equations and constants to generate a line from the start and end coordinates; and drawing a fixed area for stored data received from said data storage unit.

7. The method of line drawing as claimed in claim 6, further comprising providing first dedicated instructions used to select and start up said data storage and said line coordinate generation, and second dedicated instructions used to start up said data storage and said line coordinate generation without selection thereof.

8. A method of line drawing, comprising the steps of: fixing a line processing time for up to a specific number of pixels, and setting the line processing time to a value proportional to the number of pixels which have been processed upon said specific number of pixels being exceeded.

9. A method of operating a graphics computer comprising the steps of: reading binary data of plural pixels; storing multivalue patterns, each of which comprises plural multivalue data for one pixel; and selecting multivalue data, corresponding to the read binary data for plural pixels, from said stored multivalue patterns.

10. The method of operating a graphics computer as claimed in claim 9, further comprising the steps of judging the position to start writing of pixel data according to an address of pixel data to be written in a frame buffer; and writing pixel data in the frame buffer according to said start position for writing.

11. A method of operating a graphics computer comprising the steps of: reading binary data of plural pixels; storing mask patterns to mask specified pixel data for plural pixels; selecting a specified mask pattern from said mask patterns to process the specified pixel data for read plural pixels; and executing a mask processing according to the selected mask pattern.

12. The method of operating a graphics computer as claimed in claim 11, further comprising the step of judging the position to start writing of pixel data according to an address of the pixel data to be written in a frame buffer.

13. A method of operating a graphics computer comprising the steps of: judging a position to start writing pixel data according to an address of pixel data to be written in a frame buffer; and writing pixel data in the frame buffer according to said start position for writing.

14. A method of operating a graphics computer comprising the steps of: storing binary pixel data; reading binary data for plural pixels; storing multivalue patterns, each of which comprises plural multivalue data for one pixel; selecting stored multivalue data corresponding to read binary data for plural pixels and displaying stored pixel data.

15. The method of operating a graphics computer as claimed in claim 14, further comprising the steps of judging a position to start writing pixel data according to an address of pixel data to be stored and controlling the selection according to a judging result.

16. A method of operating a graphics computer having a graphics processor and a display, comprising the steps of: storing binary pixel data; reading binary data for plural pixels; storing mask patterns used to mask specified pixel data for plural pixels; selecting a specified mask pattern from said mask patterns to process specified pixel data for read plural pixels; executing a mask processing using said selected mask pattern; storing the processed pixel data; and displaying the stored pixel data.

17. The method of operating a graphics computer as claimed in claim 16, further comprising the steps of judging a position to start writing of pixel data according to an address of pixel data to be stored, and according to a judging result.

18. A method of operating a microcomputer comprising the steps of:
computing data to be displayed on a raster scanning-type display unit in a CPU;
reading binary data of plural pixels, storing multivalue patterns, each of which includes plural multivalue data for one pixel, and selecting multivalue data, corresponding to the binary data from read plural pixels, from said stored multivalue patterns;
carrying addresses to specify a destination of said data stored in a first address bus connected to said CPU;
storing said data in a memory connected to a second address bus;
storing address conversion data set by said CPU in registers; and
converting addresses received from the first address bus and outputting them to the second address bus.

19. A method of operating a microcomputer, comprising the steps of:
computing, at a central processing unit (CPU), data to be displayed on a raster scanning-type display unit;
generating information to select a draw method from an absolute value of a difference between start and end coordinates of a subject line to obtain input information using a selected draw method;
storing vector data at an address corresponding to the absolute value of a difference between the start and end coordinates of a subject line;
generating equations and constance to generate a line from the start and end coordinates, and
drawing a fixed area for stored vector data;
carrying addresses to specify a destination of said data in a first address bus connected to said CPU;
storing said data in a memory connected to a second address bus;
storing address conversion data set by said CPU in a plurality of registers; and
converting addresses received from the first address bus and outputting converted addresses to the second address bus.

20. A method of operating a microcomputer comprising the steps of:
computing data to be displayed on a raster scanning-type display unit in a CPU;
fixing a line processing time for up to a specific number of pixels, and
setting the line processing time to a value proportional to the number of pixels which have been processed in response to said specific number of pixels being exceeded;
carrying addresses to specify a destination of said data in a first address bus connected to said CPU;
storing said data in a memory connected to a second address bus;
storing address conversion data set by said CPU registers; and
converting addresses received from the first address bus and outputting them to the second address bus.

21. A method of operating a microcomputer comprising the steps of:
computing data to be displayed on a raster scanning-type display unit in a CPU;
reading binary data of plural pixels,
storing multivalue patterns, each of which comprises plural multi value data for one pixel,
selecting multivalue data, corresponding to read binary data for plural pixels from said stored multivalue pattern, and
judging the position to start writing of pixel data according to an address of pixel data to be written in a frame buffer according to said start position for writing;

carrying addresses to specify a destination of said data in a first address bus connected to said CPU;

storing said data in a memory connected to a second address bus;

storing address conversion data set by said CPU in a plurality of registers; and converting addresses received from the first address bus and outputting them to the second address bus.

22. A method of operating a microcomputer, comprising the steps of:

computing, at a central processing unit (CPU), data to be displayed on a raster scanning type display unit;

carrying addresses to specify a destination of said data in a first address bus connected to said CPU;

storing said data in a memory connected to a second address bus;

storing address conversion information specifying an address conversion mode set by said CPU in a register; and converting, at an address converter, addresses received from the first address bus and outputting converted addresses to the second address bus in accordance with the address conversion mode set by said CPU, wherein the address conversion mode is executed such that said addresses are arranged sequentially in two-dimensions in a plurality of blocks having a smaller area than the display, and wherein a size of each of said plurality of blocks is determined by said register.

23. The method of operating a microcomputer as claimed in claim 22, wherein said address converter is provided with first information that specifies an area in said memory to convert addresses according to address conversion information stored in said register, and to convert addresses generated on the first address bus according to said first information.

24. The method of operating a microcomputer as claimed in claim 23 wherein said address converter is provided with second information used to obtain a first field of a XS bit from a lower part of an address according to address conversion information stored in said register and third information used to distinguish a second field of a YS bit from a third field, and the exchange the second and third fields to convert addresses.

25. The method of operating a microcomputer as claimed in claim 24 wherein said address converter exchanges the second and third fields by operating on an address received from said first address bus according to said first information.

26. The method of operating a microcomputer as claimed in claim 22, wherein said address converter is provided with second information used to obtain a first field of a XS bit from a lower part of an address according to address conversion information stored in said register and third information used to distinguish a second field of a YS bit from a third field, and to exchange the second and third fields to convert addresses.

* * * * *